(12) United States Patent
De Klerk et al.

(10) Patent No.: US 8,478,616 B2
(45) Date of Patent: Jul. 2, 2013

(54) BUSINESS APPLICATION DEVELOPMENT AND EXECUTION ENVIRONMENT

(75) Inventors: Adrian De Klerk, Elbert, CO (US);
Michael Cohen, Colorado Springs, CO (US); Sagiri Fukaya, Colorado Springs, CO (US); Sergey Zakharchenko, Walnut Creek, CA (US); Richard Turpen, Lucas, TX (US); Taspa Alagarsamy, Albany, NY (US)

(73) Assignee: FrontRange Solutions USA Inc., Milpitas, CA (US)

( * ) Notice: Subject to any disclaimer, the term of this patent is extended or adjusted under 35 U.S.C. 154(b) by 1483 days.

(21) Appl. No.: 11/262,490

(22) Filed: Oct. 29, 2005
(Under 37 CFR 1.47)

(65) Prior Publication Data
US 2006/0225032 A1    Oct. 5, 2006

Related U.S. Application Data

(60) Provisional application No. 60/623,768, filed on Oct. 29, 2004.

(51) Int. Cl.
*G06Q 10/00* (2012.01)
(52) U.S. Cl.
USPC ........ 705/7.11; 705/7.26; 705/7.27; 705/348; 717/104
(58) Field of Classification Search
None
See application file for complete search history.

(56) References Cited

U.S. PATENT DOCUMENTS

| | | | |
|---|---|---|---|
| 7,027,997 B1 * | 4/2006 | Robinson et al. | 705/7.26 |
| 7,313,533 B2 * | 12/2007 | Chang et al. | 705/7.38 |
| 7,409,671 B1 * | 8/2008 | Meredith et al. | 717/104 |
| 7,421,739 B2 * | 9/2008 | Barrett et al. | 726/26 |
| 7,428,519 B2 * | 9/2008 | Minsky et al. | 706/47 |
| 7,467,371 B1 * | 12/2008 | Meredith et al. | 717/104 |
| 7,503,033 B2 * | 3/2009 | Meredith et al. | 717/104 |
| 2003/0074291 A1 * | 4/2003 | Hartung et al. | 705/35 |
| 2004/0034555 A1 * | 2/2004 | Dismukes et al. | 705/7 |
| 2004/0122853 A1 * | 6/2004 | Moore | 707/103 R |
| 2004/0181753 A1 * | 9/2004 | Michaelides | 715/523 |
| 2005/0010456 A1 * | 1/2005 | Chang et al. | 705/7 |
| 2005/0038764 A1 * | 2/2005 | Minsky et al. | 706/47 |
| 2005/0044110 A1 * | 2/2005 | Herzenberg et al. | 707/104.1 |
| 2005/0234902 A1 * | 10/2005 | Meredith et al. | 707/4 |
| 2005/0256818 A1 * | 11/2005 | Sun et al. | 706/46 |
| 2006/0047723 A1 * | 3/2006 | Pomponio | 707/204 |

OTHER PUBLICATIONS

"Erp should pay more attention to customer business process" John Pollard SunServer; Oct 1999; 13, 10; ProQuest Computing pg. 4.*

* cited by examiner

*Primary Examiner* — Gurkanwaljit Singh

(57) ABSTRACT

A business application development environment and a corresponding business application execution environment is disclosed. A graphical user interface based Workflow Designer allows a user to easily create business applications graphically. The business applications are converted into the Business Process Modeling Language (BPML). Existing BPML applications may also be edited with the graphical user interface BMPL designer of the present invention. Created business applications (that are represented in BPML) can then be hosted on any XML based web services server system. Business applications generally operate on business objects. The objects allow for fields to include functions that combine other fields. Once an application has been designed, the BPML code may be executed using a BPML execution engine. The BPML execution engine executes the BPML based applications. One embodiment interprets BPML applications with an interpreter in the execution engine. Another embodiment compiles the BPML applications into directly executable code.

18 Claims, 37 Drawing Sheets

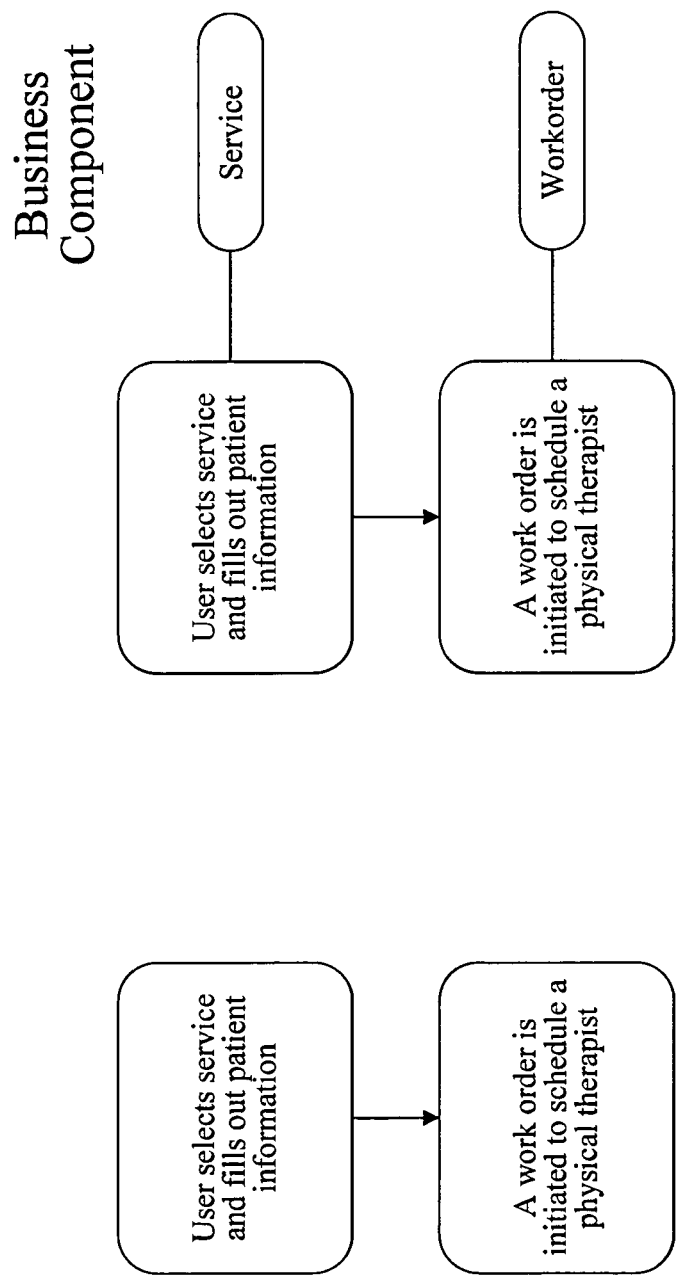

Service Request

Service ▷     Service ID

Patient

SSN/ID

First Name    Last Name

Address

City    State    ZIP

Workorder

Service ▷    Therapist

Figure 26

| | |
|---|---|
|  | Create New: Creates a new process or new package with a wizard |
|  | Open: Allows you to select a package. |
|  | Save: Saves your work. |
|  | Preview: Previews your business process. |
|  | Print: Prints the selected activity. |
|  | Undo: Allows you to undo the last step. |
|  | Redo: Allows you to redo the last step if you have undone it. |
|  | Cut: Cuts the selected object. |
|  | Copy: Copies the selected object. |
|  | Paste: Pastes the selected object. |
|  | BPML code: Displays the BPML code for the selected object. |
|  | Attributes: Opens the Attributes window. |
|  | Orientation: Allows you to change the orientation. |

Figure 30B

| | |
|---|---|
| ↓ | Alphabetic: Displays the attribute list in alphabetical order. |
| | Categorized: Displays the attribute list by category. |
| | Input: Opens the Inputs Editor. |
| o | Output: Opens the Outputs Editor. |
| p | Properties: Opens the Properties Editor. |
| Sc | Schedules: Opens the Schedules Editor. |
| Si | Signals: Opens the Signals Editor. |
| | Values: Opens the Values Editor. |

Figure 32B

```
BPML Code
<?xml version="1.0" encoding="utf-8"?>
<bpml:process name="EventDispatcher" xmlns:bows="http://localhost/FusionBOWS/FusionBOWS.xsd" xmlns:draco="http://frontrange.com/draco/events'
  <bpml:event activity="NewObject" exclusive="false" />
  <bpml:context>
    <bpml:property name="object" type="fusion:BusinessObject" fixed="false" />
  </bpml:context>
  <bpml:action name="NewObject" portType="dracoEvents:fusionEventsPortType" operation="Create">
    <bpml:input property="object" element="fusion:BusinessObject" />
  </bpml:action>
  <bpml:switch name="DispatchNewBusinessObject">
    <bpml:documentation>Handles the spawning of new processes when new Business objects we care about are created</bpml:documentation>
    <bpml:case name="HandleNewChange">
      <bpml:condition>$tns:object/fusion:BusinessObject/@xsi:type="fusion:ChangeType"</bpml:condition>
```

Figure 33

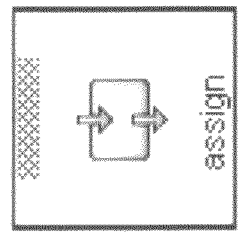

Figure 34

ChangeID = Change.RecID

US 8,478,616 B2

BUSINESS APPLICATION DEVELOPMENT AND EXECUTION ENVIRONMENT

RELATED APPLICATIONS

The present patent application hereby incorporates by reference in its entirety and claims the benefit of the previous U.S. Provisional Patent Application entitled "Business Application Development and Execution Environment" filed on Oct. 29, 2004 having Ser. No. 60/623,768.

FIELD OF THE INVENTION

The present invention relates to the field of software application development and execution environments. In particular the present invention discloses a business software application development and execution environment that allows users to easily develop business applications using a graphical user interface. The developed business applications may easily access other data from legacy systems.

BACKGROUND OF THE INVENTION

Businesses typically use a wide variety of different software products. Although made business software applications are designed to communicate with each other, getting the communication to occur can be very difficult. Furthermore, one may desire to combine information from two or more different software applications in a new application. Thus, it would be desirable to create a business software application development and execution environment.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 23 illustrates a flow diagram of how employees should fill out and track a service request for the physical therapy service.

FIG. 24 illustrates the key business component for each of the mapped needs.

FIG. 26 illustrates one possible hand-drawn service request form.

FIG. 30B illustrates Workflow Designer Toolbar displays icons.

FIG. 32B illustrates a set of tools that from the attributes display of FIG. 32A.

FIG. 33 illustrates an example BPML code tab that displays the Package object code.

FIG. 34 illustrates the use of an Assign activity to assign a value.

DETAILED DESCRIPTION OF THE PREFERRED EMBODIMENT

Figure 1:
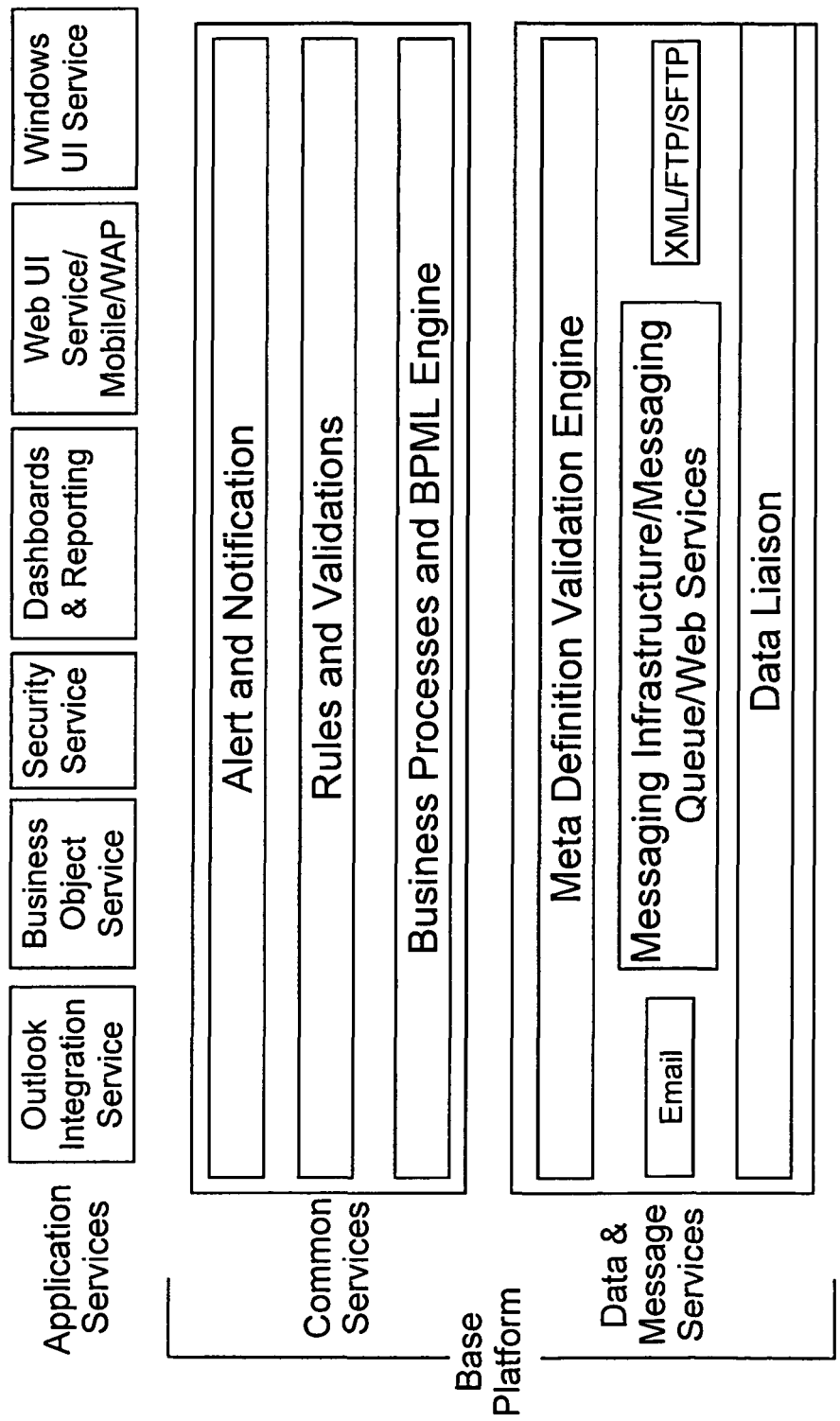
FIG. 1 illustrates a high-level block diagram of the overall technology architecture of the business application execution environment of the present invention.

A methods and apparatuses for implementing a business application development and execution environment are disclosed. In the following description, for purposes of explanation, specific nomenclature is set forth to provide a thorough understanding of the present invention. However, it will be apparent to one skilled in the art that these specific details are not required in order to practice the present invention. For example, although the present invention has been described with reference to specific data communication and storage standards, the same techniques can easily be applied to other types of data communication and storage standards.

Definitions

The disclosed invention is related to and operates with many existing technologies. As is common in the computer industry, technical acronyms are often used to identify known technologies in this document. This section provides a list of acronym definitions and technology descriptions in order to familiarize the reader with the relevant technology.

AJAX—Asyncrhonous Javascript And XML: A set of technologies used to interactive programs available from a web browser program.

Business Objects Object-Oriented software objects in a computer program that abstract the entities in the domain that the program is written to represent. For example, an order entry program needs to work with concepts such as orders, line items, invoices, and so on. Each of these may be represented by a business object. Good business objects will encapsulate all of the data and behavior associated with the entity that it represents. For example, an order object will have the sole responsibility for loading an order from a database, exposing or modifying any data associated with that order (i.e. order number, the order's customer account), and saving the order back to the database.

BPML—Business Process Modeling Language (AKA Business Process Mark-up Language): A meta-language for the modeling of business processes, just as XML is a meta-language for the modeling of business data. BPML provides an abstracted execution model for collaborative & transactional business processes based on the concept of a transactional finite-state machine.

BPQL—Business Process Query Language: A process management interface to a business process management infrastructure that includes a process 44444XML document, attributes that can appear in a document, which elements are child elements, the order and number of child elements, whether an element is empty or can include text, data types for elements and attributes, default and fixed values for elements and attributes, etc.

XPath—XML Path Language: A terse (non-XML) syntax for addressing portions of an XML document.

XQuery—XML Query: A query language (with some programming language features) that is designed to query collections of data stored within XML documents. XQuery is semantically similar to the standard database query language SQL.

XSD—XML Schema Definition: An instance of an XML schema written in the XML Schema language. An XSD defines a type of XML document in terms of constraints upon what elements and attributes may appear, their relationship to each other, what types of data may be in them, and other things.

XSLT—XSL Transformations: An XML-based language used for the transformation of one XML document into another new document. The new document may be serialized (output) by the processor in standard XML syntax or in another format, such as HTML or plain text. XSLT is most often used to convert data between different XML schemas or to convert XML data into web pages or PDF documents.

Business Application Development and Execution Environment

The present invention comprises a business application development environment and a corresponding business application execution environment. A graphical user interface based Workflow Designer allows a user to easily create business applications graphically. The business applications are converted into the Business Process Modeling Language (BPML, also known as Business Process Mark-up Language). Existing BPML applications may also be edited with the graphical user interface BMPL designer of the present invention. Created business applications (that are represented in BPML) can then be hosted on any XML based web services server system. Business applications generally operate on business objects. The objects allow for fields to include functions that combine other fields.

Once an application has been designed, the BPML code may be executed in a BPML execution engine. The BPML execution engine executes the BPML based applications. One embodiment interprets BPML applications with an interpreter in the execution engine. Another embodiment compiles the BPML applications into directly executable code.

FIG. 1 illustrates a high-level block diagram of the overall technology architecture of the business application execution environment of the present invention. The business application execution environment is sometimes referred to as the Fusion system. Referring to FIG. 1, at the base of the business application execution environment is a set of data and messaging services. The data and messaging services form the low level core infrastructure used by the business application execution environment.

The first portion of the data and messaging services is the data liaison. The Data liaison handles communication with a database that is used to store various system data such as business objects.

Above the data liaison, is the messaging infrastructure and web services layer. The messaging and web services infrastructure handles communication between different objects and processes. Note that messaging and web services infrastructure is very open in that it can import and export data in many different formats and many different manners. For example, data may be XML formatted or not. Similarly, information can be imported or exported using email (SMTP), ftp, http, the data liaison connector to a database, or other means.

The final portion of the data and messaging services is the Meta definition validation engine located above the messaging infrastructure and web services layer. The Meta definition validation engine ensures the data is acceptable for use in the business application execution environment.

Above the data & message services layer is a common services layer. The common services layer begins with a Business Processes and BPML Engine that is used to execute business processes created in the Business Process Modeling Language (BMPL). The next layer handles various rules and data validations. Finally, the common services layer also includes a module for handling alerts and notifications. These alerts may include signals generated by a BPML program.

At the very top of the business application execution environment is a set of application services. The application services provide specific services that are often needed by business applications. An outlook integration service provides services to allow a business application to easily interact with Microsoft's popular Outlook personal information application. A business object service provides services that allow a business application to directly interact business objects. A security service provides various security services to business applications. A dashboard & reporting service provides services that allow a business application to create graphical user interfaces for displaying information and generate formatted data reports. A Web UI Service/Mobile/WAP service provides various interface services that allow a business application to interact with a world-wide-web (HTML) interface, a mobile interface, or a Wireless Access Protocol (WAP) interface. In a preferred embodiment, the web user interface provides asynchronous Javascript and XML (AJAX) features such that interactive applications can be created that only require a standard personal computer web browser. Finally, a windows user interface service provides services that allow a business application to directly interact in the windows environment.

Figure 2:
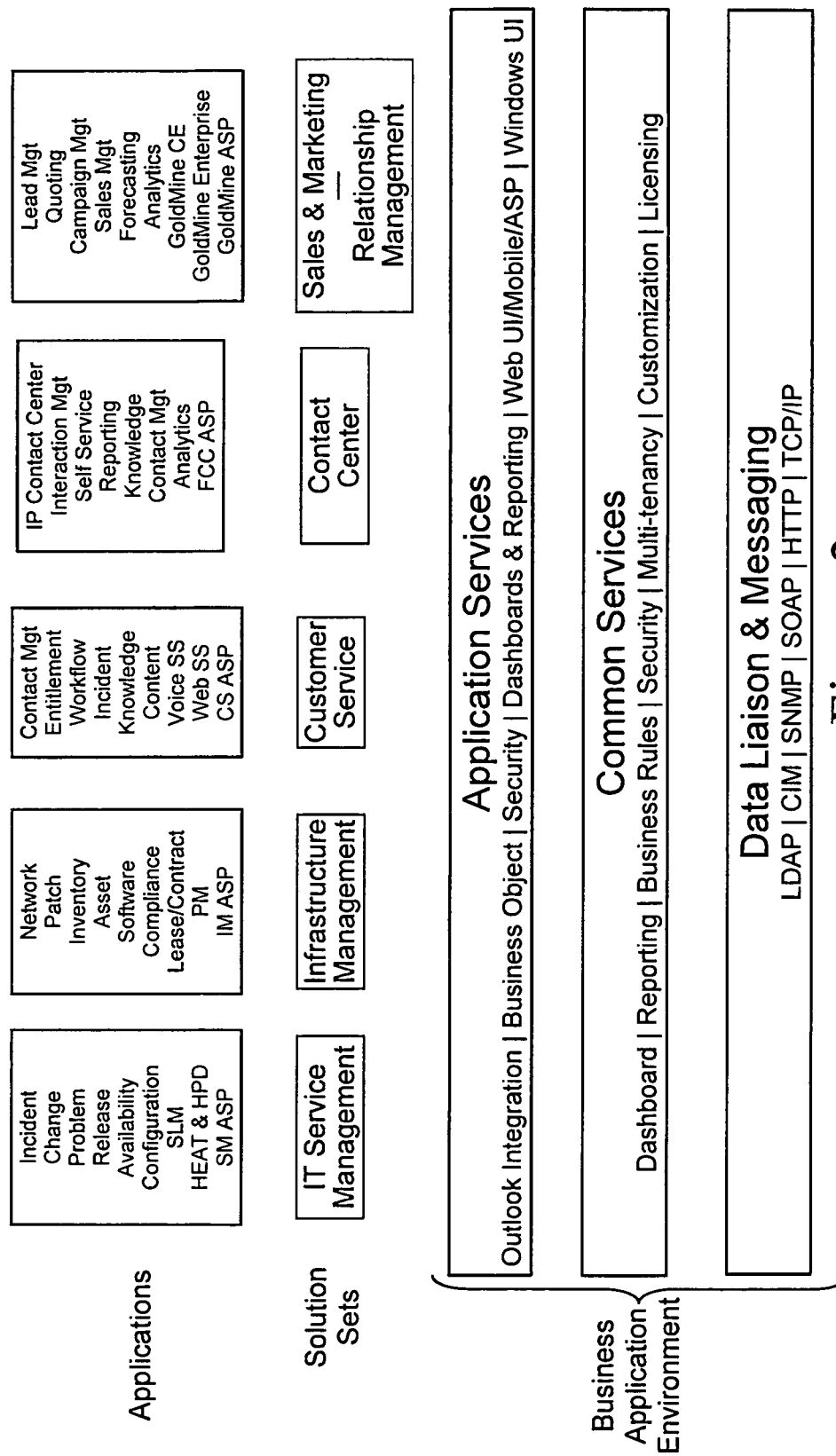
FIG. 2 illustrates a high-level block diagram of the business application execution environment of the present invention being used to support various different solutions in various different business areas.

FIG. 2 illustrates a high-level block diagram of the business application execution environment of the present invention being used to support various different solutions in various different business areas. Referring to FIG. 2, a first solution set is an IT service management solution set that provides tools for creating bug tracking applications, release management, and other IT related issues. A second solution set provides tools for providing infrastructure management solutions such as asset tracking, contract tracking, inventory, license compliance, etc.

Business Objects

In order to understand the business application development and execution environment, it is important to understand the business object model used by the business application development and execution environment and the individual pieces that make up that business object model. In most business process systems, a "business object" refers to a hard-coded software object that can read and write itself within an object environment (such as a database) As with any object-oriented programming object, the business object contains a number of properties to represent the state of the object and functions that may manipulate those properties and provide output values. Examples of business objects include entities such as a "Customer object" or a "Sales object".

The business objects of the present invention can be created graphically with a graphical user interface. Detailed information on this method of creating objects is presented in this document.

There are two primary differences between this traditional type of business object and a business object within the context of the present invention:
  1. There are no hard-coded business objects within the system of the present invention. The makeup and logic that defines the business object is all based on a series of definitions or metadata.
  2. The business object does not have the ability to retrieve or store itself from a database as business objects can in other systems.

The fact that business objects are definitional makes these business objects very powerful yet simple. Specifically, it is possible to create very complex business objects without writing any code. Since the business objects of the present invention do not operate directly with a database means that the business objects can run on any tier within an n-tier system without any changes. This means that the business object logic can operate appropriately whether to provide feedback to a GUI-based client or to validate data coming into a server.

Defining Business Objects

Business Objects are defined in XML. Specifically, the business objects, fields and relationships are defined in XML formatted documents. Similarly, XML is used to define the rules.

The Meta Data Repository

The MetaDataRepository is responsible for loading metadata from the database. When a definition is needed, the MetaDataRepository checks its cache for the definition. If it is not found, it will call the necessary code to get the definition loaded from the database. Some definitions are loaded at startup and some definitions are loaded on an as-needed basis.

When a business object definition is loaded, it will create FieldDef and RelationshipDef objects and store them in collections. Rules are also loaded using the MetaDataRepository.

Creating Actual Instances of Business Objects

Once the definition objects are loaded, they can be used to create instances of the object. For example, the BusinessObjectDef (Business Object Definition) definition object creates a BusinessObject (Business Object). The BusinessObject represents an actual "instance" of a business object. If BusinessObjectDef contains the definition for a "Call" to instantiate an object then there might be five created BusinessObjects to represent actual calls 1, 2, 3, 4 and 5.

Figure 3:
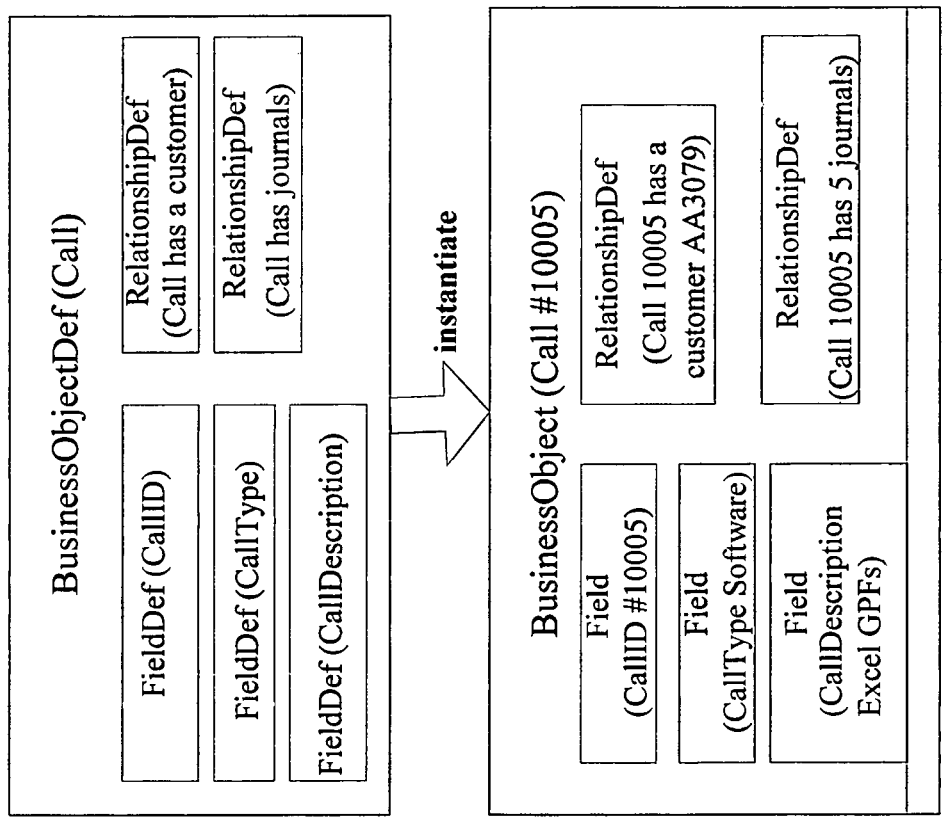
FIG. 3 illustrates a high-level block diagram of a business object.

A BusinessObjectDef contains a collection of RelationshipDefs (Relationship Definitions) and FieldDefs (Field Definitions). When an instance of a BusinessObject is created, instances of each FieldDef and RelationshipDef are created as well. FIG. 3 illustrates a high-level block diagram of a business object.

Business Logic Classes

As with most object-oriented system, the system of the present invention uses classes. This section examines the structure of the business object, field, relationship, and rule classes.

The DefinitionObject is the base class for objects that hold metadata. BusinessObjectDef, FieldDef, RelationshipDef and RuleDef are derivations used to define business objects along with their fields, relationships and rules.

Figure 4:
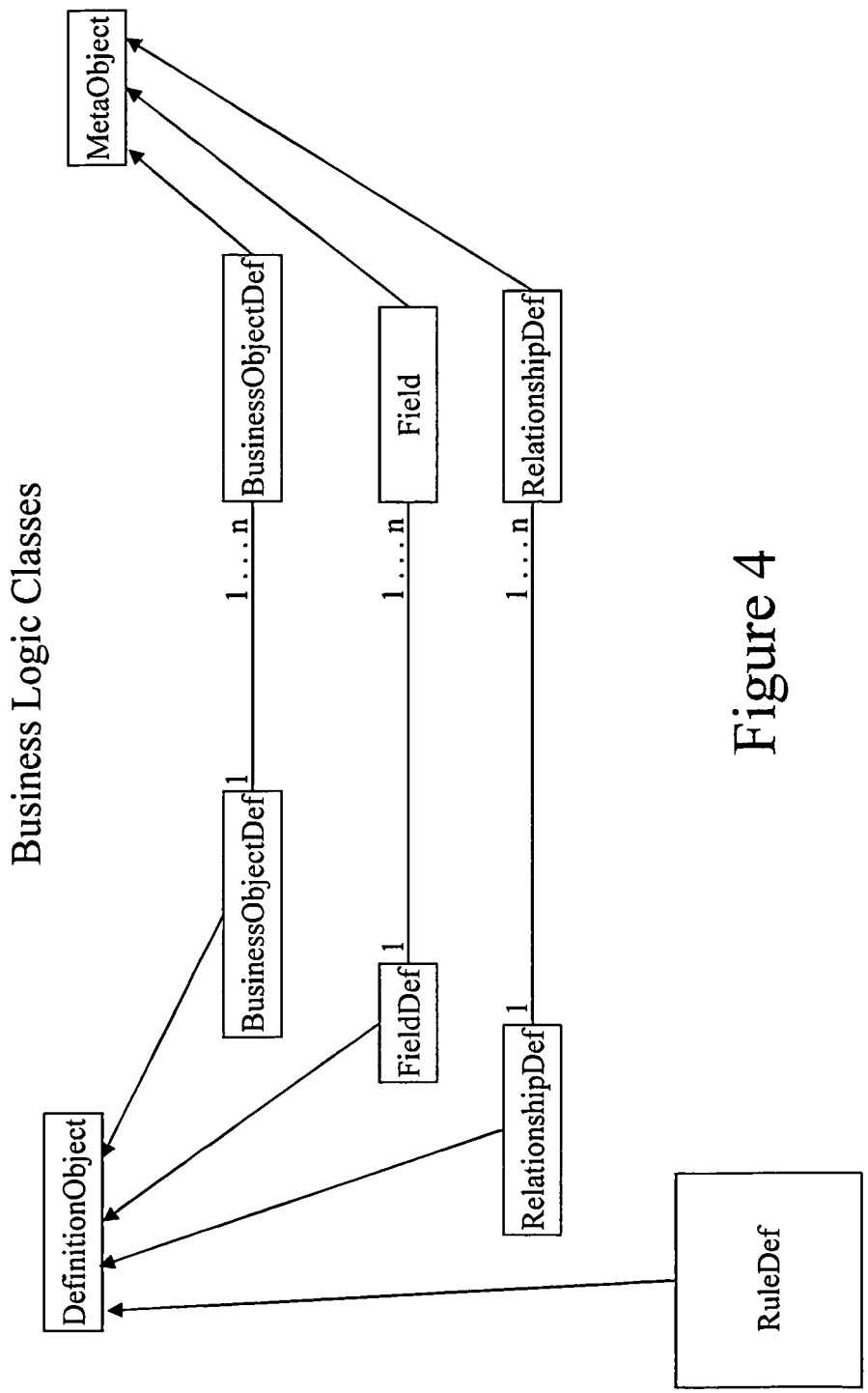
FIG. 4 illustrates the relationships between the Definition-Object bass class and derivations and the MetaObject base class for actual instances created from the metadata.

The MetaObject is the base class for actual instances created from the metadata. BusinessObject, Field and Relationship are derivations. FIG. 4 illustrates the various relations. Notice that there is not a "Rule" class to represent instances of a rule. A rule definition is used whenever a rule needs to be executed.

Definition Objects

The DefinitionObject may include the properties of:
  Unique ID—this is a GUID (globally unique identifier) that should be unique across all systems
  Name—the name of the business object
  Alias (optional)—an alternative name for the business object. This is the name the end user will see.
  Stored Name (if the object is stored)—name under which the object is stored in a data store. Currently, database is the only data store supported.
  Description—A description
  System object flag—true if the object is a business object; false if created by user.
  Version number—the version of the object definition.

Annotations

Since the system of the present invention is a meta-data driven system, there needs to be a way of identifying things such as which field holds a business object's name and which fields contain email addresses. Annotations provide this capability. Annotations are really just hints about the definition that it carries around in case such hints are needed. For example, an annotation on a business object might indicate that it is usable for a special type of report. An annotation on a field might indicate that the field is a phone number that can be auto-dialed.

Field Annotations

The following list describes a current set of annotations used with fields. Note that additional annotations may be added as needed.

RecId—Field holds unique ID. This ID is intended for internal use. The DisplayId is the ID displayed to users.
ParentRecId—Field holds Parent's ID.
DisplayId—Field holds ID displayed to user.
DerivationName—Field holds name.
StateField—Field contains state information.
EmailAddress—Field contains email address.
PhoneNumber—Field contains a phone number.
DescriptiveText—Field contains a description.
OwnerSource—Marks owner field in the business object that represents the logged in user.
OwnerTeamSource—Marks owner's team field in the business object that represents the logged in user.
Owner—Marks a field in any business object to signify that it contains the owner of the record.
OwnerTeam—Marks a field in any business object to signify it contains the team that owns the record.

Example Using Owner Field Annotations

Figure 5:
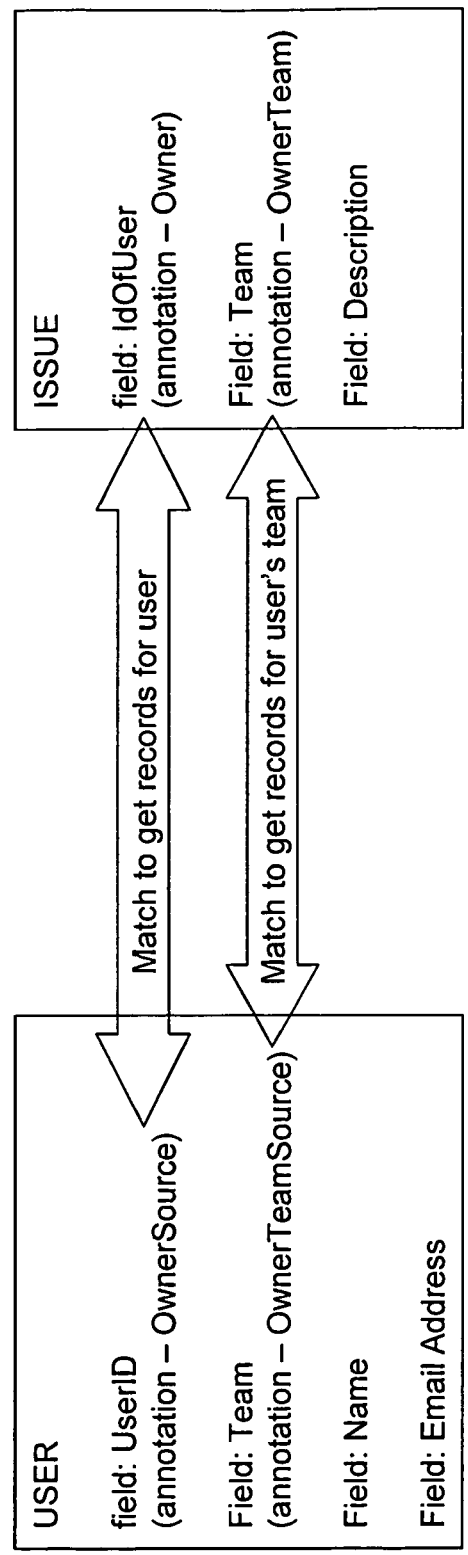
FIG. 5 illustrates the use of annotations in business object.

OwnerSource, OwnerTeamSource, Owner and OwnerTeam are used to pull records based on the person/team that owns them. FIG. 5 illustrates the use of annotations. In the example of FIG. 5, the business object that represents a user is called "User". In this user business object, there is a field annotated with "OwnerSource" to say that this field lists users in the system. There is also a field annotated with "OwnerTeamSource" to mark the field that holds the team that a user belongs to.

Other business objects in the system can contain fields annotated with "Owner" and "OwnerTeam". Such an arrangement allows queries to be formulated that only pull records for the currently logged in user and/or his team. If one wanted to pull all "issues" for the currently logged in user, the query could be formatted as "where User.OwnerSource=Issue.Owner." Similarly, all issues for the current logged in user's team could be retrieved with the query, "where User.OwnerTeamSource=Issue.OwnerTeam".

A few code examples are provided to describe how annotations are created, accessed, and removed. To add an annotation to a business object, use the following object method from DefinitionObject. Keep in mind that BusinessObjectDef and FieldDef are both derived from DefinitionObject so this function can be used for either one. In addition, other DefinitionObject derivations can use annotations although this is not currently the case.

public bool AddAnnotation(string strName, string strValue)
Name—name of the annotation
Value—a value to associate with the annotation. Please note that most annotations do not have an associated value. This value portion is available in case there ever needs to be extra data specified with a field annotation.

The following object method can be used to determine if a definition has a particular annotation:
public bool HasAnnotation(string strName)

The following object methods can be used to get all of the annotations that a definition has or a particular annotation value:
public IDictionary GetAnnotations( )
public string GetAnnotationValue(string strName)

Finally, the following object method can be used to remove an annotation:
public virtual bool RemoveAnnotation(string strName).

Business Object Definition

The BusinessObjectDef class holds the definition of a business object. A business object definition adds a handful of additional simple properties, such as whether or not it is "derived" from another business object. For example, there might be a "Customer" business object that defines basic information, and a "Customer.Internal" business object that adds things like an internal extension number, etc.

Inheritance on business objects is more conceptual than real. Specifically, the definition for the derived business object actually contains all of the properties of the base definition. However, within an editor it can be presented differently.

A business object definition contains a collection of field and relationship definitions. The fields and relationships will be set forth below.

Business Object States

In addition to fields and relationships, is possible for a business object to have a "state" that indicates a current mode of the business object. For example, a Call business object can be in the states of "open", "pending" or "closed". The state of a business object is based on the value in a particular field, which is identified as the state field via the use of an annotation.

Rules can be based on the business object state. For example, a particular field in a Call object might not be required to save the Call business object. However, the field might be required to be filled before the Call business object can be transitioned into the "closed" state.

There are many possible uses of object states. Two additional uses for the object state include:

Finalized state: Special handling for the final state of an object. For example, once a call has been put in the "closed" state, it may require special action to make any changes.
State sequencing: One may specify the order in which the system can move through the various object states. For example, it would not be allowed to go from "open" to "reopen" without going through the "closed" state.

Field Definitions

Figure 6:
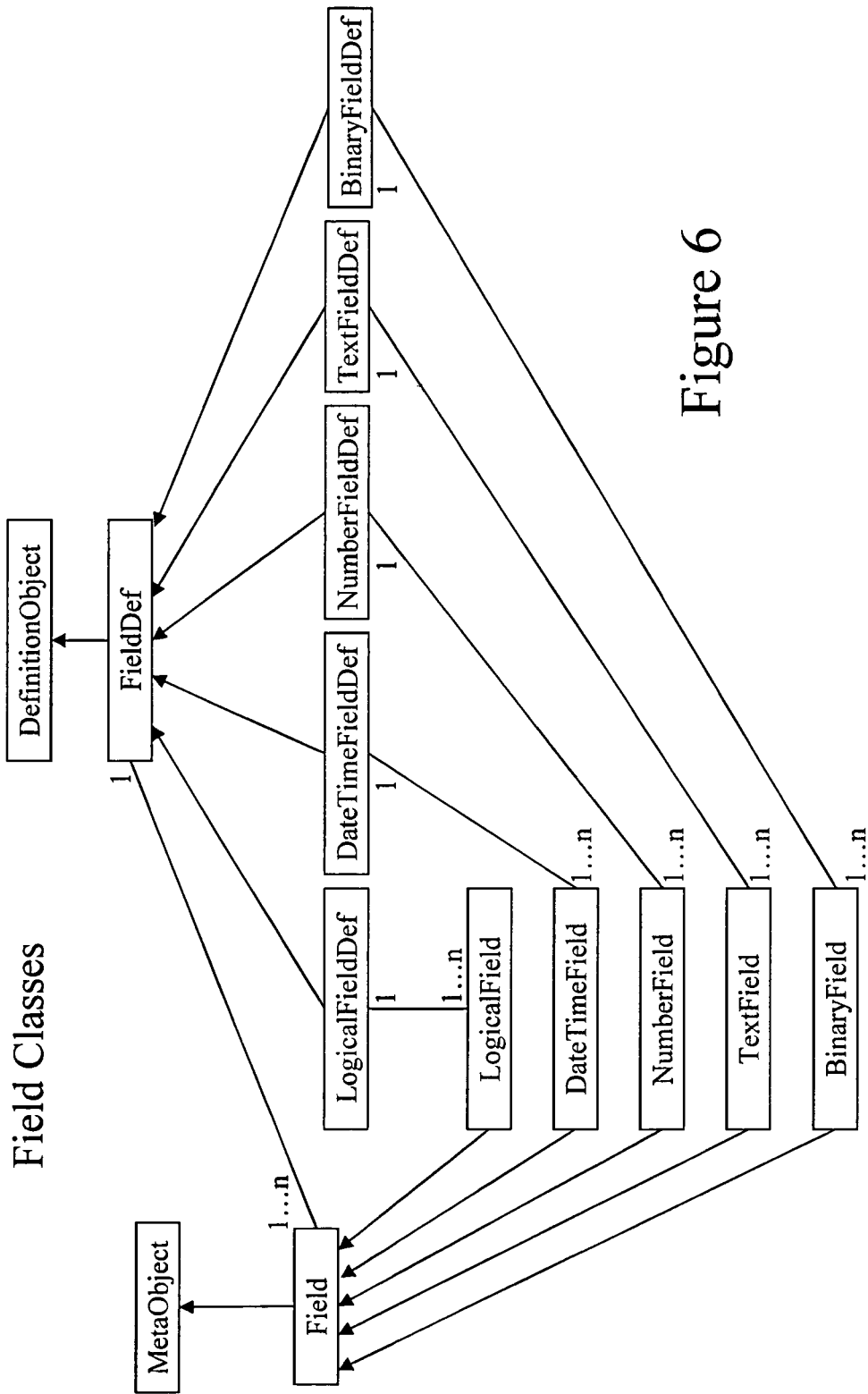
FIG. 6 illustrates the classes of fields available in one embodiment.

A field represents a single piece of information within a business object. For example, a field might be a phone number or the name of a city. Business object fields are not necessarily stored in the database. For example, a field may be calculated from other field values. FIG. 6 illustrates the classes of fields available in one embodiment.

As illustrated in FIG. 6, the business objects in one embodiment of the present invention supports five different types of fields:

Text—A string of character data. While the length is fixed, it can be very large (Up to 2 gig on some database engines).
Number—Possibly containing decimal information.
Date/Time—Can also represent either just a date or just a time.
Logical—A yes/no or on/off Boolean value.
Binary—The binary field is used to store any type of data in binary form.

The very simple fields may seem odd to some programmers. For example the simple text field does not specify the string length. Similarly, the simple number field does not specify if the number is an integer or a floating point value. The reason is that these pieces of information are only relevant to the database code used to store the fields. This information is not relevant to the business object or fields. In fact, in one embodiment this information is stored with the field in a "database hint." The database hint is a specialized feature used only by the database code.

There are multiple ways of referring to a field to a field within a business object. The following list provides a number of different manners in which a field within an object may be accessed:

Name: The simple name for the field. Ex: PhoneNmbr

Qualified name: The name combined with the containing business object's name. This is a very important identifier because this allows a business object to locate and access a field within a related business object via the qualified name. Ex: Customer.PhoneNmbr Alias: The friendly name to display to the user. Ex: Phone Number ID: A unique identifier for a field. Most definition objects have such an identifier (ID). Ex: 32933CFF053843bfB28F424EEBE10000

Although every field has a unique identifier, most lookups within the system are done by name or qualified name. There are a couple of reasons for this:

The unique identifier does not include parenting information.

It is very difficult to debug code that uses the unique identifier for all transactions.

The unique identifiers, however, are very helpful when matching up definitions or for confirming that definitions are legal. Thus, the unique identifiers are present for these reasons.

Field Rules

Fields within business objects use rules for a number of different reasons. Some of the reasons that fields may use rules include:

1. Determining if a field is a read-only field.
2. Setting a default value for a field.
3. Checking the validity of data to be placed into a field.
4. Specifying if the field is required to be filled in the object A rule can be as simple as a hard-coded value ("return true"), all the way up to a piece of scripted code that can call other objects. Each field can have a different rule for each type of use (default value, etc.).

Field Annotations

Fields can also have annotations, just as business objects can. For example, a field can be tagged as a "phone number" field, indicating that the auto-dial functionality of the application should be enabled for that field.

Field Properties

For each type of field there are a number of properties. For example, a number field knows the number of digits it allows, whether it supports negative numbers, etc. This information is used for additional validation of the value of the field, and is also read by UI elements to make the data presentation more appropriate.

Sub-fields

Sometimes there is additional data that needs to be stored with a field. For example, if a field contains Rich Text Formatting (RTF) data, then there will also need to be a version of the field that does not so that it can be searched, printed, etc. Or, an uppercase version of the field might be stored to make searching easier. This is handled by the use of sub-fields.

A field can have any number of sub-fields, and the field is responsible for populating the data within the sub-fields. For example, with the Rich Text Formatting (RTF) data, the regular data is stored in the main field and the RTF data is stored in a sub-field. Both the field and the sub-fields will be written to the database.

There are currently three different uses for sub-fields within business objects in the present invention. Additional sub-fields may be added as needed. The initial three sub-fields are:

Rich Text—For storing the Rich Text Formatting (RTF) version of a text field that includes formatting information such as font selection, underlining, boldness, etc.

Uppercase—For letter case sensitive databases, this sub-field allows for searching in a case insensitive manner.

Validation ID—When a field is validated from another table, as with a foreign key, the value stored in the field is the actual value (for example: "Printer" in a CallType field). However, in order to maintain the link's integrity and deal with multiple rows with the same value, the ID of the row is stored in the table as well. This allows for that row to be found later for auto-fill or non-stored data to be accessed.

Relationship Definitions

Figure 7:
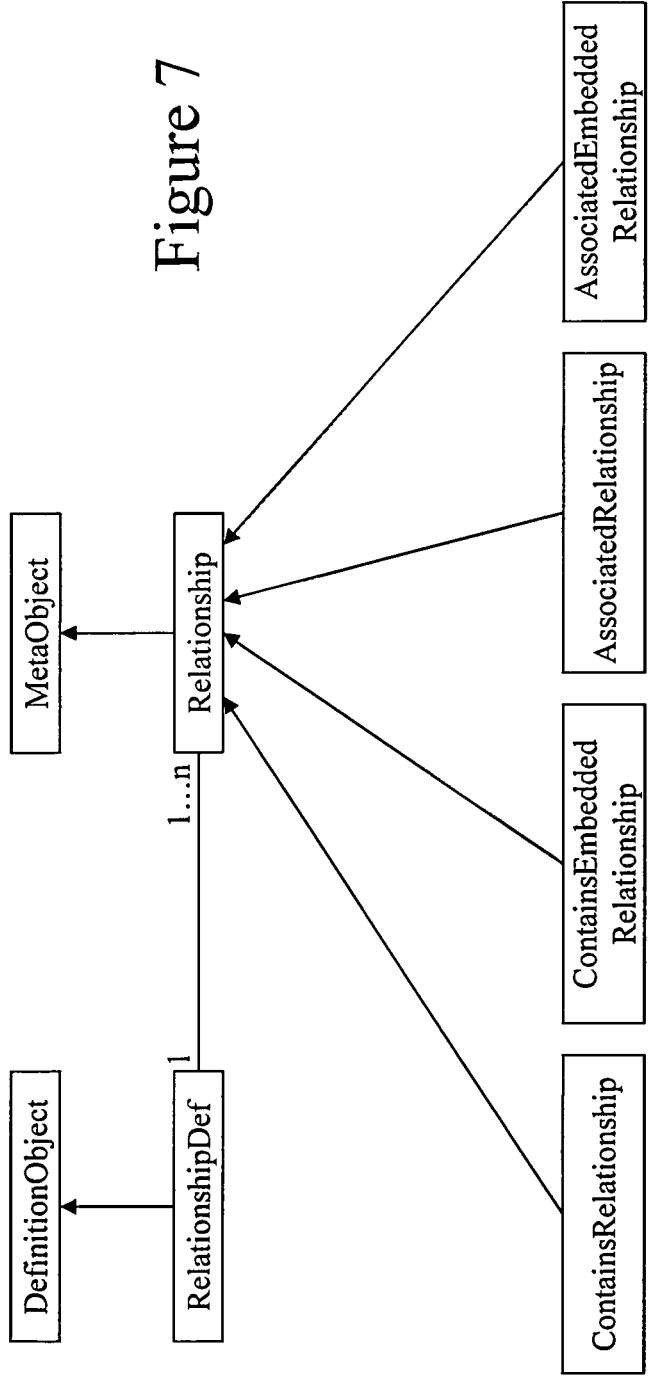
FIG. 7 illustrates the various different classes of business object relations.

The other important collection within a business object definition is of legal relationships. A relationship defines how two different business objects are related to each other. FIG. 7 illustrates the various different classes of business object relations.

As illustrated in FIG. 7, one embodiment of the present invention has four different types of relationships that may exist between business objects:

1. Contains: One business object contains the other in a parent-child manner. For example, a Call contains Journals. When the call is saved, the journal will also be saved.
2. Associated: Defines a relationship where there is no primary (owner) object. For example, a Call is associated with a Customer. If a Call is saved, there is no expectation that the Customer will also be saved.
3. AssociatedEmbedded: An associated relationship that also embeds information about particular objects it is associated with. For example, CompanyAssociatesEmployees might want to keep a record of the "PrimaryContact" of the company. The Company would keep a link to the PrimaryContact record. The associated object must already exist before it can be embedded into the owner object.
4. ContainsEmbedded: A contains relationship that also embeds information about particular children. For example, a Contact might want to designate specific phone numbers as "Work", "Home", "Mobile", etc. To do this, the Contact would keep links to the Work, Home and Mobile records. The ContainsEmbedded relationship keeps a list of purposes (work, home, mobile) so that the UI can display them and allow users to create those objects.

Relationships have various properties, such as their cardinality (1-1, 1-many, etc.) and how the relationship is defined. This is handled via a collection of constraints.

A relationship can also define which type of object or objects it should contain in a more complex manner than simply the type. For example, a Call business object contains a Detail object. This in turn means that the Call business object can contain a Detail.Printer or a Detail.Software object. This is determined from a field in the owning object (the Call) that specifies the type to use and read.

Real Objects

Definitions are "singletons." This means that is there will only be one object definition for a Customer business object running at any given time. To work with an actual business object (not just the object definition), the object must be created and the object must be loaded with data.

Business objects can be created from an object definition to represent an actual instance. Once a business object is instantiated, the business object instance must either be initialized as a new object or loaded with data.

Initializing a Business Object

By calling the CreateNew( )method on a business object, it will be set to its default state. This primarily involves initializing data, and setting fields to their default values (based on the rule assigned to each field's DefaultRule property). Relationships will also be initialized.

Loading a Business Object

A business object can load its state from a stream of XML. This stream may be retrieved from the Data Access Layer. Normally, this business object load is handled automatically when a query is done (via the QueryResolver).

Depending on the query, the loading a business object might load data into relationships as well. If it does not, then the first time that the relationship is accessed will cause a new query to be issued to retrieve that relationship data. This is done in an abstract manner to prevent the business object or relationship from knowing how the data is being retrieved.

Saving a Business Object

Because a business object doesn't have any knowledge of the database, the business object cannot save itself automatically. Instead, an external agent is responsible for retrieving the data from the business object and sending it to the appropriate layer for saving.

Business objects do know how to write out their changes into an XML document. The creation of such an XML document is done via a call to a method called CollectUpdates( ). These changes can then be saved via the use of the BusObServices (Business Object Services) object. The BusObServices object has the ability to take updates and make sure the updates are sent to the appropriate place for processing. These updates can include adds, updates and deletes.

Every business object in the system may be in a couple of states that are relevant at this point:

Dirty—This flag states whether or not the business object has changed in any way since being loaded.

New—This flag states whether the business object has ever been saved since its creation.

These object state flags are used to control the behavior of the CollectUpdates( ) method. Each field also has its own dirty flag to prevent sending data that does not need to be sent.

Data and Messaging Services

Referring back to FIGS. 1 and 2, the foundation set of services in the business application execution environment is the set of data and messaging services. The data services allow business applications to access data from many different sources such as a database, email, a file system, ftp, http, directory services, business objects, etc. The messaging services allow the business applications to communicate with other business applications.

Due to the open nature of the data and messaging services, the business applications may communicate with any other applications that use one of a number of supported inter-process communication means. The supported inter-process communication means include the standardized Simple Object Access Protocol (SOAP) for exchanging XML-based messages over a computer network, the Microsoft Message Queue for exchanging messages within a Microsoft Windows environment, and even simple email using the Simple Mail Transport Protocol (SMTP).

Thus, the data & messaging services form a base infrastructure for the business application execution environment of the present invention. The objective of this section is to disclose the necessary information to create a data, messaging, and integration framework for the business application execution environment. Initially this framework will be used for Infrastructure Management (IM) and transporting Business Process events.

In creating the data & messaging services, the following are some of the goals that were considered desirable:

To provide an integration framework for the business application execution environment based on service oriented architecture that can handle large amount of dataflow.

Provide data transformations, mapping, and routing capabilities.

Easy to deploy in a modular fashion.

Easy to manage and configure.

To provide highly scalable infrastructure for integrating with almost any other external systems.

To securely expose the messaging functionality to other enterprise applications via web services.

Logging of transactions and exceptions.

Note that this section is the reference for the implementing of one particular embodiment of the data and messaging services and related components. Therefore, this section discloses specific implementation details and choices. However, other implementations that use the teachings of the present invention will not use off the specific details.

Figure 8:
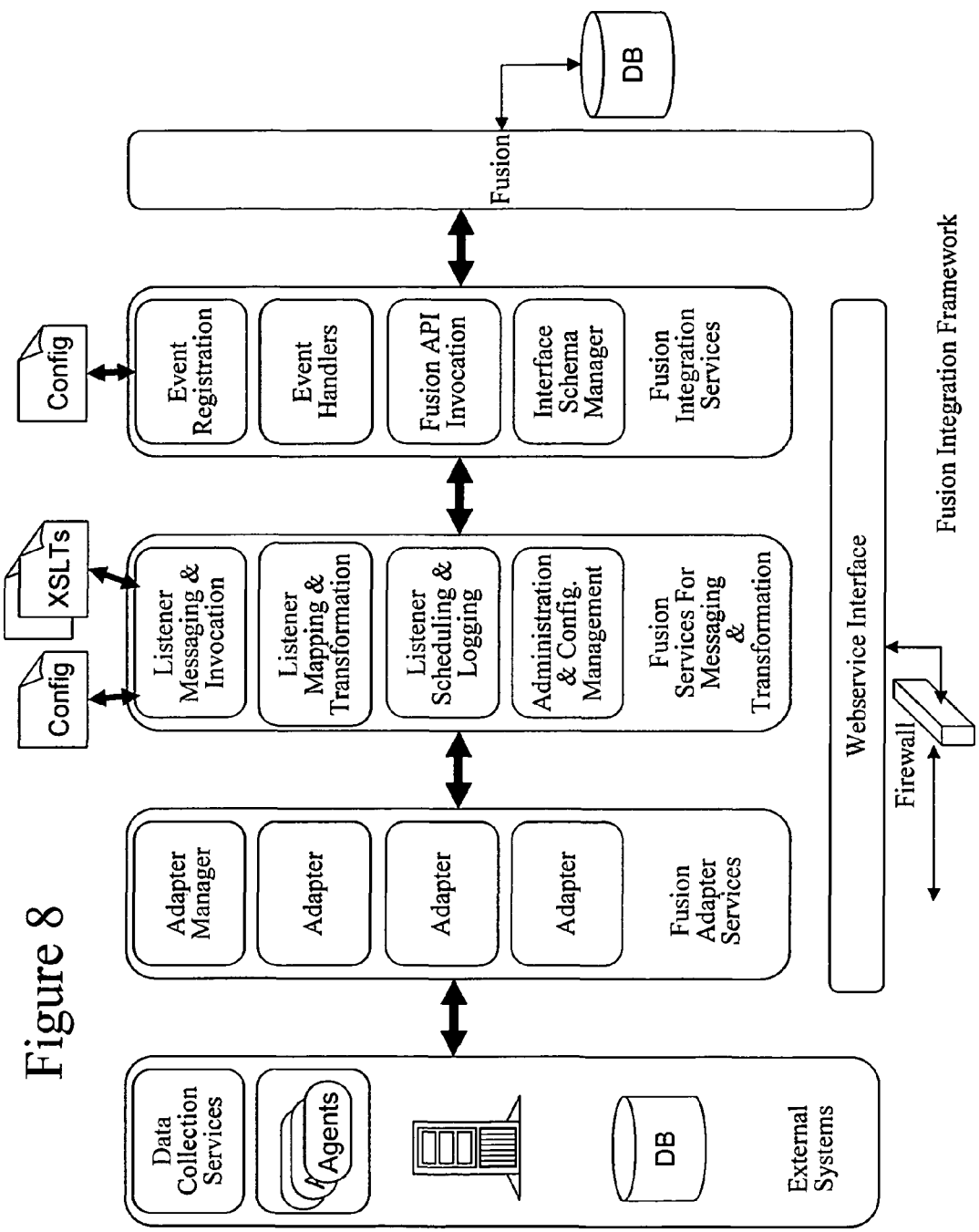
FIG. 8 illustrates a high level block diagram that describes the functional elements of the Fusion integration framework in an abstract manner.

FIG. 8 illustrates a high level block diagram that describes the functional elements of the Fusion integration framework in an abstract manner. Each of the functional elements of FIG. 8 are described in detail in the following sections.

Referring to FIG. 8, an adapter layer allows the data & messaging services to communicate with external systems. This adapter layer forms the data liaison of FIG. 1. To the right of the adapter layer is a messaging and transformation layer than handles message communication and data translations. To the right of the messaging and transformation layer is an integration service layer that integrates the data and message services to the rest of the business application execution environment (illustrated as 'fusion' in FIG. 8).

For the inbound requests, a web service interface is available to perform any transactions in the business application execution environment in addition to messaging web service. For the outbound communications, an event driven approach will be used in which, the administrators/developers can register certain event handlers for a given events through message queues.

The center layer provides messaging and transformation services. In this manner, communication between various adapters can be performed in an asynchronous way. The messaging and transformation layer may also provide any exception handling, message audits and/or routing mechanism using message queue framework. Mapping between different external systems can be specified as a collection of XSLT's.

As set forth earlier, the overall architecture of the data and messaging services can be modularized into three layers that are coupled to the rest of the business application execution environment (fusion). Each layer of data and messaging services is expanded upon and described here to show the details at the component level. These can be further decomposed into class diagrams for static views and sequence diagrams for dynamic views.

Adapter Layer

Referring again to FIG. 8, the adapter layer comprises a set of adapters for sending and receiving information to and from various different external sources. Adapters are independent modules that contain the functions specific to the targeted system. An interface for the different types of adapter will be defined. This will include the methods for collecting data, providing metadata, and performing transactions. The adapters may be independent or may be registered as part of the messaging infrastructure.

The adapter layer aggregates all the different available adapters that communicate with messaging layer. An adapter manager shall be available to support any common functions that are necessary. One such function is the ability to perform reverse communication. Specifically, if the messaging system needs to communicate with the adapters (such as for on demand scanning) the synchronous communication layer will directly communicate to the adapter manager.

The adapter managers may be made available as web services. Furthermore, any configuration information will managed in a uniform way. Data collected by the adapter layer is transported to the messaging through a communication medium. The data message is then routed and translated by messaging according the configured XSLT and finally into the main portion of the business application execution environment through the Fusion Invoker.

Figure 9:
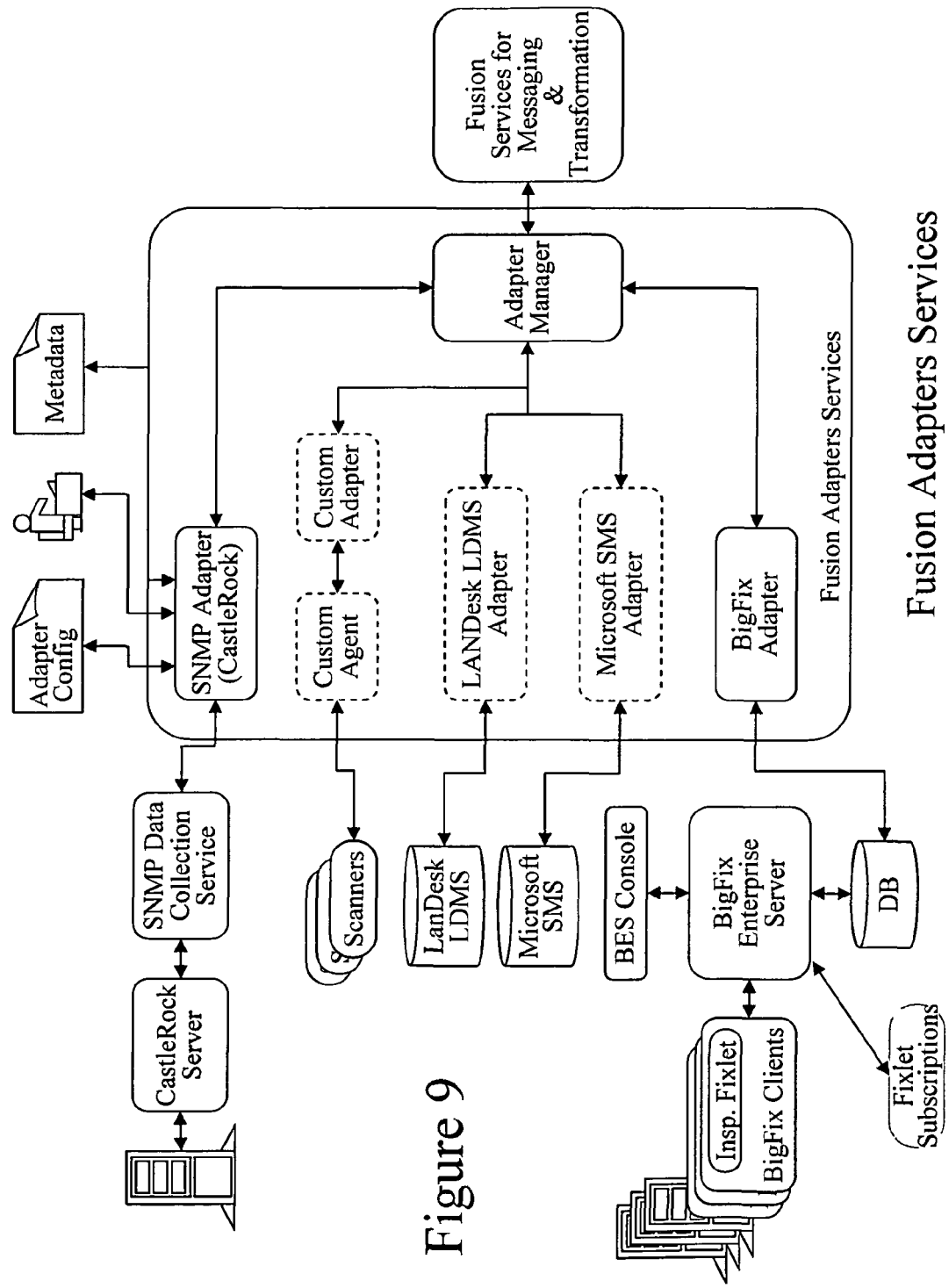
FIG. 9 illustrates a component diagram describing the adapter layer in detail.

FIG. 9 illustrates a component diagram that provides additional detail on the adapter layer. As illustrated in FIG. 9, information can be obtained from a wide variety of external sources such as email, scanners, and databases.

Messaging and Transformation Layer

Referring back to FIG. 8, the central messaging and transformation layer is the main messaging core and provides the many important services for automation, routing, invocation, mapping etc. Messaging and transformation services shall be available as a background service and will initialize the services that are registered with it. The Messaging and transformation services will react to the events that are generated by the main business application execution environment or events generated by external systems. This will provide a mechanism for asynchronous communication using message queues for scalability and reliability.

Figure 10:
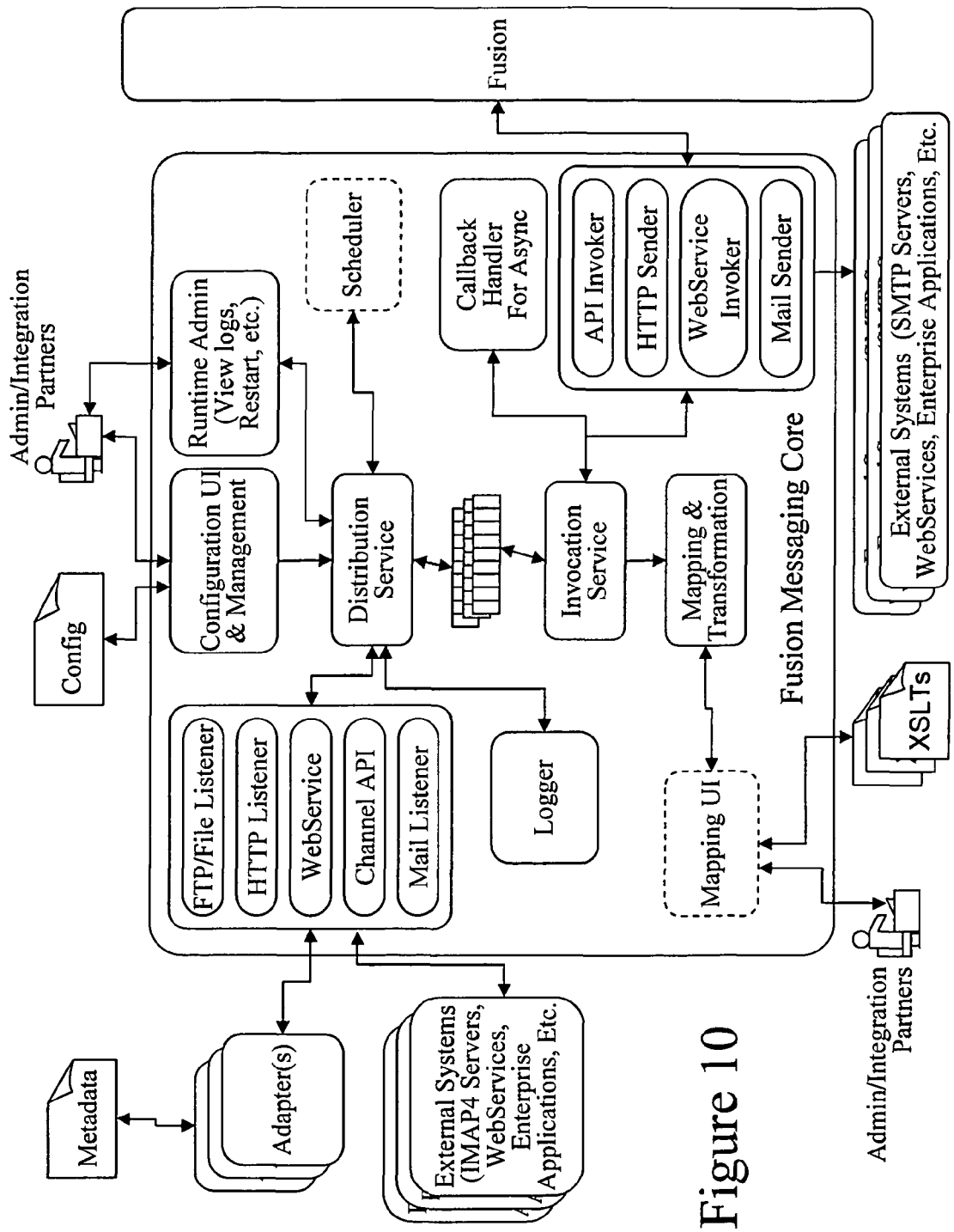
FIG. 10 illustrates is a component diagram of the messaging layer.

FIG. 10 illustrates is a component diagram of the messaging layer. The core of the message distribution system is flanked on either side by listeners and invokers. On one side there are listeners that are initiated to listen for any incoming messages or events. On the other side are the invokers that will be invoked as a result of any messages arrived in the messaging service. The messages will be translated using a mapping and transformation module. The mapping and transformation module will use XSLTs to translate XML documents. Messages are then routed according the settings that are configured.

Figure 11:
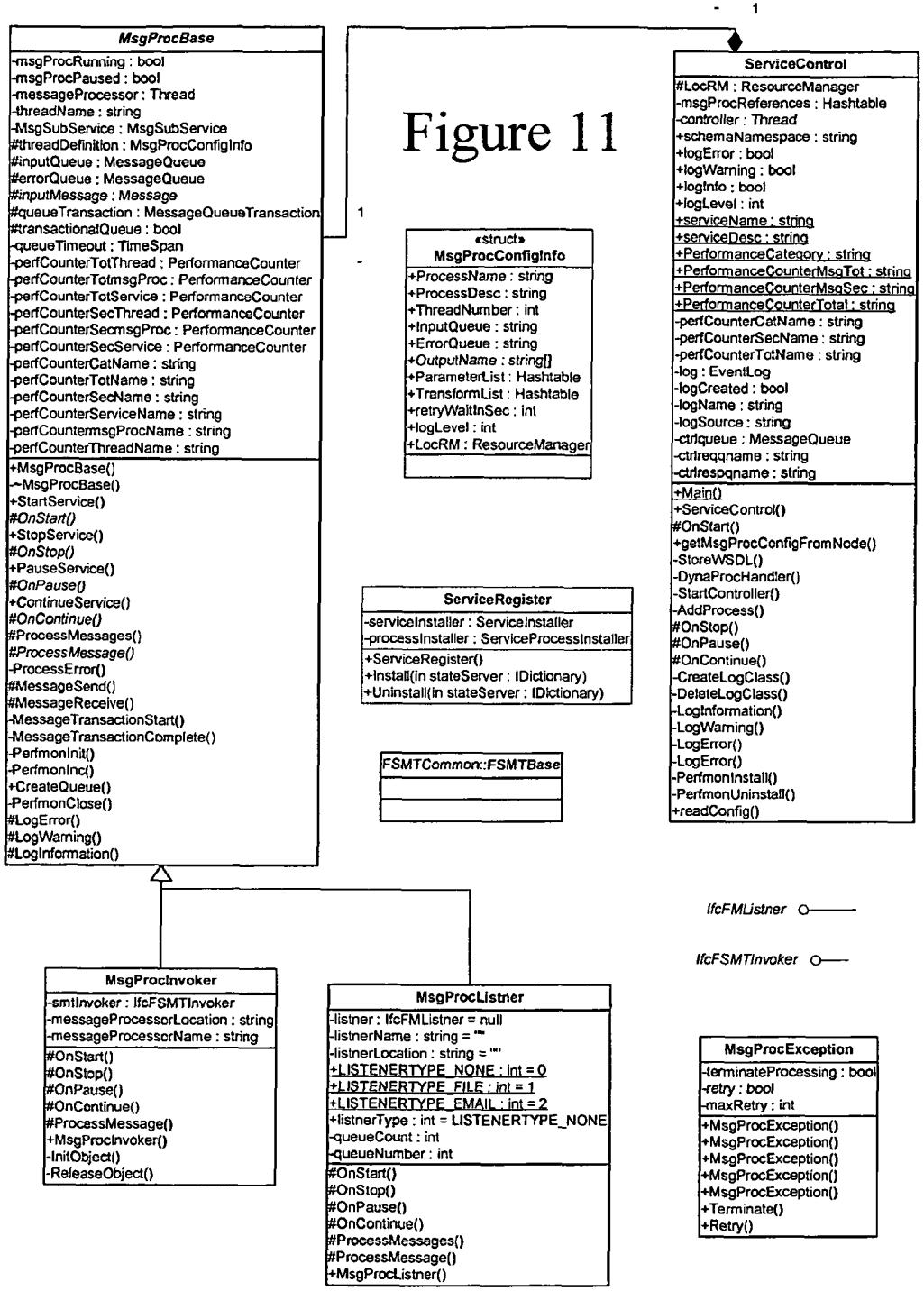
FIG. 11 illustrates an object class diagram that contains important object classes that are part of the messaging service.

FIG. 11 illustrates an object class diagram that contains important object classes that are part of the messaging service.

Integration Layer

Figure 12:
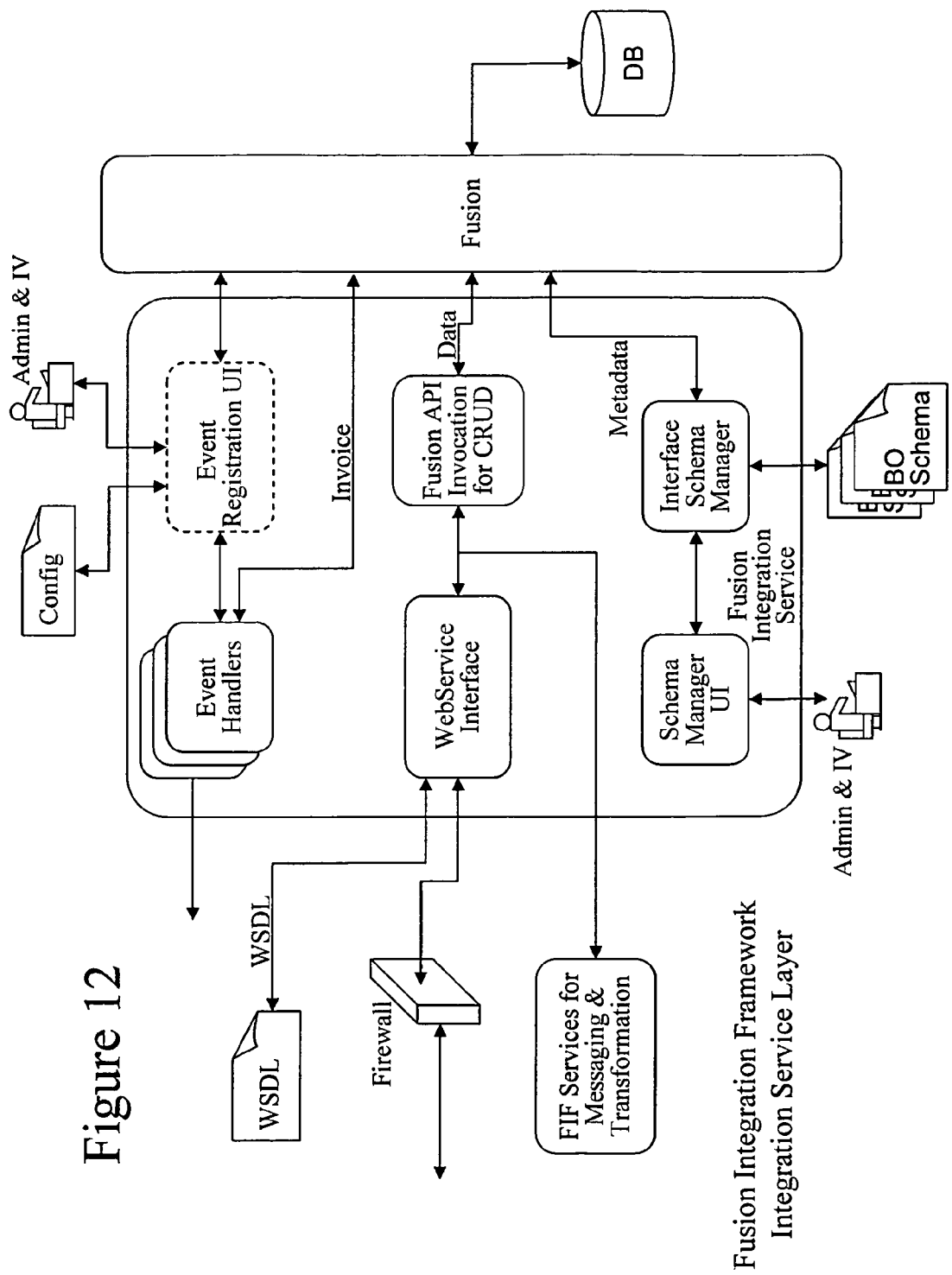
FIG. 12 illustrates an extended block diagram of the integration layer.

Referring back to FIG. 8, the right side of the data and messaging layer is the integration layer that communicates with the remainder of the business application execution environment. FIG. 12 illustrates an extended block diagram of the integration layer.

Referring to the block diagram of FIG. 12, the integration layer consists of the following:

A Fusion Invoker to assist in communicating synchronously with the remainder of the business application execution environment.

A Webservice to assist in communicating synchronously with remainder of the business application execution environment.

Event trapping mechanism (event handlers) to trap an event and publish the event as a public event. This will be in conjunction with the trigger mechanism available in the business application execution environment. An option to publish the event publicly shall be available.

A Schema generator (Interface Schema Manager) that generates the business object schema with the current state to be used in the request messages.

A Data import tool for batch migration of data that takes the messages in the same format that is used for the integration.

Listeners

Referring back to the messaging and transformation layer illustrated in FIG. 10, various listeners can be registered for listening to different information sources. Each listener is a module for importing data from an external source into the business application execution environment. The listeners are initiated when the messaging service is started.

Figure 13:
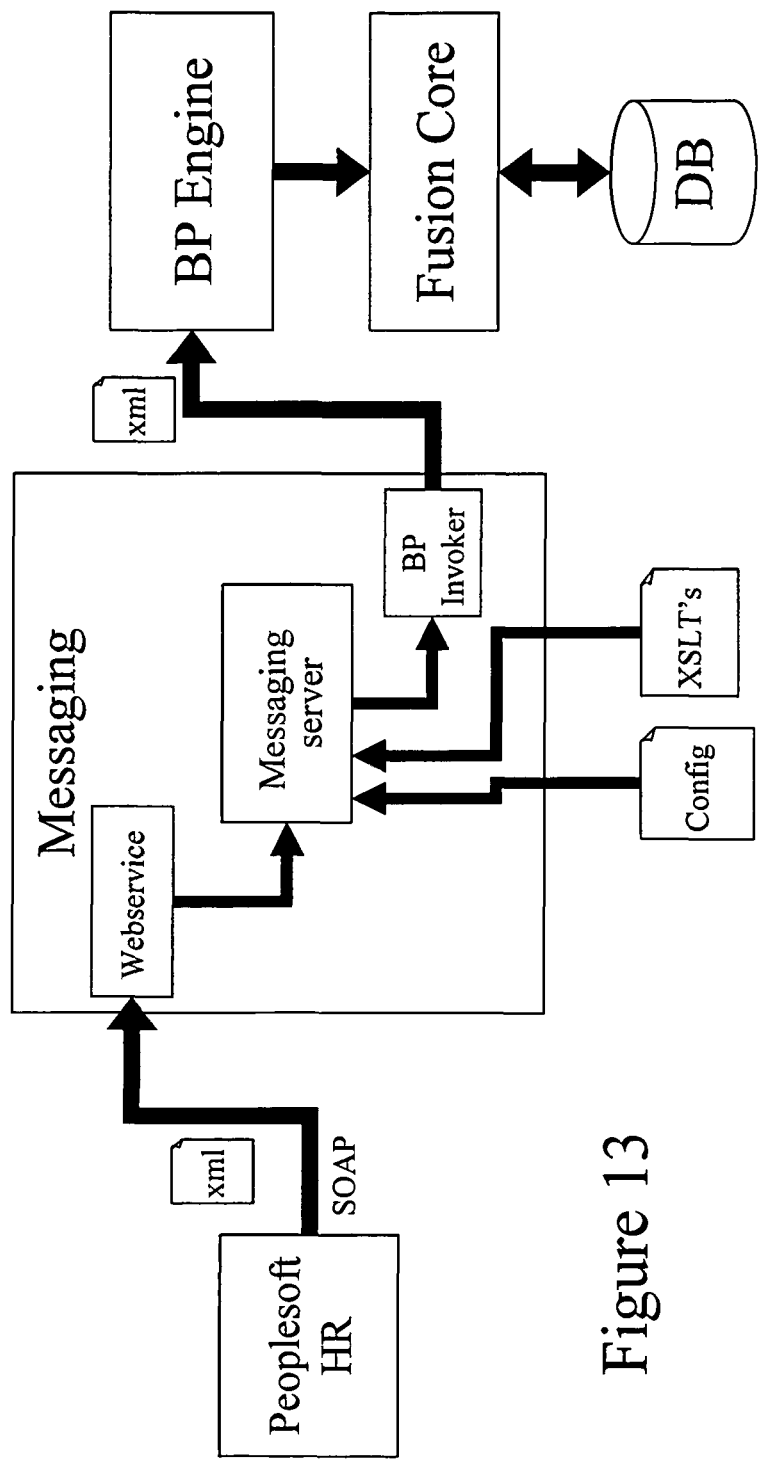
FIG. 13 illustrates an example of how incoming information may be received on a listener and passed on to the main business application execution environment.

FIG. 13 illustrates an example of how incoming information may be received on a listener and passed on to the main business application execution environment. As illustrated in FIG. 13, employee information is maintained in an external Peoplesoft HR application. Transactions on Employee information in the Peoplesoft HR application could be captured and an xml document can be sent to the messaging listener.

The XML document may be received in the HTTP listener using the SOAP protocol. This XML document will be routed and translated as per the XSLT's configured in the messaging and transformation layer. The translated document is then routed to the Business Process Engine in the main business application execution environment. Additional information is derived and respective objects then are created in the main business application execution environment. In this manner total automation has been achieved such that no wasteful double entry of the employee information is needed.

Many different listeners may be created for different communication means. A set of default listeners described in the following sections are provided as part of the data and messaging services.

Email Listener

An email listener will continuously monitor for the incoming emails and will generate an event that signifies the incoming email. The messaging service will be configured to use a default XSLT that maps each field in the email to a default business object for the business application execution environment. Hence a business object will be created for each arrival of an email for a given mail box.

Figure 14:
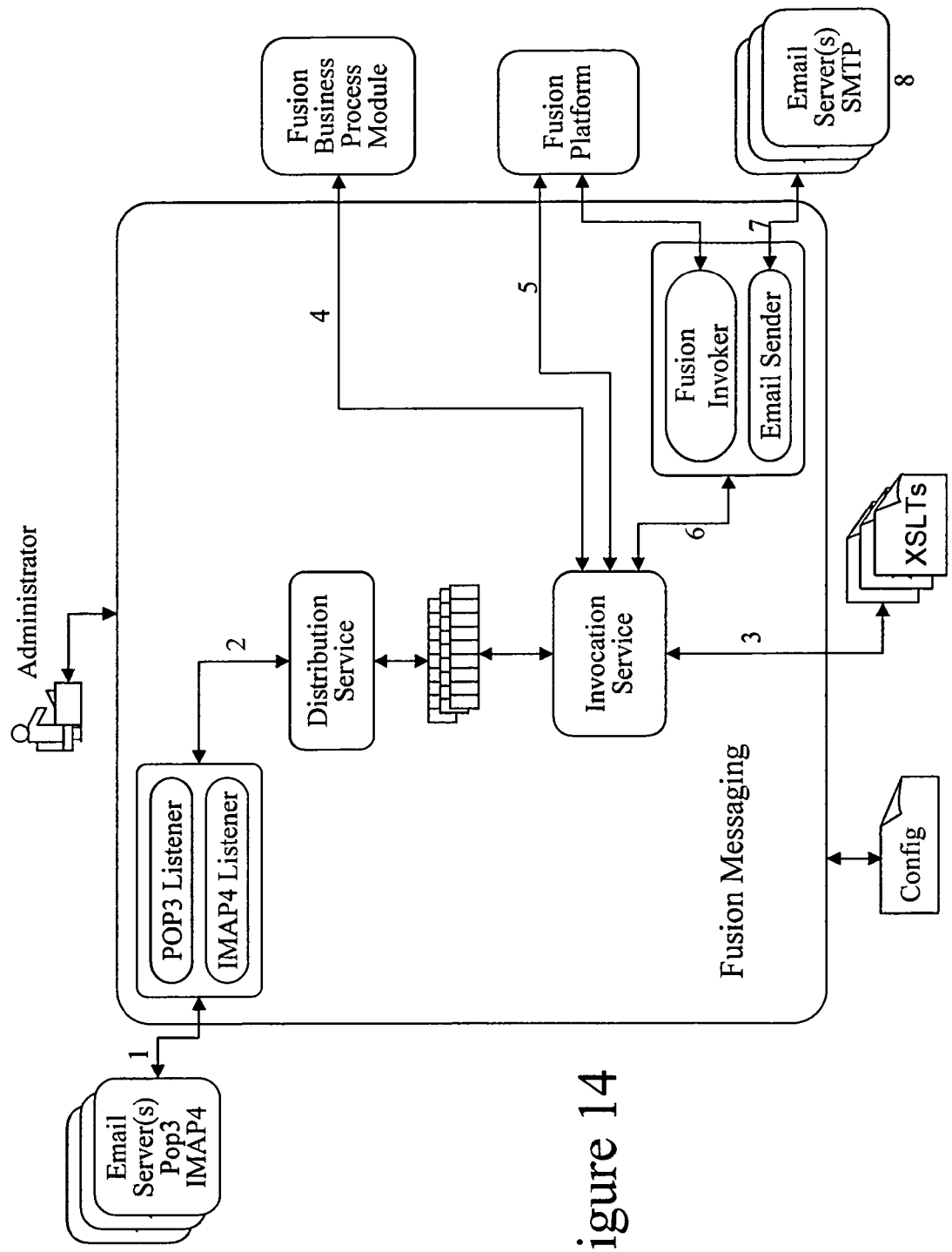
FIG. 14 illustrates a block diagram diagramming a set of steps executed for the processing of an incoming email message using an email listener.

FIG. 14 illustrates a block diagram diagramming a set of steps executed for the processing of an incoming email message using an email listener.

1. Email Listener will continuously monitor mail boxes of one or more mail servers as configured.
2. As soon as an email arrives, it is transported into messaging server as an XML document.
3. The message is translated based on the transformations provided.
4. The message is routed to the Business process for further processing (or could be configured to directly create objects in the main business application execution environment)
5. A request to send bulk email is initiated from the main business application execution environment.
6. The bulk email request is translated into a plurality of email messages.
7. The plurality of email messages are sent reliably to the SMTP servers in a controlled manner.
8. Multiple email servers can be configured to send emails concurrently.

The Email listener component has the "Type" attribute as "EMailListner". The following configuration parameters are needed for this component:

ServerName: Name of the email server

UserName: User name to connect to the mail box

Password: The encrypted password for the corresponding user. To encrypt one must use the fusion utility to get an encrypted password.

CheckFreqInSec: Frequency to check for an incoming email (specified in seconds)

AckSender: Not implemented in this release.

DeleteAfterRead: If specified true the listner component will delete the email once it has been read.

FileLocation: Used for attachments

ChannelName: Queue name to send the result message

Example Email Listener Configuration:

```
<Component Name="CSTAEMailListner" Type="EMailListner"
ThreadCount="1" Transactions="true" WaitForRetryInSec="20">
  <Description>EMail Listner</Description>
  <InputQueue>.\private$\fromfile</InputQueue>
  <ErrorQueue>.\private$\fromfile_error</ErrorQueue>
  <OutputList>
    <OutputName>.\private$\fromemail</OutputName>
  </OutputList>
  <ParameterList>
    <Parameter Name="ServerName" Value="CS-MAIL"/>
    <Parameter Name="UserName" Value="na\taspa.alagarsamy"/>
    <Parameter Name="Password"
Value="UxhupdaKY0oQdvZa1n8n8GeLZplEIAg/1g=="/>
    <Parameter Name="CheckFreqInSec" Value="10000"/>
    <Parameter Name="AckSender" Value="true"/>
    <Parameter Name="DeleteAfterRead" Value="false"/>
    <Parameter Name="FileLocation" Value="C:\input"/>
    <Parameter Name="ChannelName" Value=".\private$\tofusion"/>
  </ParameterList>
  <TransformList>
    <Transform MsgType="default" MsgTypeId="0">
    <Schema>C:\Messaging\Stylesheets\CSTAEMailListner.xsd</Schema>
    <Stylesheet>C:\Messaging\Stylesheets\CSTAEMailListner.xslt</Stylesheet>
    </Transform>
  </TransformList>
</Component>
```

File Listener

The file listener component will monitor a given computer file system directory for any deposited files. The files may be incoming messages. Files deposited into the specified directory will be picked up by the file listener to generate an event message. The event message will be translated and routed according to the configuration.

The file listener component has the "Type" attribute as "FileListner". The following configuration parameters are needed for the file listener component:

FileLocation: The computer file system directory that the file listener should be watching.

ProcessedFileLocation: Once a deposited file is processed by the file listener component, the file can be moved to this location.

DeleteAfterRead: Signifies that a file has to be deleted once the file has been read or processing.

ChannelName: The final message that will be posted to the specified queue name.

Example File Listener Configuration:

```
<Component Name="FileListner" Type="FileListner" ThreadCount="1"
    Transactions="true" WaitForRetryInSec="20">
  <Description>File Listner</Description>
  <InputQueue>.\private$\fromfile</InputQueue>
  <ErrorQueue>.\private$\fromfile_error</ErrorQueue>
  <OutputList>
    <OutputName>.\private$\fromfile</OutputName>
  </OutputList>
  <ParameterList>
    <Parameter Name="FileLocation" Value="C:\input"/>
    <Parameter Name="ProcessedFileLocation" Value="c:\processed"/>
    <Parameter Name="DeleteAfterRead" Value="true"/>
    <Parameter Name="ChannelName" Value=".\private$\tofusion"/>
  </ParameterList>
</Component>
```

HTTP Listener

This is an interface available to external systems to perform an HTTP Post to send any messages to the messaging system.

Web Service Listener

SOAP is a standard cross-platform communication protocol. The following summarizes a typical communication using the SOAP protocol:

Client Side: The SOAP Client will initiate the process by making a SOAP request. In this process, the client will refer the service description (the WSDL file) that resides in the SOAP server, to form a valid SOAP request. The Client will send the request to the SOAP server using HTTP. (Other transport methods are available but not used as much.)

Server Side The SOAP listener will receive the SOAP request from the client. The listener will ensure that the request adheres to the schema defined in the WSDL. Once the request is validated, the listener will determine the appropriate method to call (COM component, java class, etc.). The determination what call to make depends on the SOAP server implementation. The result from the method call will be packaged into a SOAP response as defined in the WSDL. The Server then sends the SOAP response using HTTP.

Client Side The Client will receive the SOAP response and read the result.

A Webservice for each layer will be provided that has the encapsulated functionality. The webservice at the Integration layer is used to communicate synchronously with the main business application execution environment.

A Webservice that is provided in the messaging layer is to communicate to Fusion Asynchronously and will be in the form of document exchange. A Webservice at the adapter layer is to communicate with the Adapters for two way communication.

Invokers

Referring back to the messaging and transformation layer illustrated in FIG. 10, various invokers can be registered for sending information using various different methods. Each invoker is a module for exporting data.

Invokers are registered components that consume messages that are handed over by the messaging service. Each invoker processes messages and performs certain tasks related to exporting to a specific system. All the invocation logic is encapsulated into this component.

Figure 15:
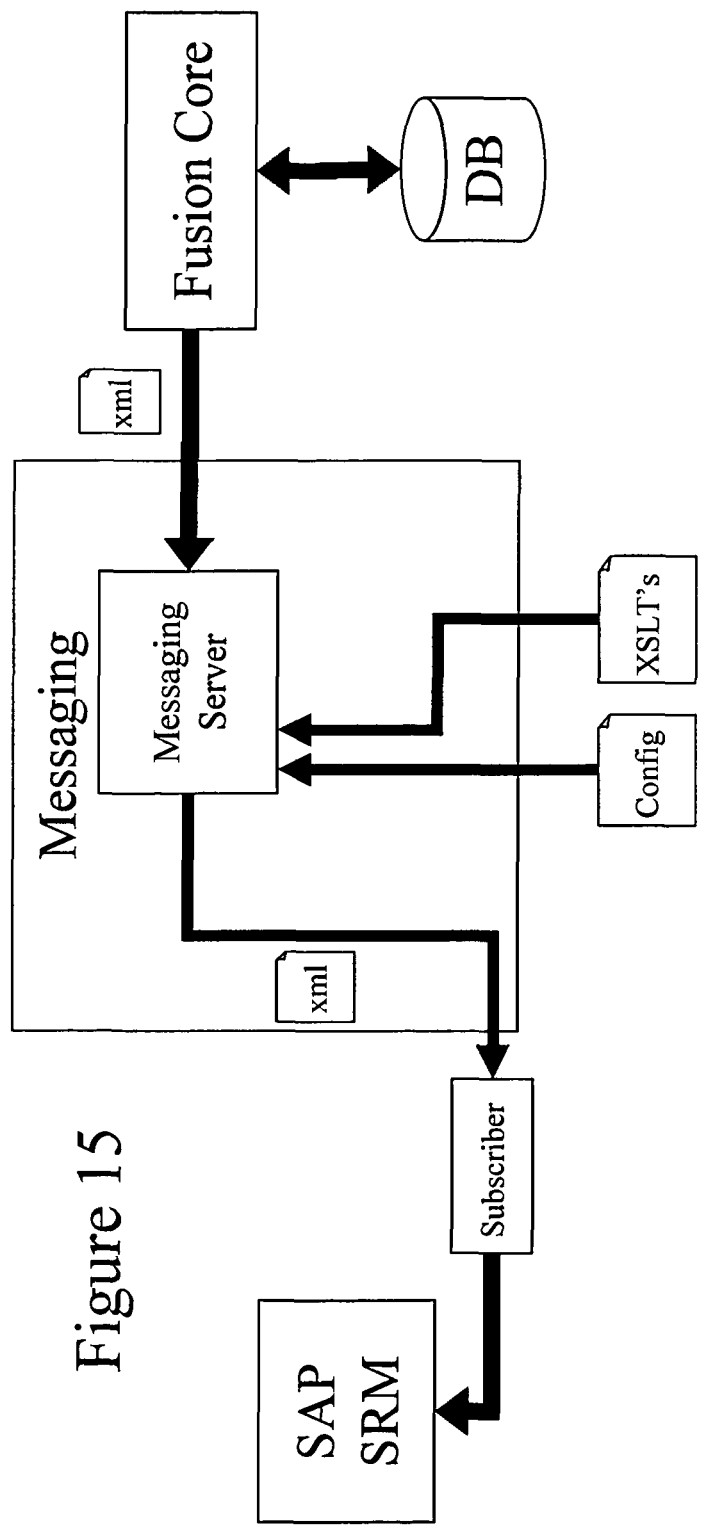
FIG. 15 illustrates an example of how incoming information may be received on a listener and passed on to the main business application execution environment.

FIG. 15 illustrates an example of how incoming information may be received on a listener and passed on to the main business application execution environment.

1. An event of creating a work order could be captured and configured to publish a message.
2. A subscriber is configured to consume these messages. The subscriber activates the proper invoker to pass the information to an SAP SRM system.
3. A transaction could be performed in SAP through custom code. In this manner, elaborate supplier management can be performed on the SAP SRM system.

The following sections set forth a set of default invokers that are part of messaging service.

FusionInvoker

This component encapsulates the invocation of FusionAPI's. This parses the XML message and derives the business objects and transaction that are to be performed in the business application execution environment (fusion). In case of errors the message will rejected and passed back to the messaging layer and the message will be stored in a separate queue (an error queue that needs user attention).

Each fusion invoker will implement thee methods:
1. Initialize( )
2. Execute( )
3. Release( )

Figure 16:
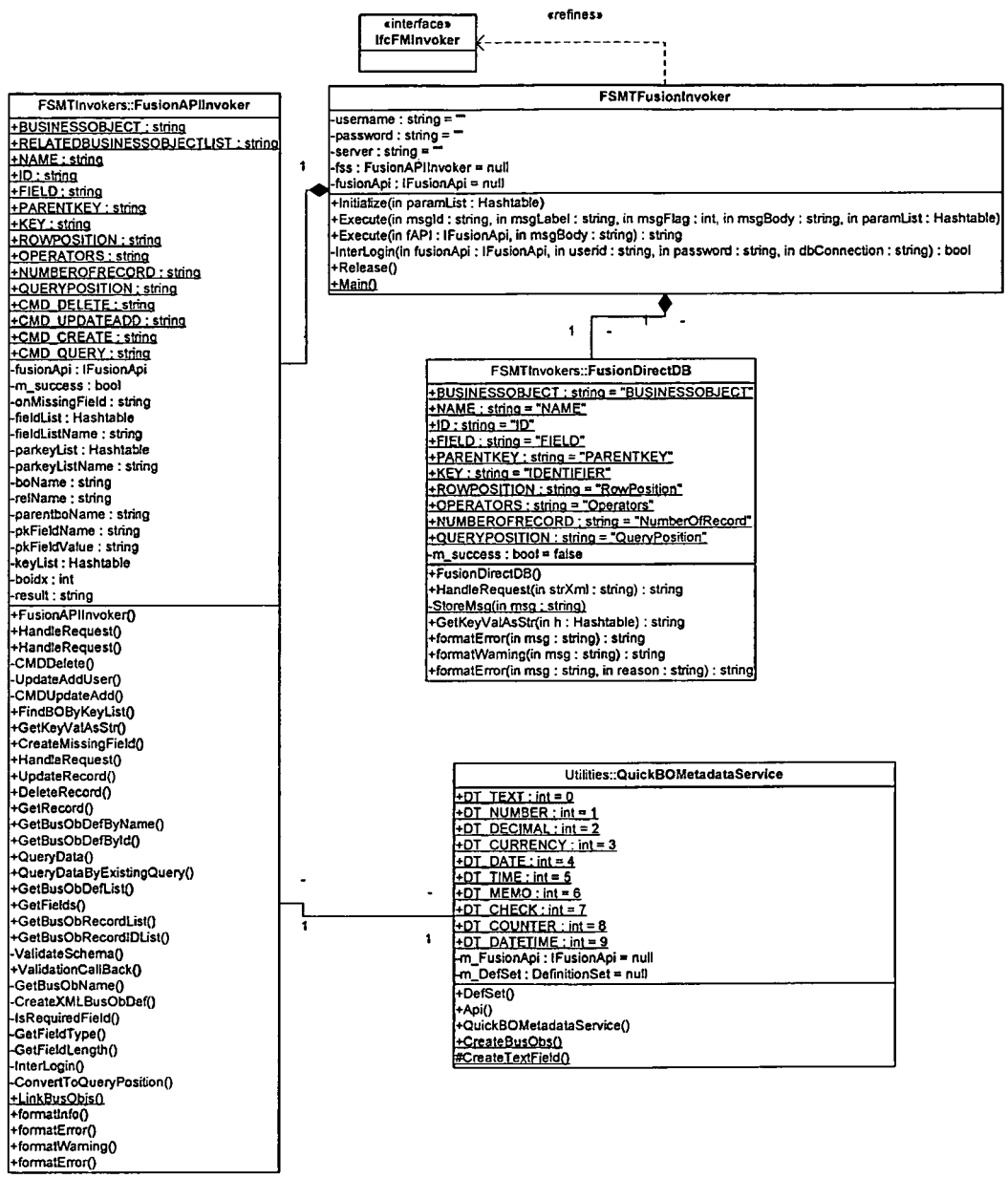
FIG. 16 illustrates an object class diagram that contains important classes that are part of the Fusion Invoker service.

FIG. 16 illustrates an object class diagram that contains important classes that are part of the Fusion Invoker service. The Fusion Invoker component has the "Type" attribute as "Invoker". The following parameters are needed for this component:

HostName: The connection name, typically created using Fusion connection manager.
UserName: User name to perform the transactions.
Password: Encrypted password that should be provided
ReturnQueue: Successful response messages will be place here (not used in the current release)
Location: Log location for the fusion invoker component (the tag will change in the future)

Example Fusion Invoker Configuration:

```
<Component Name="FusionInvoker" Type="Invoker" ThreadCount="1" Transactions="true" WaitForRetryInSec="20">
    <Description>Fusion Invoker</Description>
    <InputQueue>.\private$\tofusion</InputQueue>
    <ErrorQueue>.\private$\tofusion_error</ErrorQueue>
    <ComponentLocation>
    <FullPath>C:\Messaging\FSMTFusionInvoker.dll</FullPath>
    <ClassName>FF.FSMTFusionInvoker</ClassName>
    </ComponentLocation>
    <ParameterList>
        <Parameter Name="HostName" Value="ITSM"/>
        <Parameter Name="UserName" Value="admin"/>
        <Parameter Name="Password" Value="UlcycrPUyPlnRjaCYP"/>
        <Parameter Name="ReturnQueue" Value=".\private$\tofusion_return"/>
        <Parameter Name="Location" Value="C:\FusionInputLogs"/>
    </ParameterList>
    <TransformList>
        <Transform MsgType="SNMP" MsgTypeId="1002">
        <Schema>C:\Messaging\Stylesheets\DiscoveryIQ.xsd</Schema>
        <Stylesheet>C:\Messaging\Stylesheets\D2FMapperSNMP.xml</Stylesheet>
        </Transform>
    </TransformList>
</Component>
```

Web Service Invoker

This is an invoker that communicates with other external webservices that plays a role of document exchange. A soap packet will be passed as a message and this will derive the endpoint & port information from WSDL configured.

The Webservice Invoker component has the "Type" attribute as "Invoker". All invokers are of same type. Only the implementation differs. The implementation is provided in the <ComponentLocation> tag. The following parameters are needed for the webservice invoker component:

ChannelName: The name of the queue for the response/callback
WSDL: The WSDL location the webservice to invoke
EndPoint: The endpoint of the webservice
LogLocation: directory name to log the messages Example Fusion Invoker Configuration:

```
<Component Name="WSZipInvoker" Type="Invoker" ThreadCount="1" Transactions="true" WaitForRetryInSec="20">
    <Description>WS Zip Invoker</Description>
    <InputQueue>.\private$\mb_wszip</InputQueue>
    <ErrorQueue>.\private$\mb_wszip_error</ErrorQueue>
    <ComponentLocation>
    <FullPath>C:\Messaging\FMInvokers dll</FullPath>
    <ClassName>Fusion.Messaging.FMInvokers.WSInvoker</ClassName>
    </ComponentLocation>
    <ParameterList>
        <Parameter Name="ChannelName" Value=".\private$\bp_wszip"/>
        <Parameter Name="WSDL" Value="http://www.webservicex.com/uszip.asmx?WSDL"/>
        <Parameter Name="EndPoint" Value="http://www.webservicex.com/uszip.asmx"/>
        <Parameter Name="LogLocation" Value="C:\FusionInputLogs"/>
    </ParameterList>
</Component>
```

Controller Interface

There shall be separate endpoints/queues in which the external systems can post a command message that controls the messaging service. The configuration of the service can be dynamically altered through the control command messages. For example, a business process engine (BPE) can communicate with messaging service to add an additional webservice invoker that is required for the business process. The BPE will send a control message to the messaging service and the messaging service will create the necessary web service invoker for the given WSDL.

Channel API/Messaging API

A light weight API should be provided to send messages to the destination of interest. A different kind of channel shall be provided to communicate to the messaging system.

The default sendMessage APIs will use the message queue as a underlying transport. However, a developer may decide to use different channel or mechanism to communicate to the messaging system.

Data Import Tool

To load data into the business application execution environment, a batch processing utility will be provided. A directory that contains the message files is specified. An option to translate the message will also be available. Once the user selects the data import, the system will read all the files in the specified directory. The system will then translate the message files as necessary and perform the transactions in the business application execution environment as specified in the message. The message format remains same as used in the messaging. After processing all the files a corresponding response file will be created in the log directory specified so that user can view any data import failures of the message files.

Message Formats and Types

Figure 17:
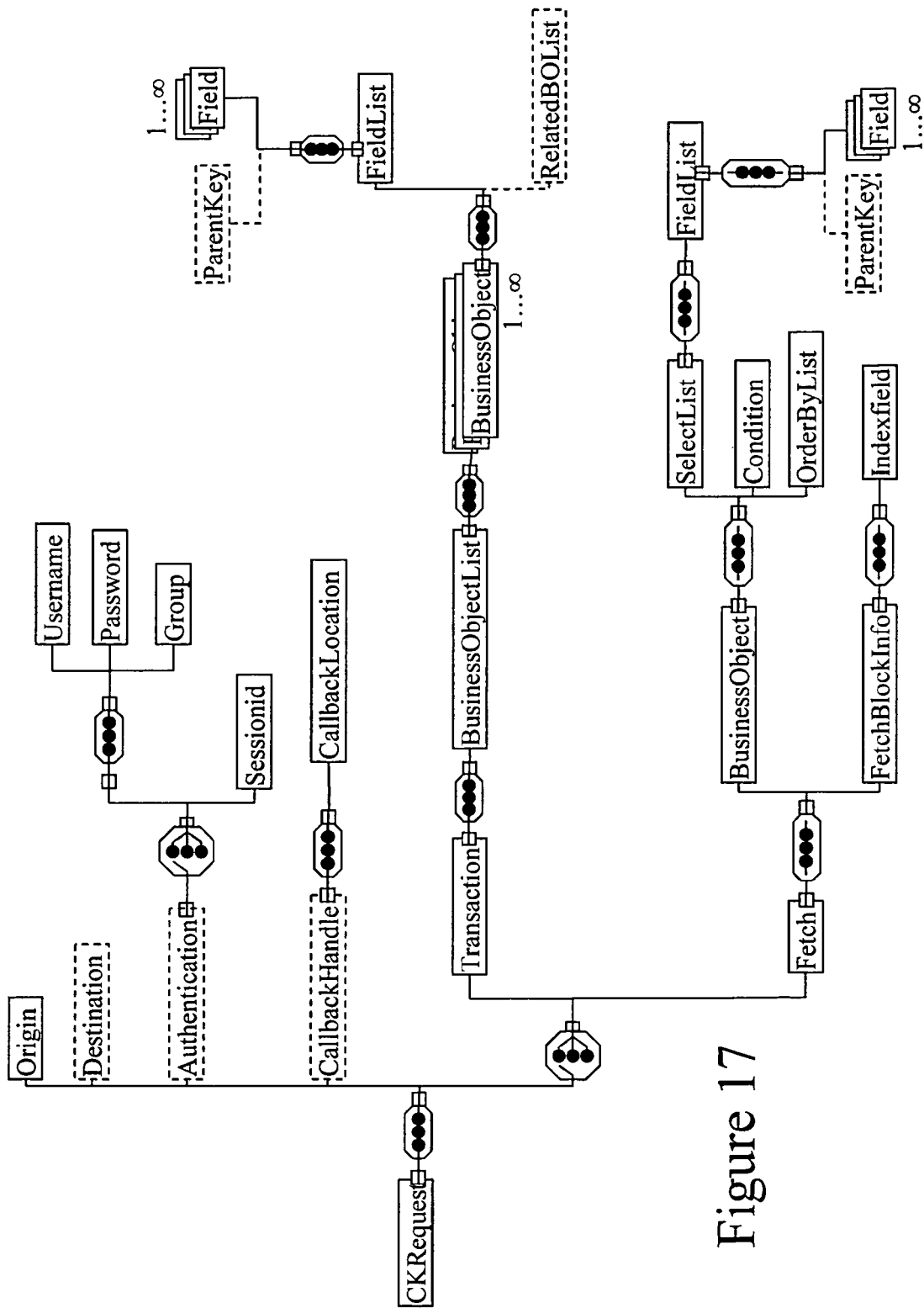
FIG. 17 illustrates a schema diagram for Request.
Figure 18:
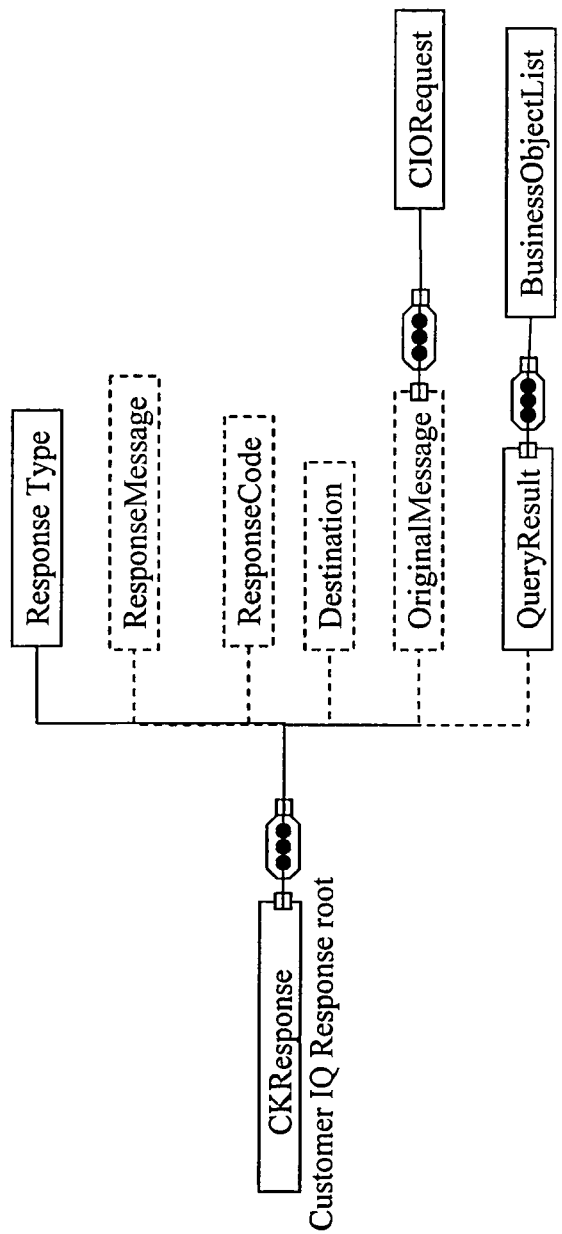
FIG. 18 illustrates the Schema diagram for Response.

A WSDL will be available to interact with the main business application execution environment through web services. A request-response pattern is followed to perform the transactions or querying information from the main business application execution environment. FIG. 17 illustrates a schema diagram for Request. FIG. 18 illustrates the Schema diagram for Response. A set of request and response examples are provided below:

Request of Request/Response Sample 1:

```
<CIQRequest ID="12345" TimeStamp="2001-12-17T09:30:47-05:00"
Encryption="false" Mode="SYNC">
    <Origin>FRCRC</Origin>
    <Destination Type="BR"/>
    <Authentication>
        <Username>test</Username>
        <Password>SFD$$R$#FGGDFD</Password>
        <Group>Admin</Group>
    </Authentication>
    <Transaction Type="Update">
        <BusinessObjectList>
            <BusinessObject Name="CI.Network">
                <FieldList>
                    <Field Name="NetworkDeviceID" Identifier="true">pl-fsl:10.25.8.5</Field>
                    <Field Name="APPLICATION_LAYER">1</Field>
                    <Field Name="CONTACT">Unknown</Field>
                    <Field Name="DEFAULT_GATEWAY">10.25.0.2</Field>
                    <Field Name="Description">Hardware: x86 Family 15 Model 2 Stepping 9 AT/AT COMPATIBLE </Field>
                    <Field Name="IPAddress">10.25.8.5</Field>
                    <Field Name="MACAddress">00 0b db e6 dc 1e</Field>
                    <Field Name="NAME">pl-fsl</Field>
                    <Field Name="NUM_NICS">2</Field>
                    <Field Name="PHYSICAL_LAYER">0</Field>
                    <Field Name="PHYSICAL_MEMORY">1048048</Field>
                    <Field Name="ROUTING">1</Field>
                    <Field Name="SITE">Unknown</Field>
                    <Field Name="SNMP_OID">1.3.6.1.4.1.311.1.1.3.1.2</Field>
                    <Field Name="SNMP_OID_STR">RFC1213-MIB|enterprises.311.1.1.3.1.2</Field>
                    <Field Name="SUBNET_IP">10.25.0.0</Field>
                    <Field Name="SWITCHING">0</Field>
                    <Field Name="TRANSPORT_LAYER">1</Field>
                    <Field Name="VENDOR">microsoft</Field>
                </FieldList>
            </BusinessObject>
            <BusinessObject Name="SupportingCI.NIC" Parent="CI.Network">
                <FieldList>
                    <ParentKey Name="NetworkDeviceID">pl-fsl:10.25.8.5</ParentKey>
                    <Field Name="IPAddress">10.25.8.5</Field>
                    <Field Name="NAME">pl-fsl</Field>
                    <Field Name="NIC_ADMIN_STATUS">up 1</Field>
                    <Field Name="NIC_OPER_STATUS">up 1</Field>
                    <Field Name="NIC_PHYS_ADDRESS"/>
                    <Field Name="NODE_NIC_DESCR">MS TCP Loopback interface</Field>
                    <Field Name="NODE_NIC_INDEX" Identifier="true">1</Field>
                    <Field Name="NODE_NIC_MTU">1500</Field>
                    <Field Name="NODE_NIC_SPEED_BPS">10000000</Field>
                    <Field Name="NODE_NIC_TYPE">softwareLoopback 24</Field>
                </FieldList>
            </BusinessObject>
        </BusinessObjectList>
    </Transaction>
</CIQRequest>
```

Response of Request/Response Sample 1:

```
<?xml version="1.0" encoding="UTF-8"?>
<CIQResponse ID="12345" TimeStamp="2001-12-17T09:30:47-05:00"
Mode="Sync" Encryption="False">
    <ResponseType
        TotalProcessTime="3000">SUCCESS</ResponseType>
    <ResponseMessage>Update was successful</ResponseMessage>
</CIQResponse>
```

Request Sample 2 (Delete)

```
<?xml version="1.0" encoding="UTF-8"?>
<CIQRequest ID="12345" TimeStamp="2001-12-17T09:30:47-05:00"
Encryption="false" Mode="SYNC">
    <Delete>
        <BusinessObjectList>
            <BusinessObject Name="Incident">
                <FieldList>
                    <Field Name="IncidentNumber" Identifier="true">168</Field>
                </FieldList>
            </BusinessObject>
        </BusinessObjectList>
    </Delete>
</CIQRequest>
```

Request Sample 3 (Control Request):

```
<?xml version="1.0" standalone="no"?>
<Services>
    <Service>
        <definitions name="TemperatureService"
        targetNamespace="http://www.xmethods.net/sd/TemperatureService.wsdl"
        xmlns:tns="http://www.xmethods.net/sd/TemperatureService.wsdl"
        xmlns:xsd="http://www.w3.org/2001/XMLSchema"
        xmlns:soap="http://schemas.xmlsoap.org/wsdl/soap/"
        xmlns="http://schemas.xmlsoap.org/wsdl/">
            <message name="getTempRequest">
                <part name="zipcode" type="xsd:string"/>
            </message>
            <message name="getTempResponse">
                <part name="return" type="xsd:float"/>
            </message>
            <portType name="TemperaturePortType">
                <operation name="getTemp">
                    <input message="tns:getTempRequest"/>
                    <output message="tns:getTempResponse"/>
                </operation>
            </portType>
            <binding name="TemperatureBinding"
            type="tns:TemperaturePortType">
                <soap:binding style="rpc"
                transport="http://schemas.xmlsoap.org/soap/http"/>
                <operation name="getTemp">
                    <soap:operation soapAction=""/>
                    <input>
                        <soap:body use="encoded" namespace="urn:xmethods-Temperature"
                        encodingStyle="http://schemas.xmlsoap.org/soap/encoding/"/>
                    </input>
                    <output>
                        <soap:body use="encoded" namespace="urn:xmethods-Temperature"
                        encodingStyle="http://schemas.xmlsoap.org/soap/encoding/"/>
                    </output>
                </operation>
            </binding>
```

```
        <service name="TemperatureService">
            <documentation>Returns current temperature in a given U.S.
zipcode </documentation>
            <port name="TemperaturePort"
binding="tns:TemperatureBinding">
                <soap:address
location="http://services.xmethods.net:80/soap/servlet/rpcrouter"/>
            </port>
        </service>
    </definitions>
</Service>
</Services>
```

The following list describes are some critical events errors will be logged and/or notified to the administrators.

- If the Handler cannot write the event message to the queue, the error will be logged
- Handler or adapters fails to load.
- Configuration files are not properly setup.
- If the adapter returns a 'service not available' flag, the messaging service will retry several times before logging errors or warnings. The message will be left in the queue. As soon as a system available status is received from the adapter the message will be processed and removed from the queue.

Security Considerations

Integrated authentication will be used. Message queues will have their own security and will be used in conjunction with windows authentication.

Secure Socket Layer (SSL) encryption should be used for the Webservices and any communication over HTTP. All Passwords that are stored in a configuration file should be encrypted. An option to encrypt the messages should be available.

GUI-based Business Process Creation

One of the most important features of the business application development and execution environment of the present invention is the graphical user interface (GUI) based "Workflow Designer" that allows ordinary users to create sophisticated Business Process Markup Language (BPML) based business process applications.

The Workflow Designer is an application created to simplify process of defining a Business Process so the business process can be run on a BPML (Business Process Markup Language) engine. A BPML Engine executes or interprets BPML documents, an industry standard for defining business processes. BPML documents are an XML document form developed by an industry group BPMI.org. Developing BPML documents by hand is a very difficult process such that a common user cannot easily develop BPML documents alone. Thus, Workflow Designer was designed to allow people to define a business process using visual tool that does not require knowledge of XML nor BPML.

The ability to create and define a business process in the user friendly environment of the Workflow Designer is very useful in many Business Process frameworks. BPML provides robust extensive way to describe a business process but it is difficult task for a business person that lacks the requisite technical knowledge. In addition to knowledge of BPML (that requires understanding XML), the process of creating a business process requires intimate knowledge of Web Services Definition Language (WSDL) and XML Schema Definition (XSD). Knowledge of these technologies is required since BPML defines web services as a default interface between BPML Engine and outside world.

The Workflow Designer provides friendly graphical user interface to make business process design task simple for any user. Workflow Designer uses well-known Graphical User Interface (GUI) technologies such as drag-and-drop, wizards, property editors, and so on. Thus, with Workflow Designer, the only knowledge required of the business process designer is the knowledge of the business process he or she wants to create. No knowledge of BPML, XML, WSDL, XSD, XPath, XQuery, or any other esoteric technology is required.

The manual steps of a business process (performed by a human operator) and/or automated tasks that are not under control of BPML Engine can be integrated in the business process definition using the Workflow Designer so flowcharts of the package could provide overview of whole process not broken in parts by functional units that perform steps.

In one embodiment, the Workflow Designer connects with the engine at runtime so the Workflow Designer can be used as live process monitor and/or integrated process debugger.

Operation of the Workflow Designer

Figure 19:
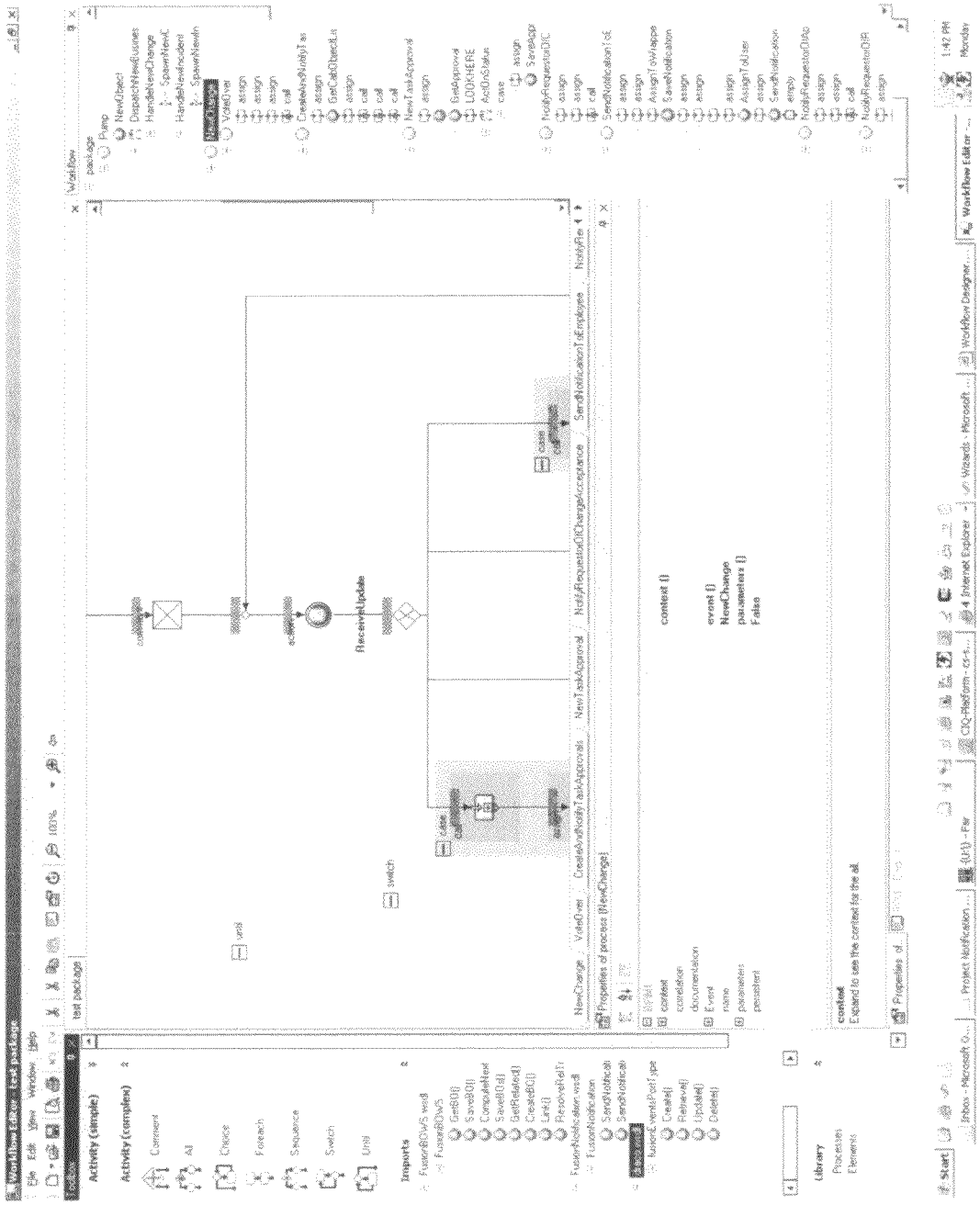
FIG. 19 illustrates one possible implementation of a graphical user interface used by Workflow Designer that allows a user to graphically define a business process.

FIG. 19 illustrates one possible implementation of a graphical user interface used by Workflow Designer that allows a user to graphically define a business process. After graphically defining the business process, Workflow Designer outputs BPML code that describes the business process created in the Workflow Designer graphical user interface.

Flow Chart

Center part of workspace is taken by flow chart of the active business process. This is the main working area for a process author. The flowchart is the dropping target for business process elements obtained from the toolbox. The flow chart area also provides access to the details of a single element in a business process.

Toolbox

The toolbox is a collection of different elements that could be used to define a business process.

Activities

The activities section lists all elements defined by BPML that used to describe a process. The activities section provides access to the structural elements of the BPML such as loops, conditions, assignments, and so forth. The activities section also provides access to low-level activities for users that are knowledgeable about BPML, WSDL, XSD, XPath, XQuery, and the other low-level primitives used to define a business process.

Imports

The imports section lists all external elements that were imported. These could include WSDL and/or XSD files. During import process these files are translated into GUI elements that can be easily used be a process author in the process definition. When one of these elements is dropped onto flowchart the Workflow designer generates correct BPML to accommodate it.

Library

The library represents a predefined set of process, sub processes, and code snippets that can be reused in the multiple places of the package. The library will include many useful pieces in the Workflow designer and can be extended and modified at any time during designer usage.

Workflow

The Workflow section provides hierarchal view on the package that holds processes definition. It could be used for easy navigation through the package as well as lookup and other functionality.

Properties

Properties page provides access to details of the active element selected in the flowchart view.

Output

The result of the Workflow Designer is a BPML file that is feed to a BPML engine as input. The file that produced by the designer is compliant with BPML specification so it could be ran by any engine that implements the standard. Detailed information on the Workflow Designer can be found in the document " " included herewith.

The system of the present invention includes a Dashboard designer that allows a user to create graphical user interface based programs that allow business objects to be mapped on a graphical user interface screen. Specifically, a Dashboard application provides real-time reporting on screen. The various elements of a dashboard screen, such as pull-down menus, are drag & drop customizable.

The designed business applications may include business rules that allow the designer to create any trigger and action relationship. Triggers may be created from events, timers, business object properties, and nearly any other accessible property. A large defined set of actions allow the designer to adjust business objects, execute programs, send messages, and other useful actions.

A special search group function allows the business application to search for a specific value or search using meta-data criteria. The use of meta-data allows for extensible applications.

The business application execution includes a sophisticated messaging infrastructure that allows a BPML based application to communicate with other applications using a wide variety of communication systems. Specifically, the messaging infrastructure allows a BPML based application to import and export XML data, send and received email, get and send files with ftp. A parser in the messaging infrastructure allows the BPML based application to identify and retrieve specific information within email messages and files. This messaging infrastructure allows for power publish and subscribe features. Note that this message infrastructure is decoupled from the BPLM application but allows for easy communication with the BPML application.

External table support allows for two-way communication with various different database systems. The system can securely connect to a database and then retrieve, change, and add information according to the needs of the BPML based business application. Note that the business rules of the BPML execution environment allow for database rules to be emulated such that required fields will be filled.

A snap-in module system has been provided to allow easy connection to other applications created in other languages or other environments. These applications can be integrated provided that they follow the Microsoft .net interface.

Design, Creation, and Execution of an Example Business Application

A number of business applications have already been created with the business application development and executing environment of the present invention. To provide detailed information on how the business application development and executing environment of the present operates, this section will present information on the design, creation, and execution of example business applications.

IT Service Management Application

A first example business application is an IT Service Management application. The IT Service Management application is generally used for documenting technical problems, tracking the technical problems, and documenting the solution. The IT Service Management application is designed to provide the following key components:

The Service Desk
Incident Management
Problem Management
Change Management
Release Management The following are underlying components to Service Management:

Service Level Management
Configuration Management Database

A sample usage of the IT Service Management application begins when an employee experiencing problems with e-mail contacts an IT Service Desk that uses the IT Service Management application. The Service Desk analyst creates an Incident record for the problem and identifies the correct symptoms experienced by the employee. The analyst checks the Configuration Management Database for related Configuration Items. Still unable to find the root cause of the e-mail trouble, the analyst creates a Problem record. After researching and diagnosing the Problem the analyst may solve the problem. A Change Request is created to document the solution to the problem. The Change Manager reviews the request for Change and, when approved, sends the request with attendant costs, time, and impact to the Change Advisory Board for approval. When approved by the Board, a Release record is created to provide the structure for testing the security group before implementing in the live environment. After a successful release of the solution, the Release record is updated as closed, the Change record is closed, and the Problem record is closed. The analyst notifies the employee and confirms the resolution of the Incident before closing the Incident record.

Incident Management

Figure 20:
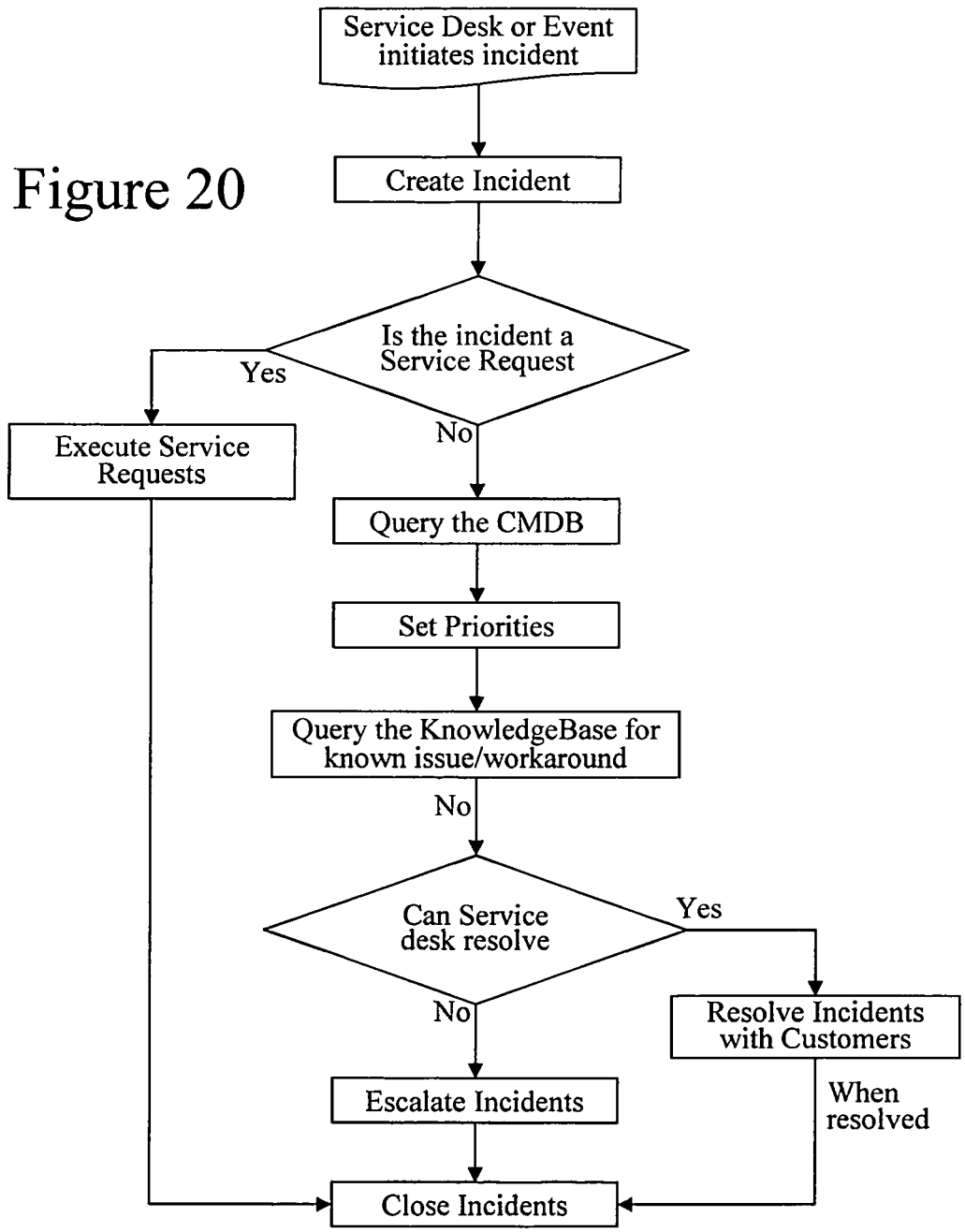
FIG. 20 illustrates the general flow of incident management.

FIG. 20 illustrates the general flow of incident management. Referring to FIG. 20, initially an analyst creates an Incident record. Each Incident may have a linked customer and can be associated with Child objects such as Configuration Items, a resolution, tasks, journal entries, and attachment records, allowing one to track the life cycle of the issue through the resolution.

In some cases, an Incident may be a Service Request. Service Requests are straightforward requests to IT for changes for which well-defined IT procedures already exist. Service requests include such things as moving PCs, processing new employees, or resetting passwords. Unlike an Incident, which is an interruption in service, a Service Request requires you to create an Incident, indicate it is a Service Request, and then follow your organizational guidelines for processing and executing the service request.

Referring back to the procedure for an incident, the analyst first queries the Configuration Management Database (CMDB). The Configuration Management Database (CMDB) stores information about Configuration Items (CIs). Typically, when a new customer is added to the system, IT links CIs assigned to or associated with the customer. To resolve Incidents, diagnose Problems, or implement Changes, it may be necessary to query the CMDB for more information about the network and to link discovered CIs to the Business Object with which you are working, such as Incident, Problem, or Change.

Setting the priority for an Incident is a process that works with Urgency, Impact, and the customer's Service Level Agreement (SLA) to calculate the Response Time and Resolution Time.

Next, the analyst may query the Knowledge Base. Tracking Known Errors and workarounds is an important part of Service Management. Using and adding to the Knowledge Base is an important part of Incident Management, which allows one to query the Knowledge Base based on the Subject field on the Incident form.

In many cases, the Service Desk can resolve the Incident. If so, the desk notifies the customer, assigns codes, and closes the Incident. In other cases, it may be necessary to escalate the Incident because it needs further research or because it is indicative of a Problem. When the Service Desk is unable to resolve an Incident in the time required by the Service Level Agreement (SLA), the Incident is escalated. An organization's escalation procedures should be clearly defined and well implemented when upgrading an Incident to 2nd or 3rd level support. It is often necessary to create a Problem or Request for Change based on an Incident.

Communication is an important part of good Incident Management. Keeping the customer apprised of the progress and resolution of an Incident ensures you maintain excellent customer service within your organization. After resolving an Incident, an analyst can add the solution to the Knowledge Base. This process increases the shared knowledge, reducing the time required to resolve similar Incidents. Coding and closing the Incident allows you to determine when Incidents are resolved and to provide coding information that helps you to classify root causes.

Problem Management

Problem Management is a process aimed at eliminating recurring Incidents from the IT infrastructure in order to provide a more stable environment for improved business and customer productivity. The goal of Problem Management is to minimize the impact of recurring Incidents and Problems on your business. A Problem is a condition identified by multiple Incidents exhibiting common symptoms, or it is a single Incident indicative of a single error with no known cause.

The "Problem Board" is a primary Problem Management tool. The Problem Board provides a common interface to allow one to create, modify, and navigate among targeted Problems and their associated Incidents and Changes. When problem management is defined for a user's Role, then the Problem Board is located on that person's Control Panel.

Figure 21:
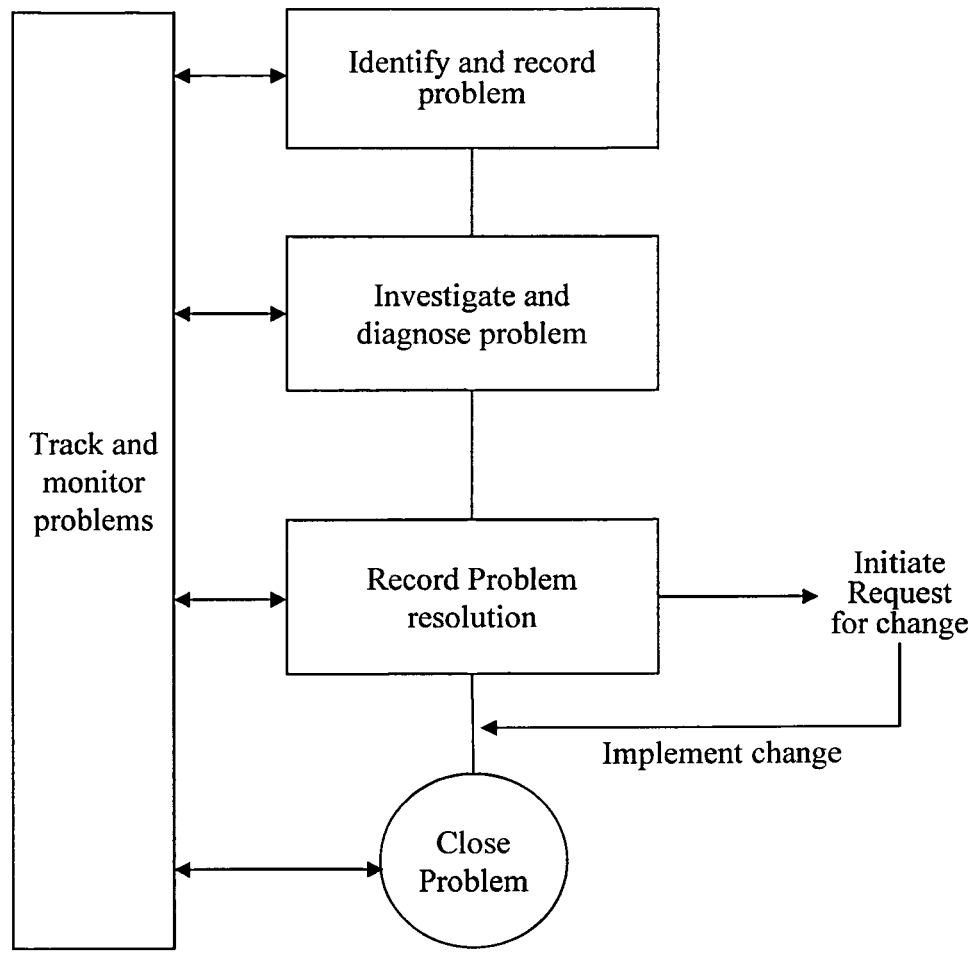
FIG. 21 illustrates the general flow of problem management.

FIG. 21 illustrates the general flow of problem management. The tracking and monitoring of Problems is a constant process of identifying and resolving Problems and Known Errors. Problems are Interruptions in service that are identified by multiple Incidents with the same symptoms or a single significant Incident, and with unknown causes. Known Errors are Problems for which the root causes have been identified and now must be eliminated.

The problem monitoring process includes the process of trending, where the manager evaluates Incidents and Configuration Items to identify Problems. Problems are IT infrastructure errors that are the cause of one or more Incidents or Known Errors. The ongoing process of tracking and monitoring your system creates the need to identify and record specific Problems. The identification of Problems is the outcome of the tracking and monitoring process. Identified problems are recorded in the IT Service Management system.

The goal of Problem Management is to investigate and diagnose the root cause of problems and prevent recurrences. The resolution of a Problem is the identification of the underlying cause of an issue. A resolution does not mean there is an immediate solution. Recording a resolution does not mean the Problem is closed. The resolution may require a Request for Change before the system is altered enough to ensure the error does not recur.

After the successful resolution of a Problem by identifying and remedying the underlying cause of the Problem or Known Error, the Problem is closed.

Change Management

Change Management is the process of assessing and detecting any impact and potential risk a proposed change could inflict on your organization before the change is implemented. A change is an action resulting in a new status for one or more configuration items. The goal of Change Management is to ensure the use of standardized methods and procedures for efficient and prompt handling of all Changes, minimizing the impact of Change-related Incidents, and improving daily operations.

A key component for effective Change Management is the proper processing of Requests for Change. This does not mean reducing the number of requests over time, but keeping a good balance between Requests for Change and the impact of changes. Once approved, a Release Management begins the Release process. Part of that process includes creating a back-out plan. The best planned action, when implemented, could fail. It is important to have a plan for getting back to an operational point.

The "Change Board" is a primary Change Management tool, providing a common interface for you to create, modify, and navigate among targeted Changes and their associated Incidents and Problems. When it is defined for a person's Role, then the Change Board is located on that person's Control Panel.

Figure 22:
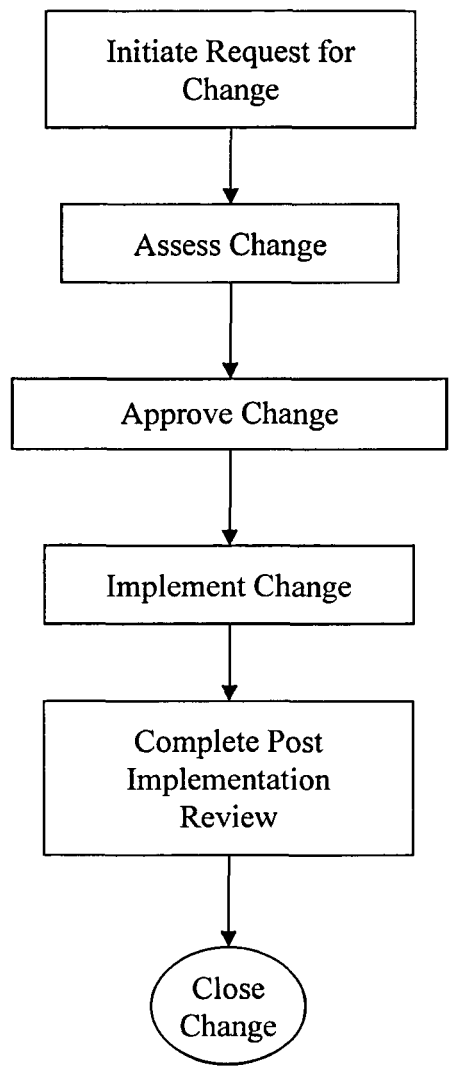
FIG. 22 illustrates the general work flow for change management.

FIG. 22 illustrates the general work flow for change management. The successful resolution of Problems may require Requests for Change (RFC). Changes are the result of Problems that require remedying or are proactive business decisions aimed at reducing cost or improving service. After a Request for Change is submitted, the Change Manager performs an initial assessment of the change request and either accepts or rejects the change request. If rejected, the requester is notified. If accepted, the Change Manager convenes the Change Advisory Board (CAB). The Change Manager should get approval from the Change Advisory Board (CAB), which includes representatives who can evaluate and approve the financial, technical, and business impact of a Change request.

When an approved Change is ready to be built, tested, and implemented, the most effective way for the Change Manager to organize and manage the process is using Tasks. An implemented Change requires a post implementation review. The most effective way for the Change Manager to organize and manage the review is using Tasks. When a Change is successfully implemented and reviewed, you can update it as Closed.

Release Management

Release Management encompasses the planning, designing, building, configuration, and testing of hardware and software in order to create Release components ready for implementation in a live environment. A Release is initiated as part of the Change Management process. The Release Management process ensures a Change is implemented in the live environment only after full preparation and testing.

Service Level Management

Service Level Management ensures IT provides the level of service required for your organization to meet business needs. Using Service Level Management, IT can maintain and improve service quality through constant processes that involve creating agreements with customers, implementing processes to meet those agreements, and then monitoring and reporting on the success. When the process is not successful, steps are taken to eliminate the poor service while keeping IT service in line with business needs and cost justification. Two elements of Service Level Management are the Service Catalog (providing a list of IT services, default levels, and options) and Service Level Agreements (SLAs), providing specific targets against which IT performance is measured.

A Service Level Agreement (SLA) is an agreement between the IT service provider and the customer documenting the agreed-upon service levels for the service. The details specified include service hours, availability, reliability, support hours, and response time.

A Service is one or more IT systems enabling a business process. Generally the services could be business services, infrastructure services, network services, or application services. The Service Catalog is a list of all the services and a summary of their characteristics, including the availability and the target response and resolution times.

Configuration Management Database

The Configuration Management Database (CMDB) is the database holding a complete record of all configuration items (CIs) associated with your IT infrastructure. The CMDB is at the core of the FrontRange Service Management application. The Incident, Problem, Change, and Release processes perform data dips into the CMDB and also populate the CMDB with up-to-date information.

Configuration Items

According to the Information Technology Infrastructure Library (ITIL), Configuration Items (CIs) are servers, environments, equipment, network components, desktops, mobile units, applications, licenses, telecommunication services, and facilities. CIs focus on hardware, software, and documentation. The Configuration Item tab displays Configuration Items already linked to the Parent object. As you research and diagnose issues, it may be necessary to link other CIs to the Business Object.

Employees

When IT supports organizational business services, your first customers are employees. Service Management makes effective use of complete employee information by linking employees to the following Business Objects:

Incident: Lists all Incidents linked to the Employee.
Change: Lists all Change requests linked to the Employee.
Configuration Item: Lists all Configuration Items (CIs) linked to the Employee. The linking of CIs allows analysts to avoid tedious questioning regarding the employee's equipment and services.
Service Level Agreement: Lists the Service Level Agreements (SLAs) applicable to the Employee.

Information Technology Infrastructure Library (ITIL)

The Information Technology Infrastructure Library (ITIL) provides a set of internationally recognized best practices focusing primarily on IT service management and delivery. The ITIL practices are designed in response to the growing dependency businesses and organizations have on successful IT services. ITIL provides a firm foundational process for high-quality service management in commercial and public sector environments, applies to both distributed and centralized systems, and is scalable to large and small systems.

Now an international standard, ITIL was originally created as a British standard and achieved international status because it provides:

A series of guidelines for aligning IT services with your business requirements.
A set of non-proprietary best practices serving as a framework that allows you to implement the ITIL processes in the way best suited to your businesses requirements.
A way to measure optimized service provision at a justifiable cost.

One can use the ITIL framework to create an approach to IT infrastructure management using all or only parts of the framework that address your particular business goals.

Information Technology Infrastructure Library (ITIL)

Following a use case scenario, this section walks through the process of creating a basic IT Service Management (ITSM) system from start to finish. In this example, an ITSM application is created for the hypothetical organization, Nurses, Inc. This organization provides three main services: Physical therapy, Equipment rental, and Patient transportation. The task is to build the necessary structure that enables Nurses, Inc. employees to fill out and track a service request, Before beginning work in ITSM, one should note the needs of the application and begin planning how to implement those needs. First, one maps how employees should fill out and track a service request for the physical therapy service. A simple flow diagram is set forth in FIG. 23. Secondly, identify the key business component for each of the mapped needs. A simple flow diagram is set forth in FIG. 24. Each of these business components needs an ITSM Business Object through which it can display and store data. Business Objects can be Master or Standard. Master objects store core information, stand on their own, and can contain Standard objects (that is, they can function as a parent in a Business Object Relationship). Standard objects supply additional information to the Master object and cannot contain other objects. Standard objects rely on as well as support a Master object, and they function as a child in a Business Object Relationship.

In our example application, two objects are created: a service object and a Workorder object. The objects are creates as follows:

| Business Component | | |
|---|---|---|
| Object Characteristics | Service | Workorder |
| Stores core information | X | |
| Stands on its own | X | |
| Supplies additional information | | X |
| Supports another component | | X |
| Needs to contain another component | X | |
| Object type | Master | Standard |

The Service business component is a Master Business Object that:
Stores service information, a component fundamental to the Nurses, Inc. business.
Does not depend on any other business component. Service should stand on its own.
Needs to include the ability to generate a work order required by the service requested. Service should be a.

The Workorder business component is a Standard Business Object that:
Supplies additional information to the service requested (a work order is superfluous without the service the patient needs).
Supports the Service component.

Business Object Relationships let the records housed in two objects to work together. When a Master object needs to include information from another object, create a relationship between the objects. A Parent object: Functions as the center of a relationship. A Child object assists this parent by supplying it with additional data. Note that a Master object can function as a parent or a child. A Standard object can function only as a Child object. In our example, Service, a Master object, needs to include information from the standard Workorder object.

ITSM supports two main types of Business Object Relationships: Contains and Associates. With a Contains relationship, the Child object belongs to and depends on the Parent object. With an Associates relationship, the Child object is relevant to the Parent object but does not belong to the parent. The Child object can and should be independent in an Associates relationship.

Records in relationships can be tied together or constrained in these cardinality manners: One-To-One, One-To-Many, or Many-To-Many. In a One-To-One relationship, the Parent record has a one-to-one relationship with a Child record; that is, the parent has only one child. In a One-to-many relationship, the Parent record has a one-to-many relationship with its children; that is, the parent has several children. In a Many-to-many (Ad hoc) relationship, the Child record has a relationship with more than one Parent record.

Figure 25:
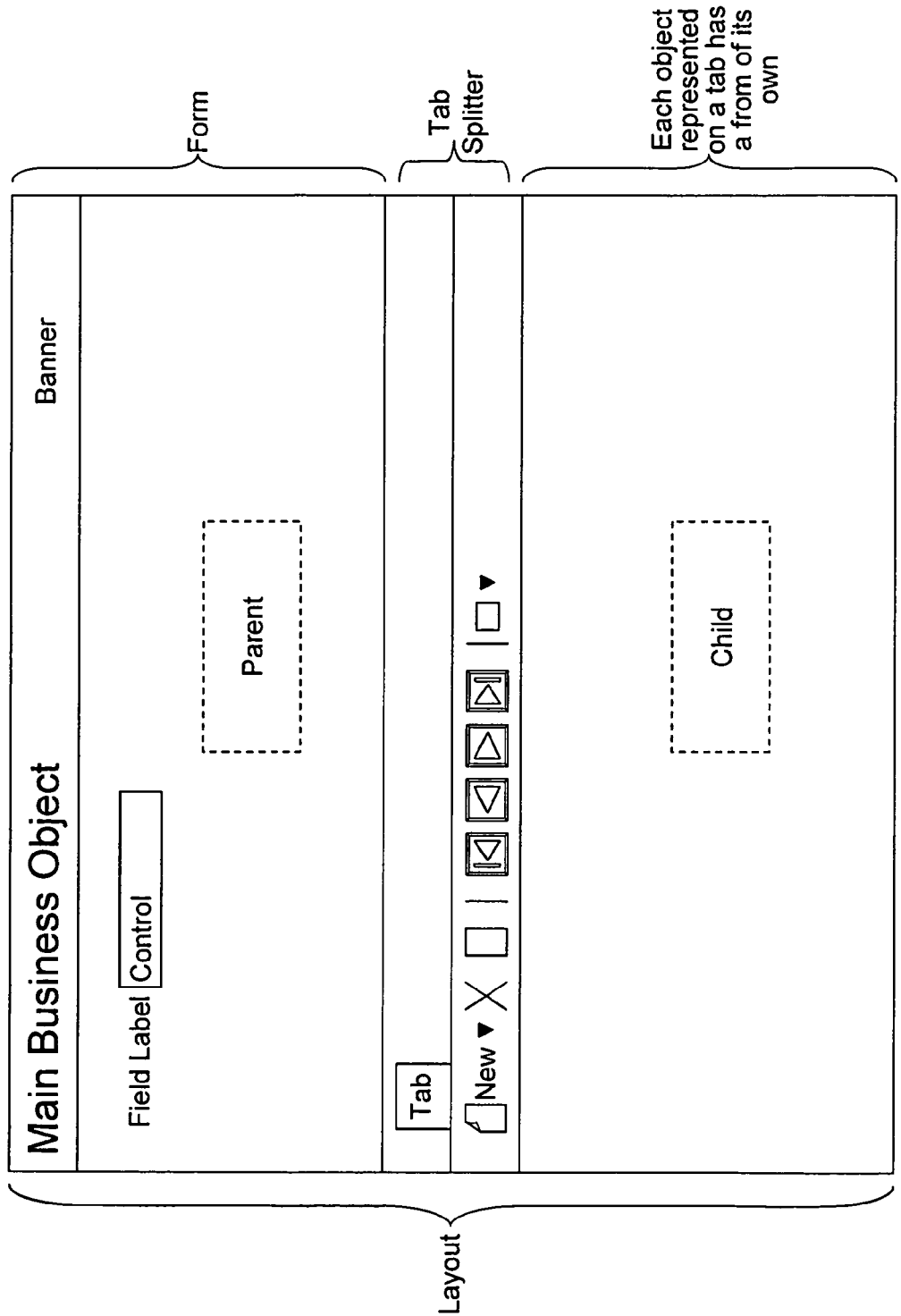
FIG. 25 illustrates the creation and layout of a form for some created business objects.

A form is a graphical display used to present and capture field information. The actual Business Objects provide the foundation for a form. Fields contained in the object definition are the parcels of information that one can place on a form. FIG. 25 illustrates the creation and layout of a form for the created objects. While each Business Object may be represented with one or more forms, a layout is a collection of forms, tabs, grids, and splitters that displays a Parent record and its Child records. Forms are created from the following components: Fields, Controls, and Labels. Fields are Parcels of information within a Business Object. Controls are form items that can be individually selected and manipulated (for example, date/time box, check box, splitter, and so on). Labels are simply text that identifies the control.

Layouts are created from the following components: Forms, Tabs, Tab containers, and Tab splitters. Forms are Graphical displays of fields. Tabs are Graphical displays of Child objects. Tab containers display the content of tabs. And a Tab splitter is a Separator line between Parent and Child objects.

The following table lists the components of a Service Form:

| Banner | Description |
| --- | --- |
| Service | Display a banner at the top of the form. |

| Fields | Description | Control |
| --- | --- | --- |
| Service | Choose the type of service (Physical Therapy, Equipment, Transportation). | Combo box |
| ServiceID | Show the service ID number, generated from an automatic, incremental counter. | Number box |
| SSN | Record the patient's social security number or patient ID. | Number box with a mask that formats the number as NNN-NN-NNNN |
| FirstName | Record the patient's first name. | Text box |
| LastName | Record the patient's last name. | Text box |
| Address | Record the patient's address. | Text box |
| City | Record the patient's residential city. | Text box |
| State | Record the patient's residential state. | Text box |
| Zip | Record the patient's zip code. | Number box |

The following table lists the components of a Workorder Form:

| Fields | Description | Control |
| --- | --- | --- |
| Service | Choose the type of service related to this work order. | Combo box (duplicate field from Service form) |
| PhysicalTherapist | Record the name of the therapist assigned to this service request. | Text box; when filled, this text box should create an assignment for the therapist using QuickActions |

Based on these components, one should decide how the Service form and the Workorder form should appear. FIG. 26 illustrates one possible hand-drawn service request form. Because Service is a Parent to Workorder, Service will be the main form, and Workorder will display as a tab. Both forms will use fields to display and accept information.

Summary Checklist

At this point, the organization, Nurses, Inc., needs the ability to enter a service request for their three services: physical therapy, equipment rental, patient transportation. When the user selects one of these services, they need to have the ability to fill out a work order. To facilitate this requirement, the application will need these:

Business Objects:
  Service (Master object)
  Workorder (Standard object)
Business Object Relationship:
  Contains relationship between Service and Workorder (Service is parent; Workorder is child).
Forms:
  Service
  Workorder
Fields:
  Service needs fields for the service requested, service request ID, and patient information.
  Workorder needs fields for the service and the employee assigned to carry out the workorder or the inventory item needed to fulfill the request. Counter
  Each new service request is given an automatically generated ID number.

Application Creation

After having planned the business application and outlined the components necessary to fill out a service request and a Workorder objects, use the Application Administrator to create the application.

First, one should create the Service Master object. This is started by first Adjusting Customization Levels and Navigating to the Business Definition Editor 1. Launch and log on to the FRS Application Administrator.
2. From the FRS Application Administrator main window, select Definition Set, and then select New Definition Set. The Business Definition Editor window appears. Note that the Definition Set stores the changes and additions made to Business Objects and object components. One can then commit the Definition Set to a live or test system to see the changes reflected in the ITSM application.
3. Select File>>Customization Level to bring up the Customization Level Authorization dialog box.
4. Type your editor ID and password. Note that the Customization Level ID and password, valid for the current session only, unlocks restrictions on creating Master Business Objects. This ID works with a *.unlock file, issued to the ITSM Administrator.

Then, one needs to work through the Business Object Wizard to create the actual object:
1. Select Definitions>>New Business Object Definition to bring up the Business Object Wizard.
2. Review the Welcome page and click Next to bring up the Type Selection page.
3. Select Master or Standard. (Note: If Master is not an option, you may not have the proper Customization Level.)
4. Click Next. The Name and Description page appears.
5. In the Name text box, type Service.
6. In the Description text box, type Records Nurses, Inc. service requests.
7. Click Next.
8. Select to use the object As a Master object.
9. Click Next.
10. Click Finish to save the definition. The Service object is "temporarily" added to the system (we will permanently add it later when we commit the Definition Set). The Service object appears in the navigator bar. With the object, ITSM also creates fields, such as CreatedBy, CreatedDateTime, and RecID. Use these fields or change them later to more closely reflect the object requirements.

Next, one creates the Workorder object as a Standard Business Object. This and the following sections assume that one has not exited the Application Administrator after creating the Service Master Business Object:
1. Select Definitions>>New Business Object Definition. The Business Object Wizard appears.
2. Review the Welcome page and click Next. The Type Selection page appears.
3. Select Master or Standard.
4. Click Next. The Name and Description page appears.
5. In the Name text box, type Workorder.
6. In the Description text box, type Records a work order for the service request.
7. Click Next. The Business Object Use page appears.
8. Select to use the object As a Standard object.
9. Click Next. The Congratulations page appears.
10. Click Finish to save the definition. The Workorder object is "temporarily" added to the system (we will permanently add it later when we commit the Definition Set). The Workorder object appears in the navigator bar. Like the Service object, it also comes in with several default fields.

After creating the two objects, the relationship between the two objects is defined. Specifically, one will create the 'contains' relationship between the Service parent and Workorder child objects.
1. In the Business Definition Editor Navigation pane, click Master Business Object in the navigator bar and ensure Service is selected.
2. Select Definitions>>New Relationship. The Business Object Relationship Wizard appears.
3. Review the Welcome page, and click Next. The Child Name and Relationship Type page appears.
4. In the Child object box, select Workorder, and click Next. The How Many Children page appears.
5. Select Allow many child records, which will allow more than one work order for a service request. Click Next. The Physical Relationship Links page appears.
6. Select to link child records to their parent via the standard constraint. Note that the standard constraint is the typical relationship constraint. It facilitates the link between parent and child by creating a Parent Link field, housed in the child (Workorder), which stores the parent's RecID.
7. Click Next to bring up the Name and Description page.
8. Accept the default Relationship name and Display name; the Display name appears in the navigator bar under the object's Relationships heading.
9. In the Description text box, type Relates the Workorder child object to the Service parent object. Click Next to bring up the Confirmation page.
10. Click Finish to save the definition. The relationship is "temporarily" added to the system (we will permanently add it later when we commit the Definition Set). The ServiceContainsWorkorder relationship appears in the navigator bar. The relationship only appears under the Service Business Object. This will cause the relationship as well as the fields appear in italics in the navigator bar. At this point they are saved in the Definition Set, but they have not been committed to the system.

Next, forms must be created for entering and viewing data for the objects. Specifically, two forms must be created: a Service form and a Workorder form. After creating the Service Business Object, ITSM automatically created blank forms. These forms appear in the navigator bar under Displays. The four types of displays that are available are:
Panel: The basic form.
Brief Panel: A special read-only form often used on a layout to display Master-Child objects. Brief panels are usually labeled Summary so users know they cannot edit information on them.
Grid: A tabular display for viewing multiple records at a time. Columns represent the fields for each record.
Layout: Collection of forms, tabs, grids, and splitters (the Service layout will show the Service form and the Workorder form).

To create forms one will perform the steps of creating the Service form (Service Panel), creating the Workorder form (Workorder Panel), and creating the Service layout. The steps of creating the service form are to create fields, define additional field properties if necessary, and then Add fields to the form. Creating fields is performed as follows:
1. In the Business Definition Editor Navigation pane, click Master Business Object in the navigator bar and ensure Service is selected.
2. Select Definitions>>New Field. The Field Wizard appears.
3. Review the Welcome page and click Next to bring up the Name, Description, and Field Type page.
4. The Service field is the first field listed in our table on page 1-8. Therefore, in the Field name text box, type Service.
5. In the Field description text box, type Choose the type of service.
6. In the Field type combo box, select Text.
7. Click Next to bring up the Text Field Properties page.
8. Accept the length default, and click Next to bring up the Common Field Properties page.
9. Because each service request must specify which service is needed, select Field is required.
10. Click Next to bring up the Congratulations page appears.
11. Click Finish to save the field definition. The field is "temporarily" added to the system (we will permanently add it later when we commit the Definition Set). The Service field appears on the navigator bar. Before adding the field to the form, define additional properties to make the field a combination box that shows Physical Therapy, Equipment, and Transportation.

Next, additional Field Properties may be defined.
1. In the navigator bar, right click Service, and select Edit Field to bring up the Field Editor.
2. Select the Validation tab.
3. Select List of Values.

4. Click in the first row, first column under List Properties, and type Physical Therapy. Press Tab and type Physical Therapy again.
5. In the next row, type Equipment in both columns, and in the third row, type Transportation in both columns.
6. Click Apply to save the values available in this field. For more complex field definitions, click Validate to check the field's properties for errors in syntax.

Finally, one may add additional Fields to the Form:
1. In the navigator bar, click and drag the Service field to the work pane.
2. Click the control (the blank text box) so that only that box is selected.
3. Right-click, and select Properties. The Control Properties dialog box appears.
4. Select the Behavior tab.
5. Select Combo. This makes the format of the text box a combination box.
6. Click Close. The Service field is on the form and is in the proper format.

The remaining fields (ServiceID, SSN, FirstName, LastName, Address, City, State, and Zip) may be created in the same manner. Remember to make the ServiceID and Zip number fields, while the other fields are text boxes. Add those fields to the form. Note that although the SSN field will contain numbers, make it a text field since text fields accept mask strings to format the field's contents.

Working with More Complex Fields

In our example, the ServiceID and the SSN fields have special options:
  ServiceID needs an automatic, incremental counter and SSN needs a mask that formats the number as NNN-NN-NNNN.

Creating a Counter Field

Counters are automatic character generators used to increment values. Each new service request should contain a unique Service ID number that is automatically generated.
1. Select Definitions>>Counters. The Counters Center appears.
2. Click New to bring up the Counter Wizard.
3. Review the Welcome page, and click Next to bring up the Name, Description and Type page.
4. In the Name text box, type ServiceIDCounter.
5. In the Description text box, type Generates an ID number for the service request.
6. In the Type combination box, select Numeric.
7. Click Next to bring up the Initial Value and Increment page.
8. Accept the default initial value and increment amount. The first service request will have an ID number of 1 and the next request will have an ID number of 2, and so on.
9. Click Next to bring up the Reset Value pages.
10. Accept the default reset values. Once 999,999 service ID numbers are used, the value will return back to 1.
11. Click Next. The Confirmation page appears.
12. Click Finish to save the counter definition, and then exit the Counter Center. The counter is "temporarily" added to the system (we will permanently add it later when we commit the Definition Set).

Applying the Counter to the ServiceID Field
1. On the form, right click the ServiceID field control, and select Field Properties. The Field Editor appears.
2. Click the arrow next to the Default Value text box, and select Counters to bring up the Counters Center.
3. Select ServiceIDCounter, and click OK.
4. Click Apply. The ServiceID field is now associated with the ServiceIDCounter.
5. Click Close, and save the changes to the Definition Set.

Creating the Mask for the SSN Field
1. Right click the SSN field control, and select Field Properties. The Field Editor appears.
2. Click the arrow next to Format at the bottom of the Field Basics tab, and select Inline format. The New Format Definition dialog box appears.
3. In the Format category drop-down list, select Custom.
4. In the Maskstring text box, type ###-##-####. Note: The Mask characters link provides a brief guide for typing mask strings. The # character allows users to type a number in that character (the 9 character would also work). The – indicates the literal character that appears in the field control.
5. Select Push format. This processes the number typed in this field from right to left.
6. Click OK.
7. Click Apply, and then click Close.

The creation of the Workorder form follows the same basic steps that were performed in order to create the Service form. First, one creates the Fields:
1. In the navigator bar, click Standard Business Objects, and select the Workorder object.
2. Add the Service field in the same way other fields were added to the Service form.
3. Add the PhysicalTherapist field by right-clicking Fields under Workorder in the navigator bar, and selecting Add Field. The Field Wizard appears.
4. Review the Welcome page, and click Next. The Name, Description and Field Type page appears.
5. In the Field name text box, type PhysicalTherapist.
6. In the Field description text box, type Records the name of the therapist assigned to this service request.
7. In the Field type drop-down list, select Text.
8. Click Next. The Text Field Properties page appears.
9. In the Specify length field, make the maximum field length 35.
10. Click Next. The Common Field Properties page appears. Accept the default; a physical therapist is not required and does not need a default value or an index for searching.
11. Click Next. The Congratulations page appears.
12. Click Finish to save the field definition. The PhysicalTherapist field will then appear on the navigator bar.

Next, one may add Fields to the Workorder Form. In the navigator bar, click and drag the Physical Therapist and the Service fields to the work pane. With the Service and Workorder forms completed, one should next create the Service layout that will allow one to add the Workorder form as a tab on the layout. The layout is a collection of forms, tabs, grids, and splitters that users see in the ITSM application. Layouts let one combine different Business Objects (that are in a relationship) on one pane. The Master object, Service, controls the layout. Since it is also the Parent object to Workorder, the layout will contain the Workorder form as a tab.
1. In the navigator bar, click Master Business Objects, and ensure Service is the selected object.
2. Under the Displays item, double-click Service(Layout). The Service panel we created appears at the top of the layout, with a tab splitter just below. Note that one may need to click and drag down the tab splitter to see the entire Service panel.
3. In the navigator bar, expand Relationships and select ServiceContainsWorkorder.
4. Click and drag the relationship to the bottom of the Service layout. The Workorder tab appears.
5. Expand the ServiceContainsWorkorder item in the navigator bar. Then expand Workorder Fields.
6. Right-click the tab and select Tab Container Properties. The Container Properties dialog box appears.
7. Select the Layout tab.

8. Under the Associate with heading, select Form view.
9. Under the Views heading, select Workorder (Panel).
10. Click Close. The Workorder form appears on the tab. While the forms and the Service layout are technically complete and accurate, they are not particularly aesthetically pleasing and they have not been committed to the Definition Set. The next section discusses other form design options and committing procedures.

The completed Service layout is ready to be used by Application users who fill out service requests. The Service and Workorder Business Objects are saved in the Definition Set. To apply the changes to the ITSM application, commit the Definition Set, and then set Security Group rights to the Business Objects. It may be advisable to commit the Definition Set to a test environment so one can work with the new forms and layout before committing them to a live environment. This can be done by opening and committing the Definition Set in a test database. To Commit the Definition Set, one should, select File>>Commit in the Business Definition Editor. Note that the commit process may take a few minutes to begin and then to commit. The Application Administrator checks the Definition Set for errors and then commits it to the database.

Now that the two new Service and Workorder objects are committed, give Security Group rights to the objects. This may be performed by performing the following steps:
1. Close the Definition Set and on the main Application Administrator window, select Security>>Security Group Manager. The Security Group Manager dialog box appears.
2. Select the Security Groups to give access to the objects. For example, Administrators, Change Manager, and Service Desk Analyst.
3. Select the Business Objects tab.
4. In the list of Available Business Objects, scroll to the Service object and enable View, Add, Edit, and Delete rights. Do the same for the Workorder object.
5. Click Apply and Close.

To view the objects within the newly created business application, one may perform the following steps:
1. Launch the Service Management application, and connect to the database containing the Definition Set.
2. Select one of the roles associated with the Security Groups enabled to work with the Service and Workorder objects; for example, ChangeManager.
3. On the IT Service Management main window, click the arrow next to the Search text box under the Searches navigator bar item.
4. Scroll until Service appears, and select the associated field.
5. Click the Search button under Searches in the navigator bar. A button for New Service appears on the IT Service Management toolbar.
6. Click New Service to view a blank Service Request that can be filled out and recorded in the database.

Assuming that the Definition Set containing the Service and Workorder objects were committed to the live database, then users can begin entering service requests. One may also begin designing more advanced features of the application, such as creating QuickActions and reports as well as incorporating more design elements in the forms.

Design, Creation, and Execution of an Example Business Application

IT Service Management Business Process Automation (ITSM BPA) lets a user create business process flows using the XML-based Business Process Modeling Language (BPML) and visual drag-and-drop functionality. Thus, a user may create end-to-end process flows in the Workflow Designer, ITSM BPA's visual tool for mapping out processes. ITSM BPA uses an extensible Web service based transport mechanism that lets a user integrate workflows across the enterprise.

Business Process Automation Overview

IT Service Management (ITSM) Business Process Automation (BPA) allows a user to quickly create business processes: end-to-end workflows designed to perform tasks within an organization. ITSM BPA uses extensible Web-service technologies and the Business Process Modeling Language (BPML) to enhance information sharing between IT Service Management and other applications. Later sections provide details on these technologies.

Business Process Automation is defined as an organization's formal attempt to analyze the role of diverse applications in achieving common tasks and design business processes to reduce inefficiencies by integrating these tasks into a common workflow.

For example, businesses might have Service Management software from one vendor, accounting software from another vendor, and procurement software from yet another vendor. When these systems need to communicate to perform a task, the integration piece is often manual. However, integrating these systems through an API might cost more than the integration process saves.

Recently, Business Process Automation took a giant step forward with the introduction of the Business Process Modeling Language. BPML is a formal language for abstract modeling of enterprise-wide executable processes used in conjunction with Web services to provide a cross-platform method for integrating enterprise systems.

Business processes manage the entire life cycle of any Business Object you want to monitor, while Business Rules focus on a particular attribute of a business object, such as its status, and take action when a particular condition is met. Business Rules are basically triggers that perform an action when fields are created, updated, retrieved, or deleted.

With a business process, you could notify members of a Change Approval Committee when they receive a Request for Change, remind them if they fail to respond, and eventually escalate the response to a superior. The process would be taking different actions depending upon responses to certain events. A Business Rule could monitor the status of Change and send a notification when a Request for Change is created in the database, but it could not manage all the notifications and escalations required to ensure a Request for Change is adequately reviewed and approved or rejected. In summary:

Business Rules: Use a Business Rule when you need to check the status of a field that may have changed due to an event change in the database (Create, Update, Retrieve, Delete).

Business Processes Use a business process when you need to monitor, make decisions, and perform actions throughout the life cycle of a Business Object.

Business Process Automation (BPA) provides several advantages over prior systems:

Supports BPML—an internationally recognized standard in business process modeling.

Integrates discrete activities into end-to-end process flows.

Supports synchronous and asynchronous messaging.

Handles events and exceptions.

Supports compensating transactions to reverse exceptions.

Exposes process flows through Web services.

With its visual drag-and-drop interface, the Workflow Designer of the present disclosure allows users to build processes that integrate enterprise-wide applications. BPA offers three tools for configuring and using the application. These tools are:

The Workflow Designer: Use to design business processes.

The BPML Admin Tool: Use to monitor and manage business processes.

The Workflow Configuration Utility: (BPMLSettingUtility.exe) Use to configure the Business Process Engine.

These tools are described in the next sections.

The Workflow Designer

Figure 27:
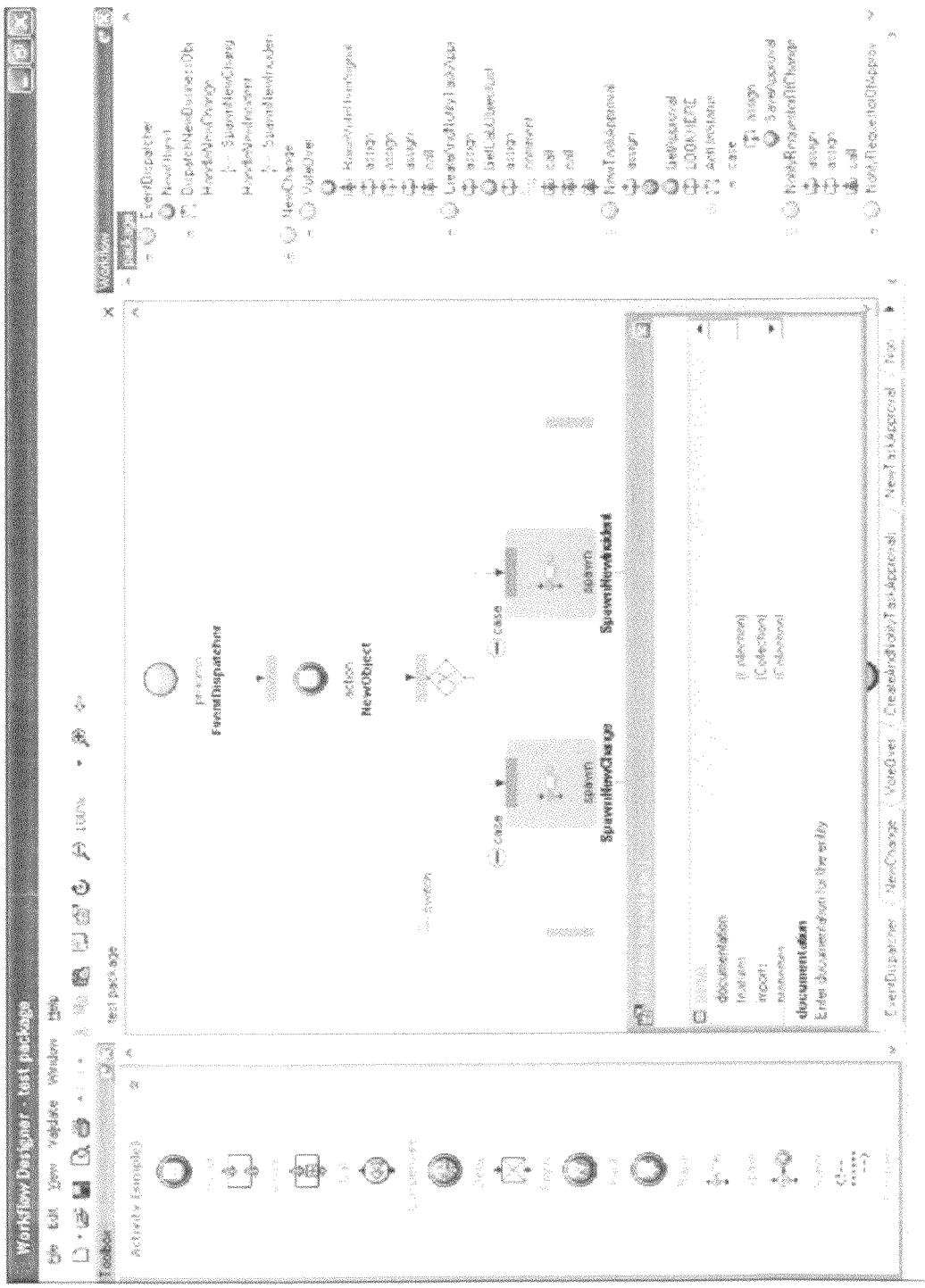
FIG. 27 illustrates a display screen of the Workflow Designer application.

The Workflow Designer is used to create end-to-end business process flows using graphical representations of activities with this drag-and-drop tool. FIG. 27 illustrates a display screen of the Workflow Designer application. As a user creates processes, the Workflow Designer uses BPML code to perform the activities in the user's workflow.

The user can create packages of one or more processes built around Service Management themes such as Change Management or Incident Management. Additionally, a user can design processes to provide information to external applications or import information from external applications through Web service-based APIs.

The user may monitor running processes with the BPML Admin Tool. This tool allows a user to stop active process instances to troubleshoot a minor problem. The BPML Admin Tool also allows a user to disable a process and enable it again when the user is ready to do so.

Figure 28:
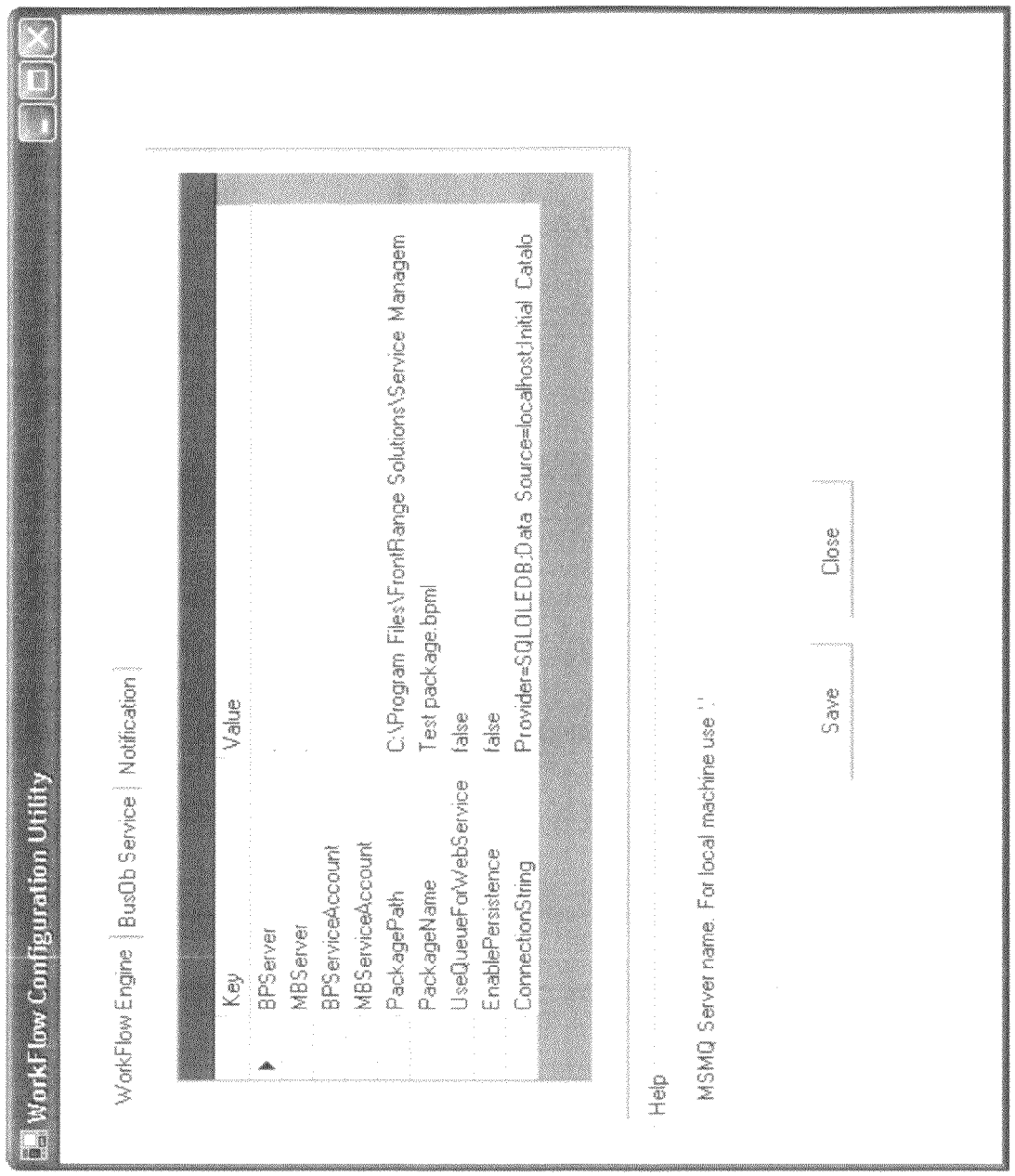
FIG. 28 illustrates a screen display from the Workflow Configuration Utility.

Before a user can use IT Service Management Business Process Automation, the user must configure the Business Process Engine using the Workflow Configuration Utility. FIG. 28 illustrates a screen display from the Workflow Configuration Utility.

The BPML Admin Tool

The BPML Admin tool is used to monitor processes that are executing against the engine. The tool allows a user to:

Stop a process when a process encounters an error from which it cannot recover. For example, a While or Until loop might have been designed with no exit mechanism, so the process is caught in an infinite loop and cannot stop processing on its own.

Disable a process from running. For example, a user might want to disable a process that the user is redesigning, but not necessarily stop the entire package.

Enable a process that was disabled.

For example, to monitor processes the user runs the BPML Admin Tool. This will cause the BPML Admin Tool main window to appears. To stop a process, the user selects View>>Running Processes to make the Running Processes window appears. The processes may appear in a tree form. Process displayed in green are active and processes displayed in brown are stopped. A user merely has to click on a displayed a process to stop it.

Figure 29:
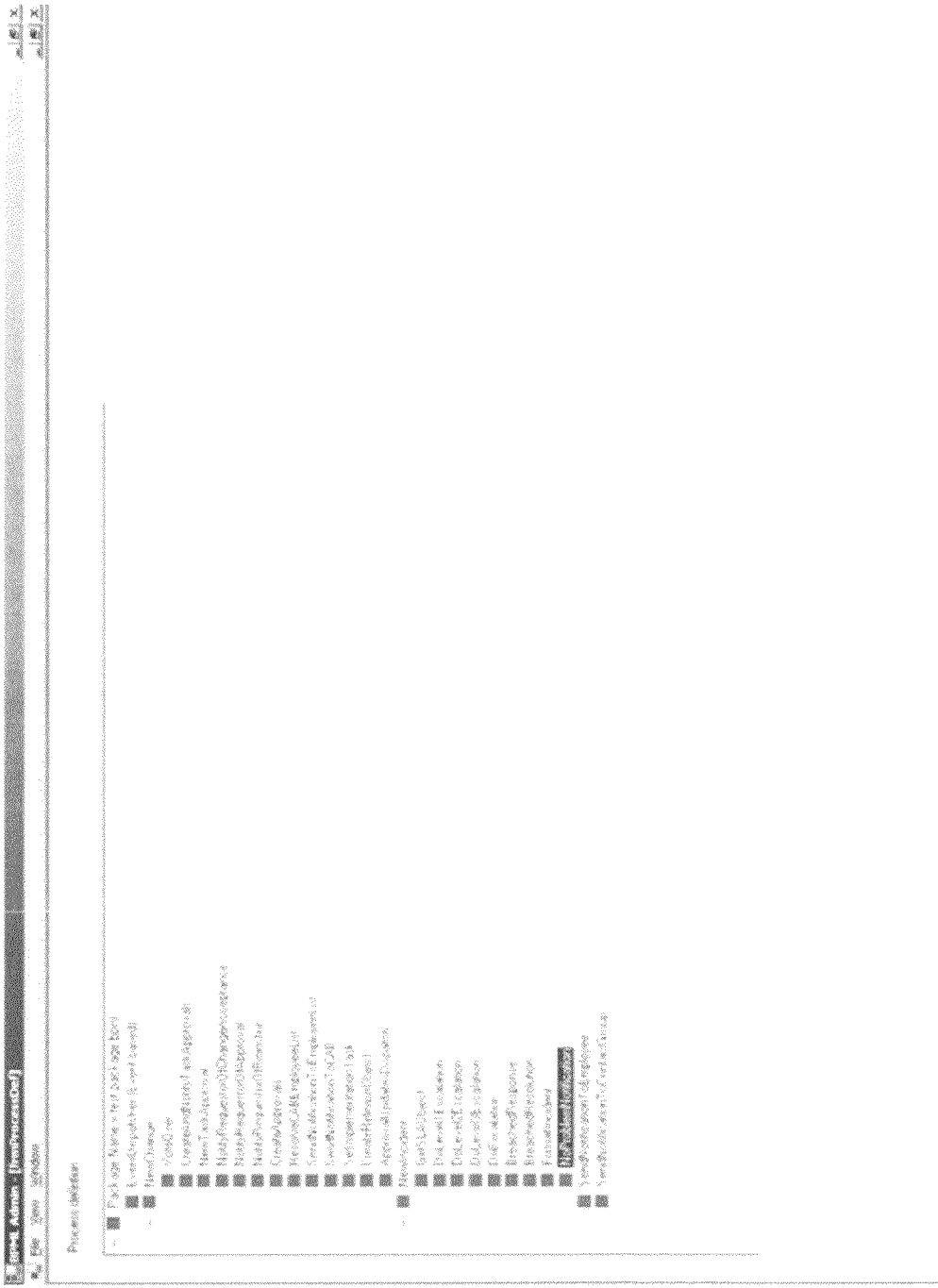
FIG. 29 illustrates a set of processes being viewed.

To view process definitions, a user selects View>>Process Definitions for a detailed view of the active processes. The user may double-click an individual process in the tree to display an expanded tree that displays all secondary processes (for example, spawned processes or nested processes) within the selected process. FIG. 29 illustrates a set of processes being viewed. A user may disable and enable processes.

The Graphical User Interface based Workflow Designer is a key tool for creating business processes. To aid the user, the Workflow Designer comes with several "wizards" to speed business process creation:

Package Wizard: Create package-level properties, schedules—in other words, global properties and schedules that all processes can use.

Process Wizard: Create process-level properties, schedules—in other words, properties and schedules that the processes in an activity can use.

Activity Wizards: Define activity tasks (for example, assigning values to variables, calling processes, and so forth). A different wizard exists for each of the activities, excluding the Comment and empty activities.

Figure 30A:
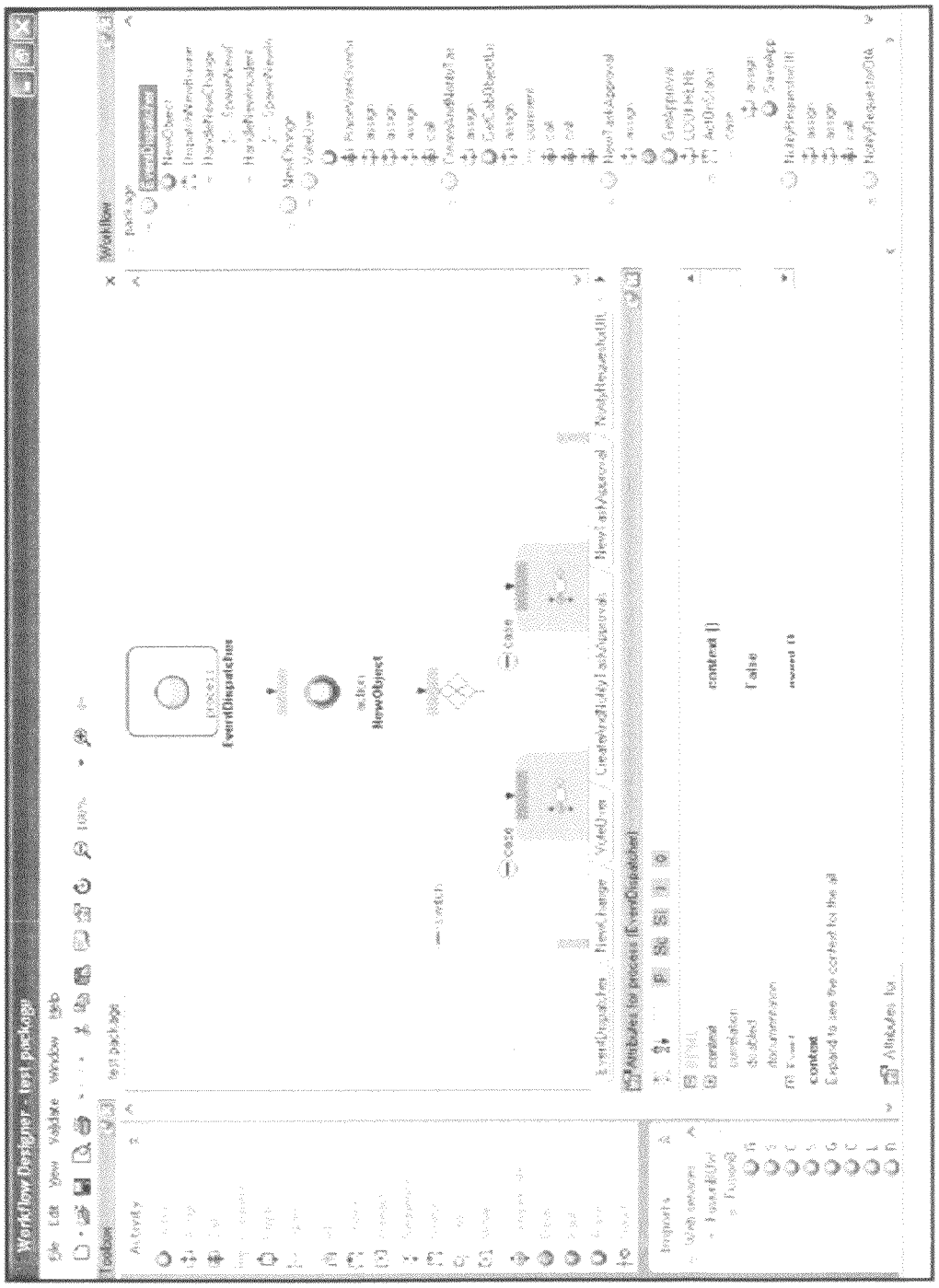
FIG. 30A illustrates an example embodiment of the main Workflow Designer window.

FIG. 30A illustrates an example embodiment of the main Workflow Designer window. As illustrated in FIG. 30A, the Workflow Designer displays a graphical flow chart representation of a business process. A Workflow Designer Toolbar displays icons that represent many actions that a user may perform. The tool bar actions are illustrated in FIG. 30B.

Figure 31:
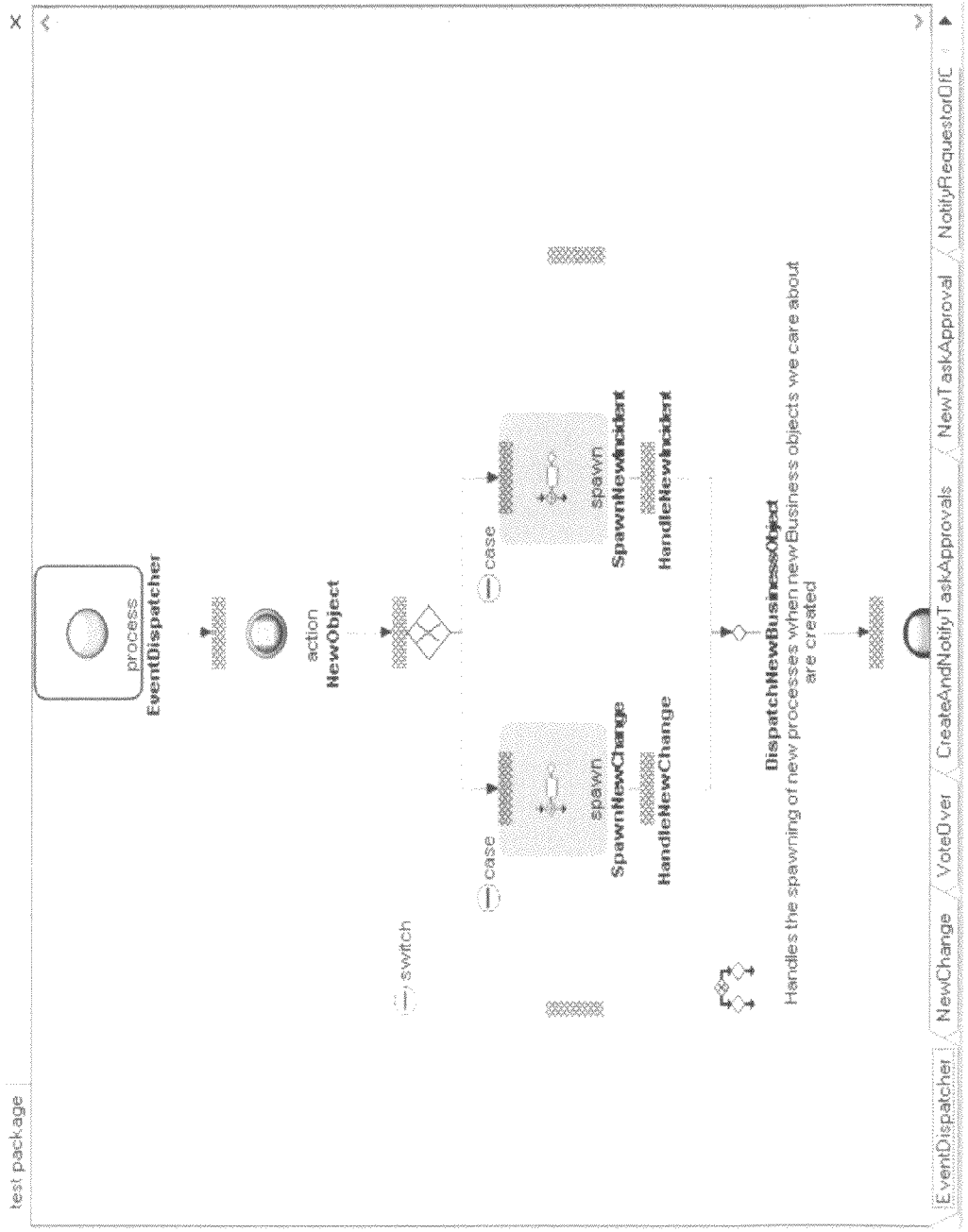
FIG. 31 illustrates a business process flowchart in the Workspace.

The central pane in the Workflow Designer is called the Workspace. The user creates business processes in this Workspace. FIG. 31 illustrates a business process flowchart in the Workspace. There are several ways to navigate to elements in the Workflow Designer. A user may can click the tabs at the bottom of the workspace in FIG. 31 to view a different process in the package, or click an element in the Flowchart to view its details.

Figure 32A:
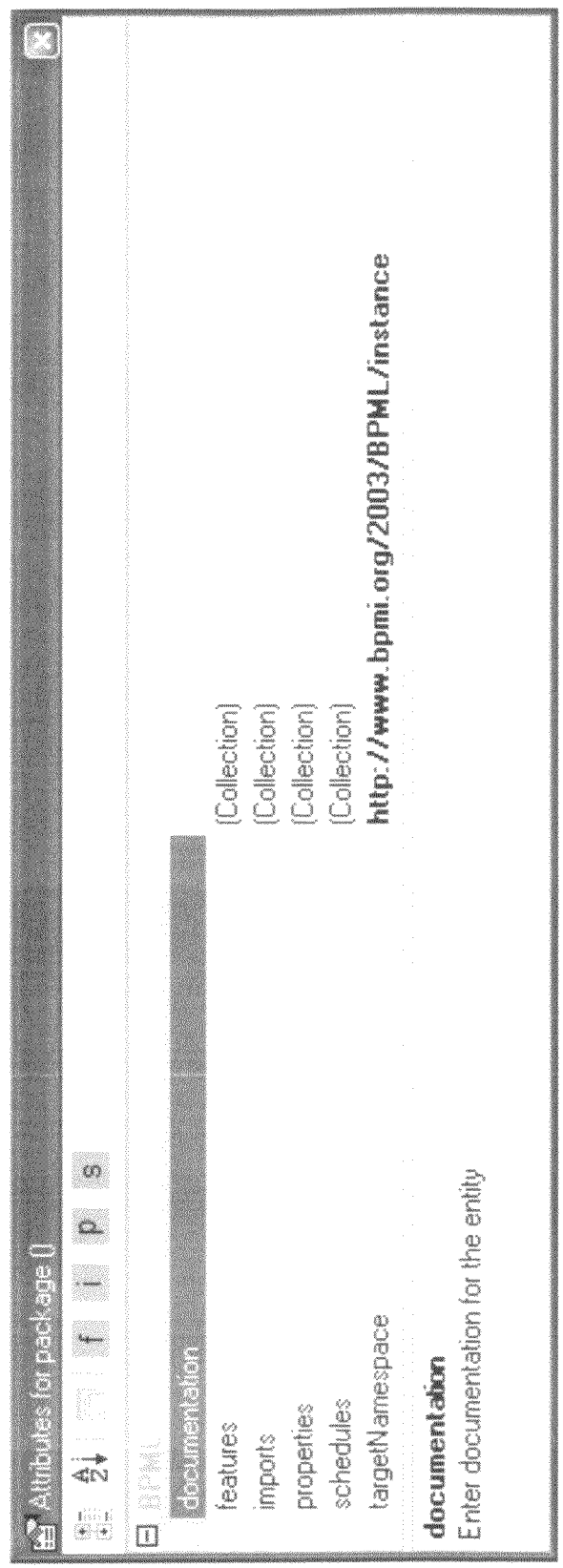
FIG. 32A illustrates attributes for a package.

Attributes describe the characteristics of a package, process, activity, or other object (such as a Fusion Business Object) in the Workflow Designer. Right-click the package, process, or activity to view its attributes. FIG. 32A illustrates attributes for a package. Package-level attributes include objects that the package might need such as schedules, features (also known as extensions in some programming languages), imports (imported .wsdl, and XML .xsd files that are used by the package), and properties.

The attributes window of FIG. 32A has a toolbar for various actions the user may invoke. The particular toolbar buttons displayed vary depending upon the activity. An activity may include one or more of the tool bar buttons illustrated in FIG. 32B.

A user may use the collection editors to add or remove attributes from a collection. A variety of attribute collections are available in the designer, including:

Imports: Store the names and locations of imported .wsdl and .xsd files for processes connecting to external applications.

Features: View code extensions to BPML. For example, if Frontrange adds a debug-trace activity, a user may include that code by adding it to the package as a feature.

Schedules: Add or remove schedules for a package, process, or activity. Use schedules to start packages, processes, or activities exactly when a condition is met, or wait for a specific duration before starting. For example, a user could use a schedule to send a notification two minutes after a response time is breached.

Signals: Add or remove signals to synchronize tasks between two activities. For example, if one activity's tasks must finish before the other can begin, add a Raise signal to notify the second activity when the first activity completes its task.

Inputs: Add or remove inputs to a process or activity. For example, a process may need to receive an input value in order to perform its tasks.

Outputs: Add or remove outputs to a process or activity.

Values: Add or remove static text (such as a message subject) or dynamic values (such as a field value). A user can assign these values to variables such as the MsgBody of a notification.

Properties: Declare property variables for the package or process.

To view the attributes for a specific collection, a user may select the attribute-type. For example, to add an imported .wsdl or .xsd file to Imports a user first selects Imports and click the Browse button. The Imports dialog box appears. The user then clicks add. In the Namespace field, type the Namespace for the file (for example: http://www.namespace-.com/namespace) and click OK to exit the editor. Note: An XML namespace is a collection of element types and attribute names identified by a URI reference.

A user may use the BPML Code tab to view code statements for the active element in the Flowchart or the Workflow pane. FIG. 33 illustrates an example BPML code tab that displays the Package object code. A user may make the BPML Code read-only for a package by clearing an "Allow edit code" preference. In one embodiment, the BPML Code tab is hidden by default.

Referring back to FIG. 30A, a user may use the Workflow pane (to the right of the Flowchart) to view a tree form of the entire package. The user may select an element in the tree to view details for that element.

After a user creates the skeleton of a process in the wizard, the user may use the Workflow Designer to add process tasks, known as 'Activities'. Referring again to FIG. 30A, the Activities are located in the toolbox to the left of the workspace in the Workflow Designer. In the default display, the most commonly used activities are at the top of the Toolbox.

Activities represent predefined chunks of BPML code that perform certain programmatic operations that can be used to create process workflows. One can define how an activity works within a process through the activity's Wizard, or enter attributes manually using the Attributes window. An activity executes in a context containing all locally defined activities as well as activities defined at the parent level. For example, an activity receiving an input message sets the value of an attribute from the contents of that message. A subsequent activity uses the value of that attribute to send an output message. Activities must be in the same context to exchange messages.

The following Activities are available in the Workflow Designer:

| Activity | Definition | Available Attributes |
|---|---|---|
| Action | Performs or calls operations exchanging input and output messages. | Operation: Can be Create, Update, Retrieve, Delete. Input: Input parameters. Output: (ordered) Displays a list of output parameters. Locator: (optional) Used when the activity calls an operation by providing the location of the service that is performing the operation. Correlate: (optional) Sorts by identifier such as Change ID. Activities: (optional, ordered) Provides a means for performing an activity in response to an input message or before sending an output message. |
| Assign | Assigns a new value to an attribute. | Property: Displays the property name. Values: (optional) Includes a collection of one or more source attributes and hard-coded values. Expression: (optional) Defines an expression to evaluate. |
| Call | Starts a process and waits for it to complete. | Process: Displays the name of process the Call activity is calling. Input: Maps zero or more output parameters to attributes. Output: Maps zero or more output values to input parameters. |
| Compensate | Calls a compensation process for all specified processes. Used to roll back activities with unrecoverable errors to their previous states. | Process: Provides the names of one or more processes. Output: Maps zero or more output values to input parameters. |
| Delay | Sets a timer. For example, if an activity is waiting for a response, Delay can be used to specify a maximum wait time. | Duration: Displays the value added to the current time when the delay timer is triggered by an event. If the value is not of type xsd: duration or convertible to that type, the activity completes immediately. Instant: Displays the time at the instant when the delay timer is triggered. If the value is not of type xsd: dateTime or convertible to that type, the activity completes immediately. |
| Empty | Does nothing. Used to represent manual or external events that are not automated in a process. | No attributes. |

-continued

| Activity | Definition | Available Attributes |
|---|---|---|
| Fault | Throws an error in the current context. | Code: (optional) Specifies the fault code (error number). You do not need to specify a fault code if the fault appears as part of a fault handler. Property: (optional) Specifies a property that is modified when the parent atomic activity aborts. |
| Raise | Raises a signal. | Signal: Displays the signal name. output: (ordered) Maps zero or more output values to the signal value. Abort: Abort or wait. Indicates whether the activity will wait for the signal to be lowered or abort the signal through a fault. |
| Spawn | Starts a process without waiting for it to complete. Used when the outcome of the spawned process is not necessary for the parent process to complete its work. | Process: Displays the name of the process to spawn. Output: Maps zero or more output values to input parameters. |
| Synch | Synchronizes on a signal. | Signal: Displays the signal name. Condition: (optional). Abort: Abort or terminate. If the activity can determine no signal will be raised in the current context, it can throw a fault; otherwise, it can terminate immediately. Input: Maps zero or more values from the signal value to properties. |
| All | Executes all activities within an activity set in parallel. Used to speed transaction processing. | All: Contains a composite of all the activity attributes (documentation, con-text, and so forth) and an Activity set attribute. Activity set: A set of all activities included in the All activity. |
| Choice | Selects and executes one activity from a set of activities in response to an event. | Event handlers: (ordered) Displays a collection of two or more event handlers. Event handlers associate events to activity sets that execute when the event occurs. Three activities triggered by an event are supported: Action, Synch, and Delay. |
| Foreach | Executes activities once for each item in an item list. For example, Foreach NewChange object, execute a loop that sends a notification to the appropriate change manager. Use Foreach to perform operations on countable lists. | Select: A SELECT statement. Activity set: Contains the list of activities to perform. |
| Sequence | Executes a set of activities in the order they appear. | Activity set: The set of activities to perform in sequence. |
| Switch | Executes activities from one or multiple groups (cases) based on the truth value of a condition. | Cases: (ordered) Each case contains the following attributes: - Name: (optional) Displays the name of the case - Documentation: (optional) Contains any documentation about the case. - Condition: Condition you use to evaluate whether the case should execute. - Activity set: Contains an activity set. |
| Until | Executes activities one or more times until a specified condition or conditions are met. | Condition: The condition to evaluate. Until the condition evaluates to True, the activity set is performed. Activity set: Contains a list of activities to perform until the condition evaluates to True. |
| While | Executes activities zero or more times based on the truth value of a condition or conditions. For example, While | Condition: The condition to evaluate. As long as (while) the condition evaluates to True, keep performing the activity set. Activity set: Contains a list of activities to perform while the condition evaluates to True. |

| Activity | Definition | Available Attributes |
|---|---|---|
| | Change Status is pending, send periodic notifications to the Change Board. | |
| Comment | Allows you to document the process flow. | |

To use an activity, a user simply clicks to select an activity and drags the selected activity onto the workspace. For example, one may declare a ChangeID variable. Then, FIG. 34 illustrates the use of an Assign activity to assign a value—in this case ChangeRecID to our variable ChangeID. To view the attributes for a specific activity, select that activity, and its attributes appear in the Attributes window. For example, the lower-center part of FIG. 30A illustrates the attributes for the EventDispatcher process.

The imports section of the Toolbox (on the bottom-left of FIG. 30A) stores imported Web services and schema definitions. A user can use these files to send and retrieve information from external applications. To import a Web service, select File>>Import and select the .wsdl file or .xsd file. A collection of Imports is located at the package level. To see all the imports for a package, right-click and select Collections>>Imports.

The library is a repository for storing predefined processes required by multiple business processes. A developer can reuse elements in the Library to create new processes more efficiently. To use a process from the library, click the process and drop it into the active package in the Workflow pane.

Business Process Automation Overview

In the disclosed ITSM example, there currently 2 demonstration processes running in IT Service Management (ITSM)—one for Incident escalations, and the other used to support the Change Approval process. Both Incident Management Approval (disclosed with reference to FIGS. 20 and 21) and Change Approval (disclosed with reference to FIG. 22) are ideally suited for business automation because they both concern the life cycle of a Business Object (an Incident or Change object).

This section starts with a high-level description of the second process: Change Approval Notification. Then the section walks through the general steps to design a business process. Finally, this section describes how to create a process in the Workflow Designer.

Our sample business process creates a business process to notify staff when they have change-related tasks and the requestor on the progress of their Request for Change. In one embodiment, we decide the business process should perform the following sequence of tasks:
1. A notification is sent to the requestor saying the Request for Change is accepted.
2. Tasks (task.approvals) are created for the selected members (in this case Chris Manager) and are displayed under the Approvals tab. (One may need to click the Refresh button to see the approval).
3. Notifications are sent to selected members in the CAB (in this case Chris Manager).
4. Three minutes after the change is accepted, a notification is sent to the CManager saying the change is ready for the final approval.
5. Change the status to Approved and a notification of approval is sent to the requestor.
6. A Release object is created and linked to the change. (You may need to access the Release tab and click the Refresh button to see the object.)

Here is the basic workflow one may use to create the Change Approval Notification business process.
1. On paper, plan the main business process and possible secondary processes. (Do this step prior to using the Workflow Designer.)
2. Create a package to contain a process(es) using the Package Wizard.
3. Create a process(es) for the package using the Process Wizard.
4. Create activities using the Activities Wizard.
Planning Out the Process
When a user is mapping out business process(es), the user will decide the following:
Objective: What the business process is going to accomplish. For example, the sample process notifies a requestor when a change is approved. One should be able to sum up your objective in one sentence.
Inputs: What input parameters the process needs to meet its objective.
Outputs: What output parameters the process needs to meet its objective.
Activities: What tasks (known as 'Activities' in the Workflow Designer) the process needs to include to meet its objective.

After a user has a high-level draft of the process, the user may decide to break down the process flow into smaller processes. For more complicated workflows, using multiple processes is recommend. When the business requirements change, a user can replace part of your overall workflow but continue to use the rest of the design.

The Workflow Designer contains two different process types: Top Level Processes and Nested Processes. One should use a Top Level Process type when other processes must be able to access the process properties. One should use Nested Processes to create a "private" process with properties that cannot be accessed by other processes. For example, you can use a Nested Process for security to protect confidential data and algorithms.

Each process has a start type that defines how the process starts. A process can start in one of three ways: Call, Event, or Schedule. A user should use a Call start type when one wants to call a process from within another process. A user should use a Event start type when one wants a process is triggered by an event in a database. A user should use a Schedule start type when one wants a process is triggered by a calendar event. For example, one can create a process that triggers on the last day of every month.

Because it is important to know when a 'Business Object' is created in the database, sample processes start when an Event (also known as an action) occurs in the database. There are four types of events to choose from: Create, Update, Retrieve, and Delete. A Create event occurs when a Business Object is created. An Update event occurs when a Business Object is updated. A Retrieve event occurs when a Business Object is retrieved (sometimes called a Fetch in programming). A Delete event occurs when a Business Object is deleted.

Next one must decide whether there are property variables (known as 'Properties' in the Workflow Designer) that one needs to declare for the process. Declaring a property variable is like creating an empty container that can store values. After declaring property variables, one can assign values to the property variables depending upon the tasks one needs to accomplish. As with many programming languages, BPML (the language on which Workflow Designer is based) sets property variables to Null when if one does not assign a value.

In the Workflow Designer, one can declare property variables at the package level (to use them in all processes), at the process level (to only use them in a particular process), or in flow control activities (while, until, foreach, or switch). A user might choose to declare a variable at the process level for security reasons (when the user does not want the information to be accessible by other processes in the package).

For the sample processes, we create a property variable called CreatedObject and decide to assign it a value later in our process when our process receives a Business Object. For now, CreatedObject is assigned a value of Null by default. We also need to define a type for our object. For simplicity, we call it a generic FusionBusinessObject type. Defining a type for a property variable is the same as assigning it a data type. In this case we are assigning our variable a generic data type called FusionBusinessObject. Based on your business objectives, decide what input and output parameters you need to accomplish your objective.

Finally, one should consider which activities needed to be accomplished for the task. For example, if one needs to call another process, use the Call activity. Or if one wants to use a condition-based loop to perform repeated tasks, use While or Until. The Workflow Designer contains 17 different activities (as set forth earlier).

Now that we have designed our process on paper, we are ready to build it in the Workflow Designer. There are two process types available in the Workflow Designer: Top-level processes and Nested Processes. Top-level processes must be defined in the context of a package. Nested processes are defined by their parent process. Because nested processes can only access properties defined within their own context or that of their parent process, consider using a top-level process when access to a nested process' properties may be needed by a process other than its top-level parent. To created a process:
1. Use the Package Wizard to create a package to contain your processes.
2. Use the Process Wizard to create a new process.
3. Right-click the process object and select Attributes at the bottom of the Workflow pane.
4. Expand context.
5. Select Properties and click the Browse button. The properties dialog box appears. Note: Declare property variables at the package or process level and then assign values to those variables using the Assign activity.
6. Add information for each property variable you want to use in this process. Note: For complex Business Objects, such as fusion:Notification Type, required values are labeled with the abbreviation Req. If you attempt to exit the Properties editor without entering a required value, the Properties editor prompts you to enter it.
7. Define the process object property type as Type, Element, or Referenced. The Type definition is recommended if one needs to access field values from a Business Object.
8. Click the Assign activity and drag it onto the workspace to assign values to property variables as needed.
9. Perform process flow control as needed with Switch, For each, Until, While, or Choice activities.
10. Perform tasks that can be run in parallel with Spawn, Sequence, All, Sync, or Raise activities.
11. Manage normal error handling with Fault.
12. For serious errors, use Compensate to rollback the activity where the error occurred to its previous state.
13. Call other processes as needed using the Call activity. (See the table on Activities in the WorkFlow Designer section.)
14. Save your work periodically and when your business process is complete.

To run a process, you must set the new package name and package path using the Workflow Configuration Utility (BPMLSettingUtility.exe).
1. Navigate to C:\Program Files\FrontRange Solutions\Service Management and double-click the BPMLSettingUtility.exe. The Workflow Configuration Utility Main Window appears.
2. Type the Package Name for the package you want to run.
3. Type the Package Path where the package is located.
4. Click Save to exit the utility.
Refer to the earlier section on "Administrative Setup" for more information on the Workflow Configuration Utility.

The ITSM Application from a User Perspective

Although IT Service Management is completely customizable and your system administrator may have changed many of the sample Business Objects, this section is designed to provide an introduction to the core functionality of the base application.

Topics include navigating the application, using e-mail and calendars items to support your daily work, maximizing the potential of QuickActions, using the Search features, personalizing your Dashboard, and understanding Business Rules, and using predefined reports.

IT Service Management (ITSM) lets a system administrator adapt the application objects and business processes to reflect the way a person can do business and support a Service Desk. ITSM provides a tool for tracking contacts from users and customers. Most Service Desk representatives are accountable for all Incidents they open, monitoring the status and progress of all outstanding Incidents and relaying the information to the customer. Then if an Incident does not progress satisfactorily, it is escalated.

The goal of the Service Desk is to ensure that normal service is restored for the customer within the agreed service levels and business priorities. Using Service Management, the Service Desk manages Incidents until resolved. The process may include referring the Incident to second or third-level support for diagnosis and resolution. If an Incident remains unresolved beyond the service level target, the representative refers the Incident to Problem Management.

A Business Object is a key business component that you track and manage. In IT Service Management there are two key types: Master and Standard.

A Master Business Object is core to your business such as an Employee or Incident record. Usually a Master Business Object functions as a Parent in relationship to other objects. For example, when a customer calls with an issue, you create an Incident record. That Incident becomes the key focal point of data collection about the issue. It is the Master Object.

A Standard Business Object supports your system. It provides additional information. For example, an e-mail address supports an Employee record and Journal notes support an Incident with added and ongoing information.

A Master Business Object is most often a Parent object because it is the center of the relationship and a Standard Business Object is always a Child object. The Child object assists the Parent by providing it with additional information. For example, the Incident is the Parent and the Journal supplies additional information in the form of notes about the ongoing incident resolution. Therefore, the Journal is the Child object.

A role is a function-specific perspective of the application. When you log into IT Service Management, you select a role that determines your view of the forms and functions of the application. For example, in the sample database, several roles are defined. Usually roles are given descriptive names based on responsibility.

The Admin is the most comprehensive role and has the most extensive view of the application. The system administrator would require an overall view of the application for management purposes.

Roles play an important part of security in ITSM. For example, both the ServiceDeskAnaylst and the ServiceDeskManager have access to the Request for Change object because it is vital that they have the opportunity to suggest changes to processes and systems. The ChangeManager, however, requires an expanded Change object for managing the entire change process from initiation of the Request for Change through the approval process and implementation or Release of the change.

Based on your business needs, your system administrator will assign one or more roles for providing proper access to Business Objects in your system.

The main IT Service Management application window is designed to help you manage your records and activities. It contains the workspace for displaying information and objects, the Navigator for initiating frequently used actions, the menu bar for accessing application operations, and the toolbar for utilizing common shortcuts.

The workspace is the central work area in the application. It provides access to the:

Home Page: Select a predefined Dashboard or create your own.

Search Results: Locate records using a simple search, quick search, or complex search.

Layouts: Access Parent or Child object records by using the forms, tabs, and grids. The Parent object record usually displays as a form with its Child object records displayed as tabs.

Parent Records: Create, edit, or delete Parent objects.

Child Records: Create, edit, or delete Child objects.

Use the Navigator to access actions related to the current Business Object, Quick Actions, Searches, Dashboards, E-mail, Calendar, Assignments, and so forth.

The menu bar provides access to operations based upon the current Business Object. Menu options include:

File: Create new records, save changes, update your password, perform Go To Record, and access print functions.

Edit: Cut, copy, paste, fields lookup, abandon, and delete.

View: Navigate through records or refresh the current data.

Assignment: Access the Assignment Center.

Knowledge: Launch the knowledge base integration to create a new article, view top solutions, or access knowledge base reports.

Incident: Currently Incident but changes to Problem, Change, and so forth based upon active Business Object to be managed.

QuickActions: Access the QuickAction Center, create a new QuickAction, or run recently used QuickActions.

Searching: Search the Knowledge Base, access the Search Center, create a new search, or run recently used searches.

Reports: Access the Report Center, create a new report, or open a recently used report.

E-mail: Send e-mail, launch Microsoft Outlook, schedule meetings, make appointments, or launch your calendar Tools: Manage Business Rules, Dashboards, or e-mail and calendar settings.

Help: Access online Help, About Service Management, and FrontRange.com.

IT Service Management (ITSM) integrates with Microsoft Outlook allowing the two applications to share information. When integrated, you can:

Send an e-mail from Service Management to the address in the current.

Link an Outlook message to a record in Service Management.

Launch your Outlook Inbox or Calendar from Service Management.

Linking E-mail Messages

Integration between IT Service Management (ITSM) and Microsoft Outlook allows you to link incoming and outgoing e-mail and calendar activities to records in ITSM. In Outlook, you can link an incoming or outgoing e-mail to a record in ITSM. E-mail messages are linked using the Service Management toolbar or menu in Outlook. When linking, ITSM validates the e-mail address against e-mail addresses in the Profile and saves the text to the designated tab in the record layout.

Incoming e-mail messages are linked to a record based on the sender's email address. Outgoing e-mail messages are linked to a record based on the recipient's address (or addresses, if multiple recipients are selected). If multiple records are found for a single e-mail address (for example, a family shares an e-mail address) or no valid records are found, a notification dialog box appears.

When an e-mail message does not link properly, you will either notice that the Link to Service Management button does not change, the e-mail does not appear in the Business Object, or an error dialog box may appear.

IT Service Management provides Simple Search, Quick Search, and Complex Search capabilities. This section describes each. The Search Center helps you manage Saved Searches.

A Simple Search contains an expression with a single operator. It is accessed from a form. Right-click a field or click the field Search button.

A Quick Search contains an expression with a single operator. It is accessed from the Navigator. Specifically, under Searches on the Navigator, select the Business Object and field you want to use in your search from the drop-down list.

Complex searches can contain multiple expressions with multiple operators. Use New Search or the Search Center to create a new search. Searches created in the Search Center are based on the active Business Object. The object upon which you are basing your search must be active in the workspace as either a record or a search group.

A QuickAction is a user-defined operation that performs one or more actions with a single click. A QuickAction can be simple (one action) or complex (two or more actions). For example, a simple QuickAction sends an e-mail to a customer acknowledging receipt of an inquiry. Use QuickActions to automate routine or repetitive actions such as sending Incident acknowledgements or creating tasks.

The QuickAction Center helps you manage your QuickActions. They are filtered by the Business Object displayed in the workspace. Browse for a more specific QuickAction or use Find. Run a listed QuickAction or open the QuickAction Center from the Navigator. Properties define how the QuickAction operates. If the new QuickAction resembles an existing QuickAction, copy the properties from the existing QuickAction; then revise them.

A Business Rule is a simplified automatic process made up of Triggers and QuickActions. Triggers are either data-based or criteria-based. When the defined condition is true, the associated Quick Action is run. For example, when the status of an Incident is changed to Closed, an e-mail is sent to the customer.

Business Rules are composed of triggers and QuickActions. Create Triggers and QuickActions through the Trigger Center and QuickAction Center or create them during the process of creating a Business Rule.

One may select where a business rule may run. A business rule may rule on the•Client Side when user prompts are required. A business rule may rule on the server side when the rule should always run and no user prompts are required.

Dashboards are user-defined summary views of data from internal and/or external sources. The Dashboard contains parts. For example, you can create a Dashboard to display your Outlook Calendar, a productivity chart, links to commonly used Web sites, and open Incidents.

The Dashboard Center manages your Dashboards. Use the menu bar for accessing Dashboard commands, the toolbar for utilizing shortcuts, and the tabbed pane for filtering and locating Dashboards.

The scope of a Dashboard can be defined as Personal, Role, or Global. Dashboards defined as Personal are available only to the creating user. Those defined for a Role are available only to users when they log on using the specified role. Global Dashboards are available to all users.

Dashboards are constructed using one or more parts. Parts can be viewed as grids, tables, links, and so forth. Although several Dashboards may be defined, only one appears in the workspace when you launch IT Service Management. This is the default Dashboard established by your system administrator for your assigned role.

If you have a Personal Dashboard defined or want to view another Dashboard, open the Dashboard Center and select the one you want to view. It will replace the default in your current session.

The Dashboard Part Center manages Dashboard parts. Dashboard parts include:
Grid: Data presented in a grid.
Chart: Data presented in a graph or chart.
Image: Graphic from a specified source.
Link List: Hyperlinks to Web sites, UNC locations, or Saved Searches.
Web Browser: Web page from a specified URL.
Tabbed Part: Several parts displayed under tabs.
Outlook Inbox: The Outlook Inbox on the local computer.
Outlook Calendar: The Outlook Calendar on the local computer.

Define Dashboard properties, including appearance and layout, which defines how the Dashboard operates. A user may Define the Dashboard title, colors, graphics, background and so forth.

A user may define a dashboard layout. The Layout tab has two sections: Dashboard Layout (left) and Dashboard Parts (right). The user may drag the part(s) from the list to the layout.

The ITSM Application from a User Perspective

FrontRange IT Service Management Suite provides module-driven service and support solutions for a information technology environment. Within the suite, FRS Application Administrator is the module used to secure, maintain, and customize an IT Service Management (ITSM) system. Although ITSM comes with a robust out-of-the-box solution, its extensibility lets one optimize the system to meet the specific needs of an organization and leverage and transfer data from sources including other ITSM modules. The FRS Application Administrator includes the following features:

Application Display: Customize ITSM workspaces, navigator bars, toolbars, and menu bars.

Database Configuration and Management: Design and edit forms, grids, fields, and other database elements, based on database structure components called Business Objects.

Data Importation and Exportation: Transfer external data to and from Service Management. Also, connect to other data sources and external systems.

Definition Set Creation: Save system changes using Definition Sets, and commit those Definition Sets to the live system any time.

Layout Design: Customize form and grid layouts for different situations or groups of users.

Module Integration: Integrate external modules with Service Management.

Security Administration: Define security parameters with Security Rights, Security Groups, users, and roles.

The FrontRange IT Service Management communicates with a database to store and retrieve information, allowing multiple ways to quickly enter and share data. Because it is highly customizable, Service Management is defined primarily by database and object-oriented concepts rather than functional tasks. The following section describes these concepts and their naming conventions.

The FrontRange Technology Platform utilizes a standard 3-tier architecture.
Tier I: Database
Tier II: Server
Tier III: Client This 3-tier design lets Business logic components (Business Objects, fields, relationships, and rules) and services run on the Client tier and the Server tier. As a result, information can be cached on either tier for retrieval. Liaison interfaces control how data transfers across tiers. The Remoting Orchestrator controls access to Fusion services.

ITSM (specifically the ITSM platform called FrontRange Foundation or Fusion) is built on the .NET framework, a Microsoft software technology. Using Web services, .NET enables the connection to and integration of various XML-based applications (often referred to as modules).

ITSM ships with a Starter database that contains:
Structure elements (tables, fields, forms, grids, objects, and so on)
Demonstration data (sample records, reports, QuickActions, and so on)

The database uses the Fusion Archive Document (FAD file) format. ITSM supports Microsoft SQL Server databases and Oracle databases. FRS Application Administrator lets you:
Link to a variety of data sources
Import external data
Share information with external systems using a messaging process A subset of the database that holds a complete record of all inventory items and their associated configuration specifications is called the Configuration Management Database (CMDB). Configuration information and inventory items focus on hardware, software, services (or service views), and documentation items. In the sample database, several Business Objects are in the CI or Inventory Item groups, meaning that the data contained in the object interacts with the CMDB. Through the ITSM application, inventory items support Incident, Problem, and Change Management. A user can link details about Inventory Items to a record and can perform many CMDB tasks, such as searching.

The IT Service Management Suite

Figure 35:
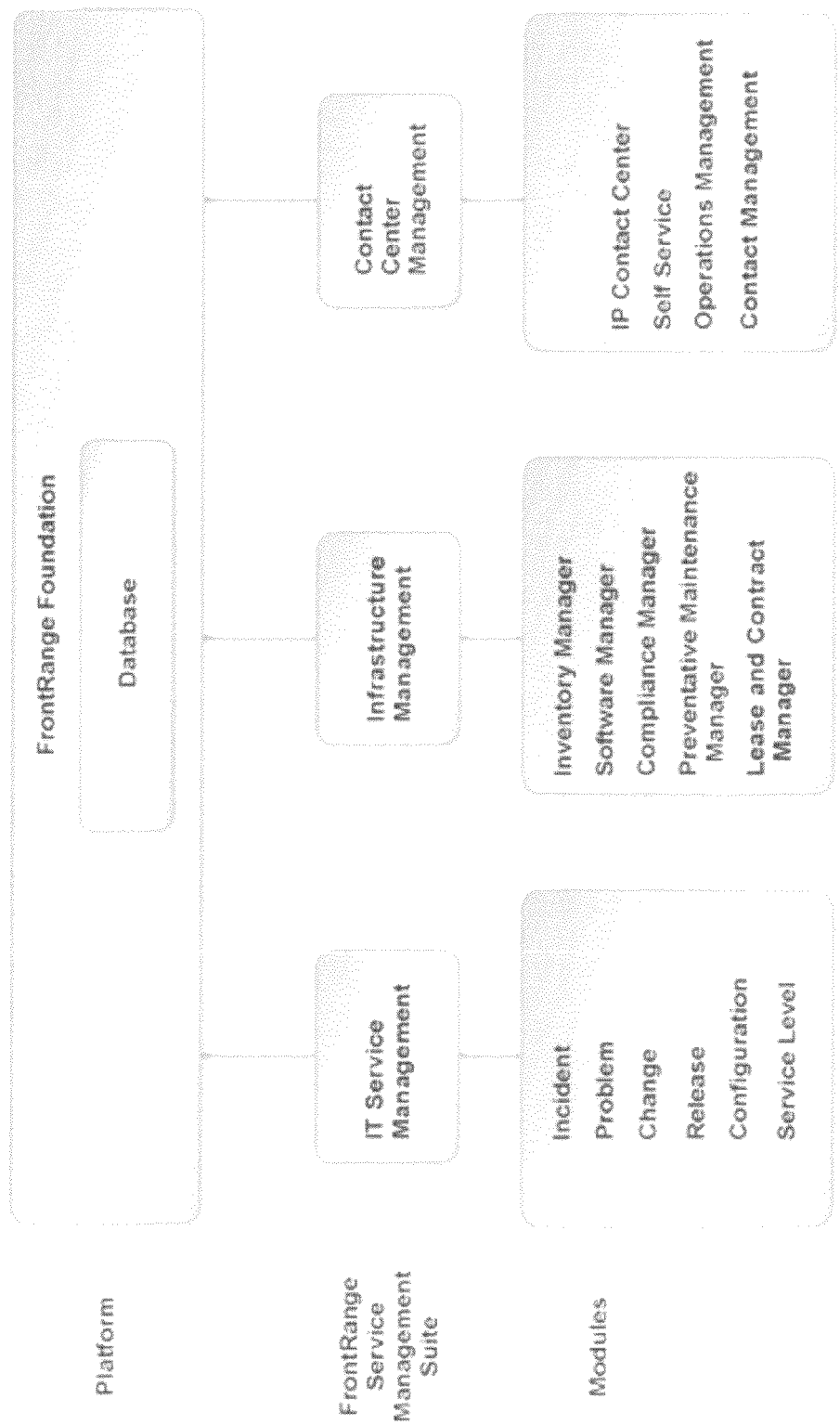
FIG. 35 shows the interaction of modules in the IT Service Management Suite and how they work together.

ITSM lets you use multiple modules in the IT Service Management Suite without restricting performance or requiring use of all modules. FIG. 35 shows the interaction of modules in the IT Service Management Suite and how they work together on the FrontRange Technology Foundation platform. Not all modules are pictured.

FRS Application Administrator sits outside of these modules where it interfaces with the database to give structure to the modules. Similarly, the IT Service Management application provides the user interface for interacting with structure elements as they were designed in FRS Application Administrator.

A Definition Set is a collection of system changes and additions (definitions) that work together to construct your system. Although ITSM ships with the definitions you need to get started, you have the versatility to create, edit, and delete your own definitions. When working in the Business Definition Editor, you save changes to a Definition Set (.ds file). You apply the Definition Set to ITSM by committing it to the database.

Business Objects govern the database structure and data. They comprise any key business component you want to track and manage. For example, you can track: Business contacts, Business leads, Opportunities, Notes, and Attachments. These components would correspond to matching Business Objects: Incidents, Tasks, Journals, Attachments, and so on. Each form, grid, layout, relationship, and field is based on a Business Object.

A master object is an object that is core to your system and stores significant business components. Master objects can function as a parent in a relationship, meaning a Standard object functioning as a child can depend on it. A standard object is an object that supports your system. Standard objects can function only as a child in a relationship.

Business Objects have several uses, such as storing validation data, and they can function within object subcategories, such as Auditing, which is an object that can record changes made on another object.

A Business Object Relationship lets two Business Objects collaborate. More specifically, it lets the records housed in the objects work together. In a relationship, Business Objects can belong to other Business Objects or simply be associated with other objects. For example, an Incident object can have a relationship with a Notes object so you can track notes pertaining to a specific incident.

Each relationship comprises a parent object and a child object. A parent object is the center of a relationship with one or more Child objects. Only a Master object can be a Parent. A child object is the supplier of additional data to a Parent object. There are two relationship types: Contains and Associates. With a contains relationship, the Child object belongs to and is dependent on the Parent object. The Child record is loaded, saved, and deleted with its parent. With an associates relationship, the Child object is relevant to the Parent object, but it does not belong to the parent. The Child object can and should be independent.

One can extend both Contains and Associates relationships to Embedded relationships. An Embedded relationship is a special relationship where the Child object is embedded into the parent to display one special Child record. For example, one can embed the Address.Phone object into the Employee object so that a home phone (one special record) displays on a Contact record.

One can embed a single object or an entire Business Object Group into a Parent object. For example, you can embed the entire Address group into the Employee object to display phone numbers, mailing addresses, and email addresses.

A Business Object Group is a collection of similar Business Objects that can share fields. Creating a Business Object Group lets you work with the object just like any other Business Object, share data, and categorically organize the objects.

A group is made up of a "lead" that defines the group and two or more Business Objects, called members. You add these members to the group during the Business Object creation process. After you create the members, use sharing properties to control which fields are shared among all members, by some members, and by only one member.

Like any individual Business Object, groups are either Master (made up of Master objects) or Standard (made up of Standard objects). When you add a Business Object to a Business Object Group, the object inherits the group name. For example, Task.Assignment indicates Task is the group name and Assignment is an object in the Task group. Groups can be a part of a relationship, and can function as a parent or as a child, depending on whether the group is Master or Standard.

The FRS Application Administrator comprises numerous wizards, centers, editors, and other windows with commands and controls to help you navigate. Generally, you work from one of two basic FRS Application Administrator parts: the main FRS Application Administrator window or the Business Definition Editor.

The FRS Application Administrator window helps you configure, secure, and maintain your system. The Business Definition Editor lets you work with Definition Sets.

Figure 36:
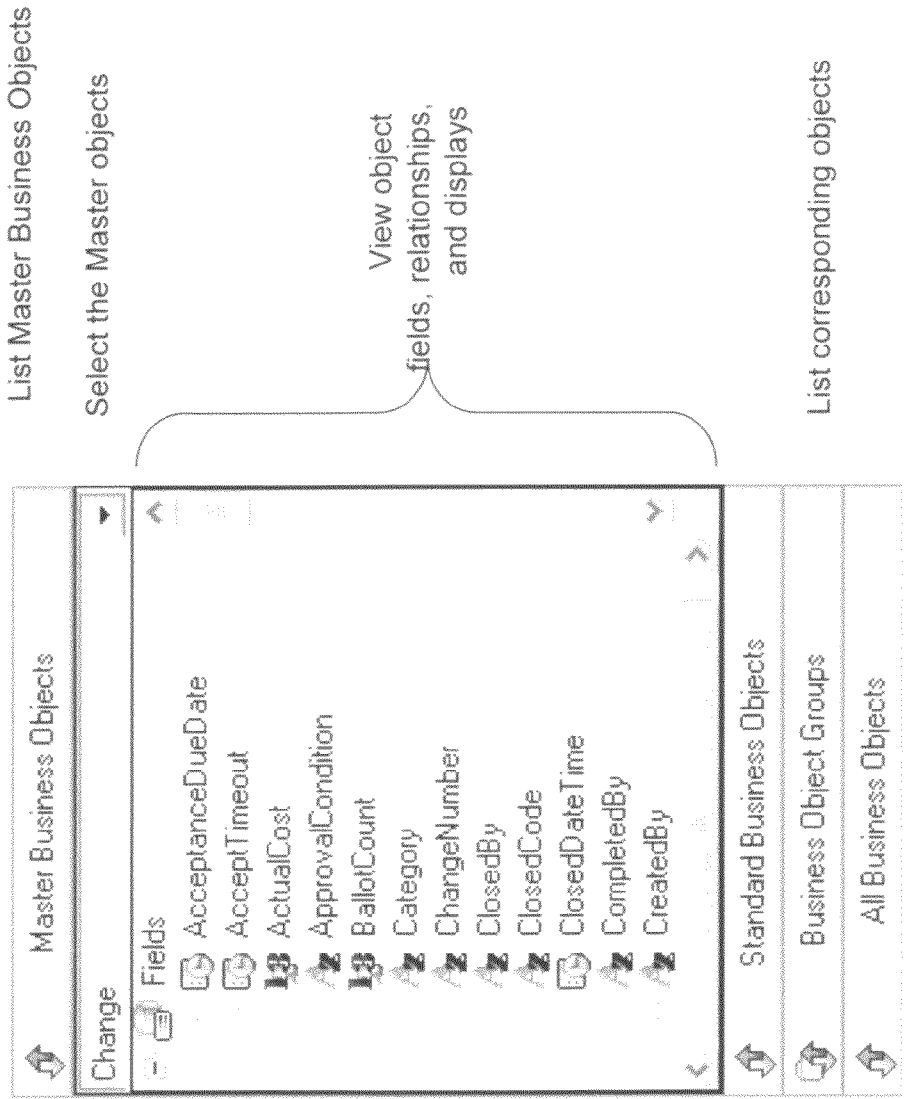
FIG. 36 illustrates the Navigator Bar.

FIG. 36 illustrates the Navigator Bar. The navigator bar shows the Business Objects in your system. Expandable and collapsible items in the navigator differentiate between Master and Standard objects. They show fields on objects, Business Object Relationships, and the displays of the objects.

In ITSM, you can control those who can use the system and to what extent they can use it. Employing your organization's own security methodology, you control security using Security Groups, users, roles, and customization levels.

Customization Levels determine the extent to which a user can modify system definitions. This security feature applies only within the FRS Application Administrator module. For example, your Customization Level may allow you to create a Master Business Object or to rename objects but not delete them. FrontRange Solutions issues your Customization Level and the necessary file to unlock the level for use.

Figure 37:
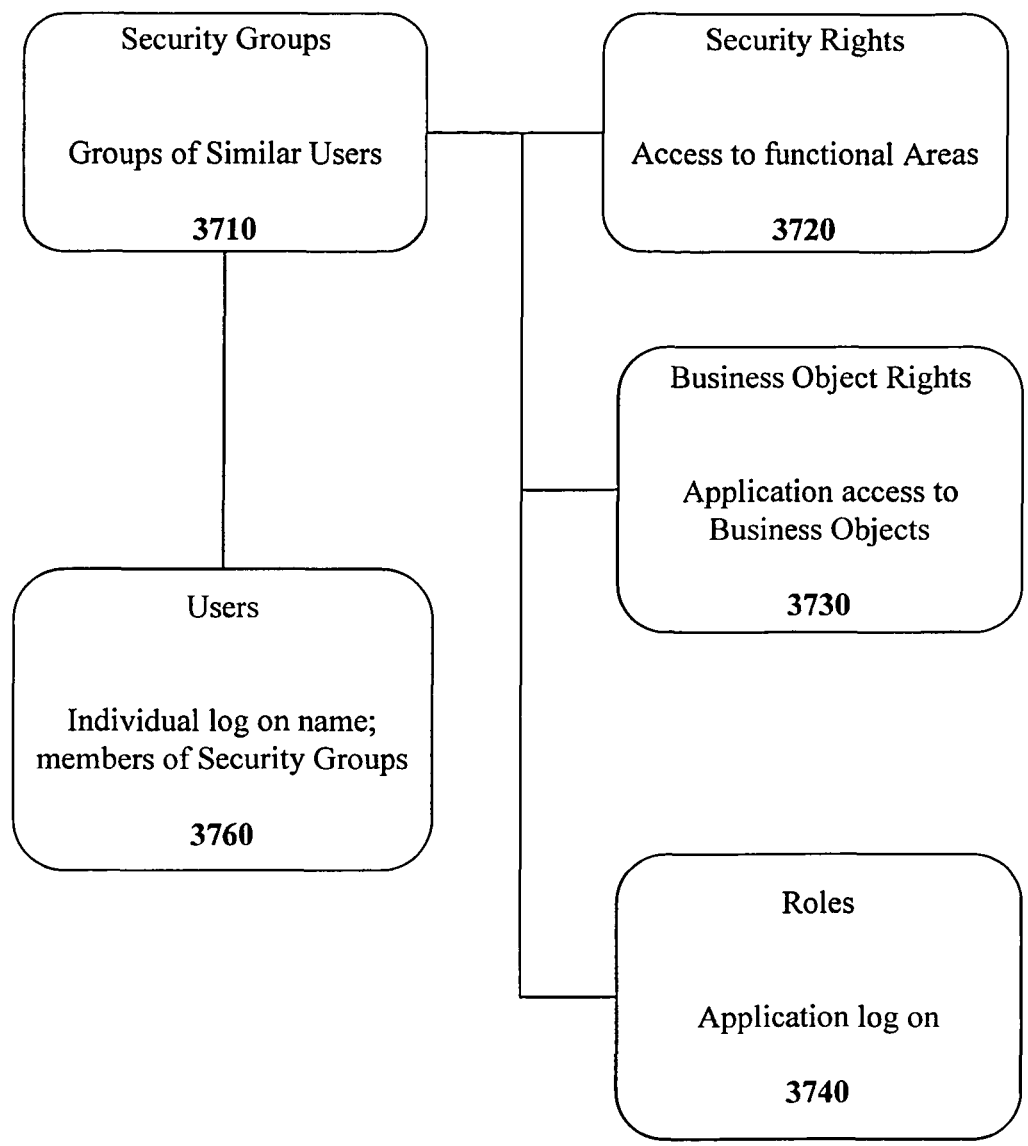
FIG. 37 illustrates a conceptual illustration of security features.

A Security Group is an assembly of users with the same rights in ITSM. Access to modules and features (Security Rights) and access to Business Objects and fields (Business Object Rights) are based on the user's Security Group. The Security Group Manager contains Security Rights, Business Object Rights, and roles. FIG. 37 illustrates a conceptual illustration of the security features.

Security Groups 3710 are usually assembled based on a user's function in ITSM. For example, a system administrator requires the ability to view, add, edit, and delete Security Groups; an accountant does not. A payroll manager may need access to personal bank account information; a sales representative does not.

Security Rights 3720 allow or restrict access to entire modules or specific features. Because Security Rights are assigned to Security Groups 3710, all members of a Security Group have the same abilities and limitations. For example, members assigned to the Administrators Security Group may have full access to the system, while members of the Accounting Security Group may not be able to create and commit Definition Sets.

Business Object Rights 3730 determine which Business Objects and fields a user can access. Specifically, they control the records and data a user can access and manipulate. Business Object Rights are assigned to Security Groups. As a result, all members of a Security Group 3710 have the same abilities and limitations. For example, members assigned to the Administrators Security Group 3710 may be able to view and modify data in any record, while members of the Support Security Group may not be able to view private information such as a Social Security Number. Note: Business Object Rights control access to Business Objects and fields in the application; they do not control access to these items in the FRS Application Administrator module. Control access to Business Objects and fields in FRS Application Administrator through User Level Rights and individual Business Object permissions.

A role consists of device- or function-specific perspectives of the application. Using the Security Group Manager, you select to which roles 3740 the group has access. When users access ITSM, they select a role. The displays of forms are assigned to roles. For example, you have a Change Manager Security Group. You want the Change Manager to log on to ITSM only as a Change Manager and not as an Administrator. The Change Manager role could be linked to a layout of the Change form that differs from the Change form technicians see. The role can also be linked to a device, allowing users to log on to a role that sees layouts for the Smart client or the Web client. For each Business Object, you can display the default or base view, or override the base view to create a custom view by role.

A user is a person who works in ITSM. Each user has an account that defines important security information. Users 3760 are members of Security Groups 3710.

Using FRS Application Administrator, you design how users of the ITSM application view and work with the database. Although ITSM comes with a number of standard definitions, you use administrative tools to create and modify the application interface to meet the needs of your organization. Interface elements (displays) that you control are based on Business Objects and include fields, forms, grids, and layouts. Perspectives enable role-based displays for different Business Objects.

A field is a parcel of information within a Business Object. Service Management ships with several predefined fields; however, you can add new fields and modify existing fields. After you create a field, you can add it to a form so a user can view it. On a form, a field is represented using a field control such as a check box, text box, drop-down list, and so on. The Field type determines what controls can be used. The following tables lists a set of fields available:

| Field type | Description | Control used |
| --- | --- | --- |
| Date/Time | Stores a date using the format specified for date/time entries. | Date, Time, or Date/Time box |
| Link | A system field in a Parent object. Stores the child's RecID and category (if applicable). On a form, it displays an embedded Child record. | Label menu or Associated Item Selector |
| Logical | A yes-no (or true-false) field. | Check box or radio button |
| Number | Stores whole numbers or currency. | Number box |
| Shared | Shares fields in a Business Object Group. Another icon identifies the primary field type, and the shared icon overlays it. | Depends on primary field type |
| Shared System | Field required by the system; shares fields in a Business Object Group. Another icon identifies the primary field type, and the shared system icon overlays it. | Depends on primary field type |
| System | Field required by the system. Another icon identifies the primary field type, and the system icon overlays it. | Depends on primary field type |
| Text | Stores letters, numbers, and punctuation. | Text box or Combo box; sometimes a radio button |

A form is a customizable graphical display used to present and capture field information. On a form, each field is represented by a field control and often, a label. Forms sometimes display other controls, such as banners and images, to enhance usability and aesthetic quality.

A Business Object can contain several forms. For example, a special form can enable a manager to see and edit more fields than a general user. A grid is a customizable tabular display for viewing multiple records simultaneously. Columns represent the fields for each record.

A layout is a customizable collection of forms, tabs, grids, and splitters that users see for the Business Object. A layout displays a Parent record and its Child records, giving you a complete view of a Parent record. The Parent record displays as a form with its Child records usually displayed in separate tabs. Because layouts show Parent and Child records to represent various business components on one display, they are most effective for displaying Business Object Relationships. Business Objects that have a relationship with the parent Change object can display as tabs (such as Inventory Items, Problem, Incident, Attachment, and Audit History). These Child objects display in their default grid view.

A perspective is a specialized view of Business Object, fields, forms, grids, and layouts. For each object, you can display the default or base view and override the base view and create a custom view. Perspectives are especially useful for defining localized language views of the database and creating custom views for smart client, Web browser, and mobile devices. Perspectives operate by overriding an object's behavior. Normal, or default, object behavior indicates no special perspective is applied to that object. To view or modify the displays for a particular perspective, select the perspective in the Business Definition's Perspective toolbar. Objects that are overridden for this perspective appear in the Business Object navigator bar with the star icon. The displays for objects with this icon apply only to that perspective.

Although ITSM comes with numerous configurations and predesigned objects, forms, Security Groups, and so on, your largest task is often planning and designing an effective system for your organization. This section offers a framework for planning your system. When one needs to customize ITSM, one can approach the modification in many different ways. This section shows you how the parts of the FRS Application Administrator module work together functionally and sequentially.

To Create a User one should add the user to the Security Group using the User Manager. To create a Security Group with the Security group manager, one should set Security Rights and Business Object Rights for the Group during creation. One may set rights for new Business Objects later. To create a Role, one should create a role, which encompasses device perspective using the Security Group Manager.

To create a Business Object/Business Object Group, on should first decide how to divide database information into objects. Then create an object. Decide whether you need a Master object, a Standard object, a Business Object Group, or a member of an existing Group. Finally, save and commit the Definition Set. This is all done with the Business Definition Editor.

To create Fields, one may add fields to the Business Object using Business Definition Editor. To create Business Object Relationships one must first decide which objects you want to make Child objects if you created a Master object. If you created a Standard object, select the object that functions as the parent.

To create Primary Form, Grid, and Layout, one should drag the fields you want on the primary form and customize the form. One can customize these for particular device perspectives using roles. To create New Displays for Different Perspectives, one should select the Business Object to override with this role. Then, select a device related to this role. And then customize the object's form for the role by selecting the role from the Role toolbar drop-down list and modifying the form.

A workspace is the screen area of the ITSM application. When you configure workspaces, you select screen elements that comprise the workspace. Workspaces are comprised of several elements, including the primary Business Object, extension module display, primary object layout display, and so on. Workspaces enable you to set display variations depending on the role logged on to ITSM. In the application you select the workspace to view.

Because of its .NET architecture, ITSM easily connects to and integrates with data sources and simplifies the importation of external data from other Web services. ITSM processes external data that is not in the form of a Fusion Archive Document (FAD file) using XML. For example, FIG. 13 illustrates the system receiving XLM data from a PeopleSoft system. External data must be in XML files for ITSM to receive it and process it. These XML files must be properly formatted, according to ITSM's published XML schema. You can use XML stylesheets (XSLT files) to translate the XML source into the proper format. The messaging process is key in transferring data, monitoring external services, and updating ITSM with new or changed data.

ITSM imports data from XML files that conform to a published XML schema (XSD). The schema and samples are located in the Messaging\Schema folder of your ITSM installation directory. When the XML files do not conform to the schema, they must be translated by a configured XSLT file. FIG. 13 illustrates the Messaging server using an XSLT file to translated an XML file. If the format of the XML files is in the required format (as determined by the schema), they do not need to use an XSLT file for translation.

Based on the XML attributes corresponding to the schema, the XML files specify what happens to the data after importation (for example, whether the data occupies a Business Object or invokes a business process). The general Schema uses "FMRequest.xsd" for the Request (input) used uniformly and "FMResponse.xsd" for the Response (the result with any errors).

To integrate with data external to ITSM, one can batch process external data or monitor for external data with listeners. The batch processing allows data imported from an external data source connection. The Messaging system allows one to enable listeners that check for new and changed data and update ITSM with changes.

FRS Application Administrator's Data Import Utility batch processes data, translates it if necessary, and performs transactions. To set up a Data import, the following data is needed:

Connection Name: The name of the ITSM data source selected when connecting and logging on to ITSM; this should be the data source that contains the data to import.

User Name: The user ID required to log on to the ITSM database.

Password: The user ID password required to log on to the ITSM database.

Data File(s) Path: The directory containing source data files that messaging uses upon importation.

Transform Data: When selected, translates data from its source into ITSM as specified in an XSLT file. Select this if the source XML files do not conform to the XML schema.

XSLT File: The path to the XML stylesheet that transforms the data into the proper XML schema, if necessary.

Log Path: The path to the directory that will contain the log file of data importation errors.

After clicking Import, the Messages heading shows the progress of data importation. The data is processed as specified in the XML files (or the translated XML files).

FIG. 8 illustrates the messaging system. To use messaging, configure the messaging server settings and enable listeners and invokers to monitor and update data between an external Web services and the FRS applications. By default, ITSM comes with the configuration to receive information from e-mail servers, an LDAP connection, and a file directory.

The messaging service manages data integration and automation between the FRS applications and external systems; it transforms data and guarantees its delivery. Messaging supports asynchronous and synchronous communication to and from the FrontRange Foundation (Fusion).

The technical messaging components in the messaging framework of FIG. 8 are:

Data Packets: The messages. The source can come from many places. It can be collected by any mechanism, including an online user questionnaire, an outside database, or a third-party scanner.

Data Processing: The messaging processes that translate data. Shared data is translated into XML using Microsoft Message Queuing (MSMQ) and processed by a Data Queue Service (DQS). The data must arrive in properly formatted DQS XML packets. It processes using a set of logical layers: transport, message, queue, and data module manager.

Agent: The resident application that loads and unloads adapters, transfers data collected from one or more adapters to the DQS, and processes messages and requests made by the DQS. An agent can run in collector or relay mode. The agent has layers: transport (DQS is a subset of this), message, agent core, and adapter manager.

Adapters: The independent modules that take data collected from a source and transform it into a format recognizable to the message listener.

Listeners: The "monitors" of messages that run on a server within the application. Listeners wait for properly formatted messages. Once a message is received, the listener performs the action specified in its properties. For example, a data packet is received on the business process listener. The packet is routed to business processes.

Invokers: The "executors" of messages that run on a server within the application. Invokers are register components that receive messages from the messaging service; each invoker processes the messages and performs certain tasks related to a specific system. For example, they send an e-mail message, update a database, or execute a business process.

The Messaging service, named FSMTService, controls the processes that use messages to communicate between ITSM and an external Web service. Once started, the service monitors from those items activated on the Server Settings—Messaging dialog box, Listeners/Invokers tab. The following items may be configured for the Messaging service:

Location of the service: The server that hosts the messaging service.

Log Level: The types of messages to log for this service, including Information (general events), Warning (events of possible disruption), Error (events distrupting the service), and Verbose (detailed descriptions of application processing events).

Log Source: The place to log the event, including Event Viewer, Log File, and Console.

Location: The path to the source where events are logged.

Audit Messages: Includes an audit trail of all messages in the log files.

Request Queue: The name of the server that sends messages.

Response Queue: The name of the server that receives messages.

Name: The name of the listener or invoker.

Type: The type of listener or invoker; for example, a file listener and an e-mail listener.

Description: A description of the listener's or invoker's purpose.

Invoker to Use: The invoker that processes the message the listener finds.

Log Location: The log file path for this listener's or invoker's event logging.

Audit Messages: Includes an audit trail of all messages going through the listener or invoker.

Each listener and invoker type has a specialized set of parameters that determine how the data is monitored. To set parameters, select a listener or invoker on the Server Settings—Messaging dialog box, Listeners/Invokers tab, and click Set Parameters. The following parameters may be set:

E-mail Listener Parameters: Monitors an e-mail server, looking for new messages to process. The parameters specify the server to monitor and the actions after processing the message.

File Listener Parameters: Monitors a network location, looking for new XML files to process. The parameters specify the directory to monitor and the actions after processing the file.

LDAP Listener Parameters: Monitors applications communicating with an LDAP protocol (for example, Active Directory). The parameters specify the directory to monitor and the actions after processing the object. For example, use LDAP to communicate between Active Directory and ITSM to update users in ITSM from Active Directory.

Fusion Invoker Parameters: Performs transactions for a given request message in XML format that conforms to the specified XML schema.

One adds invokers to facilitate new connections between ITSM and listeners. Add listeners to facilitate connections between ITSM and external systems. For example, add an e-mail listener called SupportEmailListener that monitors an e-mail server for messages sent to support@yourorganization.com. When an incoming message arrives, the listener processes it in ITSM based on the listener parameters; for instance, it could run a business process that creates a new Incident from the e-mail contents. This can be especially useful in Campaign Management.

ITSM stores, imports, and exports data in the form of a Fusion Archive Document (FAD) file. FAD files enable the sharing of data or restoring of a database. Since FAD files capture the data in your system, routinely export them as a way to backup your ITSM system.

The foregoing has described a number of techniques for implementing a business application development and executing environment. It is contemplated that changes and modifications may be made by one of ordinary skill in the art, to the materials and arrangements of elements of the present invention without departing from the scope of the invention.

The invention claimed is:

1. A method defining a business process and executing said business process in a business process execution environment, said method comprising the elements of:
    accepting input through a graphical user interface to create a flow chart of a business process, said business process including input from at least one messaging system in a data and messaging service;
    generating Business Process Modeling Language (BPML) code from said flow chart, said BPML code operating on at least one Business Object comprising metadata;
    hosting said BPML code on a web services server system;
    executing said BPML code in said business process execution environment, said business process execution environment comprising said data and messaging service executing on a server system for accessing external information, said data and messaging service providing unified access to a plurality of different messaging systems by
        receiving and sending email messages with Simple Mail Transport Protocol (SMTP) using an email listener,
        receiving and sending inter-process communication with Simple Object Access Protocol (SOAP) using a web service listener,
        receiving and sending data objects with HyperText Transport Protocol (HTTP) using an HTTP listener,
        receiving and sending data files using a file listener;
    receiving input information using said data and messaging service on behalf of said Business Object; and
    transmitting output information using said data and messaging service on behalf of said Business Object.

2. The method defining a business process and executing said business process in a business process execution environment as set forth in claim 1 wherein receiving input information using said data and messaging service on behalf of said Business Object further comprises:
    translating said external data using an XSLT file.

3. The method defining a business process and executing said business process in a business process execution environment as set forth in claim 1 wherein said external source comprises an email server.

4. The method defining a business process and executing said business process in a business process execution environment as set forth in claim 1 wherein said external source comprises an external database.

5. The method defining a business process and executing said business process in a business process execution environment as set forth in claim 1 wherein said external source comprises a file system.

6. The method defining a business process and executing said business process in a business process execution environment as set forth in claim 1 wherein said external source comprises a web service.

7. The method defining a business process and executing said business process in a business process execution environment as set forth in claim 1 wherein transmitting output information using said data and messaging service on behalf of said Business Object comprises:
  invoking an external data receiver for exporting output data.

8. The method defining a business process and executing said business process in a business process execution environment as set forth in claim 7 wherein said external data receiver comprises an email server.

9. The method defining a business process and executing said business process in a business process execution environment as set forth in claim 7 wherein said external data receiver comprises an external database.

10. The method defining a business process and executing said business process in a business process execution environment as set forth in claim 7 wherein said external data receiver comprises a file system.

11. The method defining a business process and executing said business process in a business process execution environment as set forth in claim 7 wherein said external data receiver comprises a web service.

12. An apparatus for defining a business process and executing said business process, said apparatus comprising:
  a workflow design system for accepting input through a graphical user interface to create a flow chart of a business process, said business process including input from at least one messaging system, said workflow design system generating Business Process Modeling Code from said flow chart, said Business Process Modeling Code comprising BPML code, said BPML code operating on at least one Business Object comprising metadata;
  a web services server system, said web services server system hosting said BPML code; and
  a business process execution environment for executing said BPML code, said business process execution environment comprising a data and messaging service executing on a server system for accessing external information; said data and messaging service providing unified access to a plurality of different messaging systems by comprising
    an email listener for receiving and sending email messages with Simple Mail Transport Protocol (SMTP),
    a web service listener for receiving and sending inter-process communication with Simple Object Access Protocol (SOAP),
    an HTTP listener for receiving and sending data objects with HyperText Transport Protocol (HTTP) using, and
    a file listener for receiving and sending data files in a file system,
  said data and message service receiving input information on behalf of said Business Object, and said data and messaging service transmitting output information on behalf of said Business Object.

13. The apparatus for defining a business process and executing said business process as set forth in claim 12 wherein receiving input information on behalf of said Business Object further comprises translating said external data using an XSLT file.

14. The apparatus for defining a business process and executing said business process as set forth in claim 12 wherein said external source comprises an email server.

15. The apparatus for defining a business process and executing said business process as set forth in claim 12 wherein said external source comprises an external database.

16. The apparatus for defining a business process and executing said business process as set forth in claim 12 wherein transmitting output information on behalf of said Business Object comprises invoking an external data receiver for exporting output data.

17. The apparatus for defining a business process and executing said business process as set forth in claim 16 wherein said external data receiver comprises an email server.

18. The apparatus for defining a business process and executing said business process as set forth in claim 16 wherein said external data receiver comprises an external database.

* * * * *